(12) United States Patent
Watanabe et al.

(10) Patent No.: US 12,083,961 B2
(45) Date of Patent: Sep. 10, 2024

(54) HARVESTER, SYSTEM, PROGRAM, RECORDING MEDIUM, AND METHOD

(71) Applicant: Kubota Corporation, Osaka (JP)

(72) Inventors: Toshiki Watanabe, Sakai (JP); Sotaro Hayashi, Sakai (JP); Takashi Nakabayashi, Sakai (JP); Kazushi Sako, Sakai (JP)

(73) Assignee: Kubota Corporation, Osaka (JP)

( * ) Notice: Subject to any disclaimer, the term of this patent is extended or adjusted under 35 U.S.C. 154(b) by 160 days.

(21) Appl. No.: 17/608,604

(22) PCT Filed: Jun. 25, 2020

(86) PCT No.: PCT/JP2020/024937
§ 371 (c)(1),
(2) Date: Nov. 3, 2021

(87) PCT Pub. No.: WO2020/262508
PCT Pub. Date: Dec. 30, 2020

(65) Prior Publication Data
US 2022/0212602 A1  Jul. 7, 2022

(30) Foreign Application Priority Data

Jun. 28, 2019 (JP) .................................. 2019-121783
Jun. 28, 2019 (JP) .................................. 2019-121784
(Continued)

(51) Int. Cl.
*B60R 1/23* (2022.01)
*A01D 41/127* (2006.01)
(Continued)

(52) U.S. Cl.
CPC ............ *B60R 1/23* (2022.01); *A01D 41/1278* (2013.01); *B60R 11/04* (2013.01); *G05D 1/0278* (2013.01);
(Continued)

(58) Field of Classification Search
None
See application file for complete search history.

(56) References Cited

U.S. PATENT DOCUMENTS

2011/0072773 A1* 3/2011 Schroeder ............ A01D 41/127
    348/148
2014/0311113 A1* 10/2014 Bonefas ............... A01D 34/001
    56/10.2 R
(Continued)

FOREIGN PATENT DOCUMENTS

EP 1614340 B1 4/2008
JP 9238554 A 9/1997
(Continued)

*Primary Examiner* — Rebecca A Volentine
(74) *Attorney, Agent, or Firm* — The Webb Law Firm

(57) ABSTRACT

A harvester includes an image compositing unit and a display unit. The image compositing unit generates a composite image showing a vehicle body and the vicinity of the vehicle body based on shot images generated by a front camera 21, a rear camera 22, a first side camera 23, and a second side camera 24 and vehicle body data stored in a storage unit. The display unit displays the composite image generated by the image compositing unit. The front camera 21 is provided on a front part of a driving section 8, the rear camera 22 is provided on a rear cover part 14, the first side camera 23 is provided on an outer side part of the driving section 8 in a left-right direction of the vehicle body, and the second side camera 24 is provided on an outer side part of a threshing device 11.

21 Claims, 43 Drawing Sheets

(30) Foreign Application Priority Data

Jun. 28, 2019 (JP) ................................ 2019-121785
Jun. 28, 2019 (JP) ................................ 2019-121786

(51) Int. Cl.
- *B60R 11/00* (2006.01)
- *B60R 11/04* (2006.01)
- *G05D 1/00* (2024.01)

(52) U.S. Cl.
CPC ... *B60R 2011/004* (2013.01); *B60R 2300/105* (2013.01); *B60R 2300/303* (2013.01); *B60R 2300/8086* (2013.01); *B60R 2300/8093* (2013.01)

(56) References Cited

U.S. PATENT DOCUMENTS

| | | | |
|---|---|---|---|
| 2015/0327425 A1* | 11/2015 | Dillon | A01B 69/001 701/41 |
| 2016/0309656 A1* | 10/2016 | Wilken | A01D 41/127 |
| 2018/0027179 A1* | 1/2018 | Matsuzaki | H04N 23/675 348/38 |
| 2019/0166760 A1* | 6/2019 | Palla | A01D 41/127 |

FOREIGN PATENT DOCUMENTS

| | | | |
|---|---|---|---|
| JP | 10117560 A | | 5/1998 |
| JP | 1153674 A | | 2/1999 |
| JP | 2003173210 A | | 6/2003 |
| JP | 2005245324 A | | 9/2005 |
| JP | 2007183877 A | | 7/2007 |
| JP | 200917815 A | | 1/2009 |
| JP | 201081843 A | | 4/2010 |
| JP | 4871039 B2 | | 11/2011 |
| JP | 5019159 B2 | | 9/2012 |
| JP | 201473136 A | | 4/2014 |
| JP | 2014073136 A | * | 4/2014 |
| JP | 5586910 B2 | | 9/2014 |
| JP | 2014171457 A | | 9/2014 |
| JP | 201570799 A | | 4/2015 |
| JP | 2015104376 A | * | 6/2015 |
| JP | 2015104377 A | | 6/2015 |
| JP | 6035162 B2 | | 11/2016 |
| JP | 201712040 A | | 1/2017 |
| JP | 2017139982 A | | 8/2017 |
| JP | 2017175951 A | | 10/2017 |
| JP | 6257246 B2 | | 12/2017 |
| JP | 2018121615 A | | 8/2018 |
| JP | 20194868 A | | 1/2019 |
| JP | 201910027 A | | 1/2019 |
| JP | 201928688 A | | 2/2019 |
| JP | 201932682 A | | 2/2019 |
| JP | 201983703 A | | 6/2019 |
| WO | 2015083322 A1 | | 6/2015 |

* cited by examiner

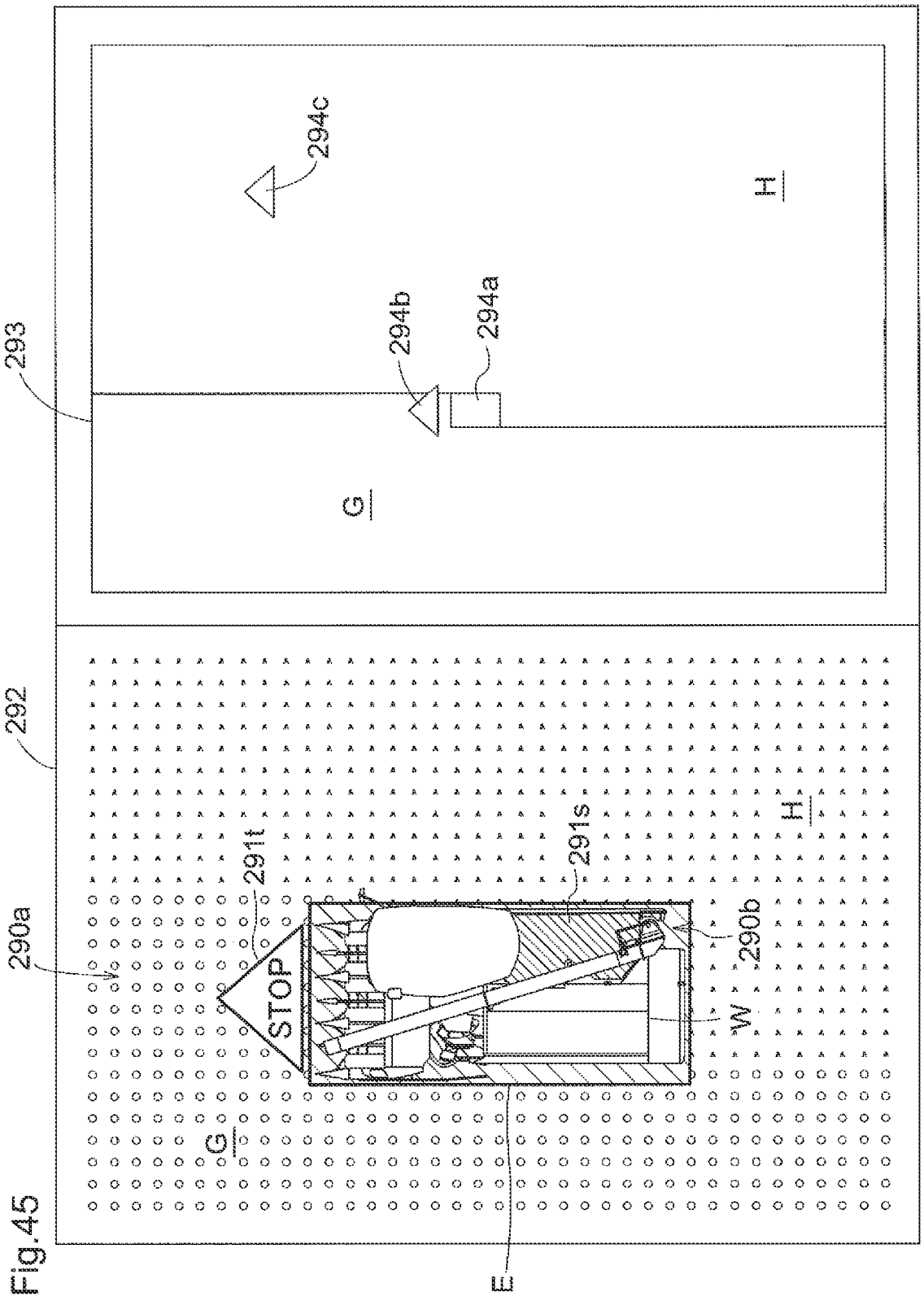

HARVESTER, SYSTEM, PROGRAM, RECORDING MEDIUM, AND METHOD

CROSS-REFERENCE TO RELATED APPLICATIONS

This application is the United States national phase of International Application No. PCT/JP2020/024937 filed Jun. 25, 2020, and claims priority to Japanese Patent Application Nos. 2019-121783 filed Jun. 28, 2019, 2019-121784 filed Jun. 28, 2019, 2019-121785 filed Jun. 28, 2019, and 2019-121786 filed Jun. 28, 2019, the disclosures of which are hereby incorporated by reference in their entirety.

BACKGROUND OF THE INVENTION

Field of the Invention

The present invention relates to a harvester, a system, a program, a recording medium, and a method.

Description of Related Art

Conventionally, a technique of displaying an overhead image in a display device is used to make a driver aware of a vehicle's surroundings. A vehicle driving assistance device described in JP 2007-183877A (Patent Document 1) uses four on-board cameras to shoot images of regions to the front, the rear, and the left and right sides of a vehicle, respectively, stitches the shot images together and converts the images into an image looking down on the host vehicle from a virtual viewpoint thereabove, and superimposes the stitched image over a virtual image of the host vehicle to display a single overhead image that makes the driver aware of the host vehicle's surroundings.

As indicated in the drawings, the vehicle driving assistance device described in Patent Document 1 is for passenger vehicles, and is intended to assist in parking. The four on-board cameras are installed on a front bumper, a rear bumper, and left and right side mirrors.

JP 2019-4868A (Patent Document 2) describes a display device provided in a combine. A screen unit of this display device is divided into a camera image region capable of displaying a shot image shot by a camera provided in a vehicle body, and two specific state information regions arranged on the left and right sides of the camera image region. The specific state information regions display information about the vehicle body, such as the rotation speed of the power source, a level of raw rice in the vehicle body, and the like.

Patent Document 1: JP 2007-183877A
Patent Document 2: JP 2019-4868A

SUMMARY OF THE INVENTION

Patent Document 1 only discloses a technique for displaying an overhead image in a passenger vehicle, and neither discloses nor suggests displaying images for recognizing the surroundings of a harvester such as a combine, locations of on-board cameras suited to harvesters, or the like.

An object of the present invention is to provide a means for making it easier to understand a work environment around a harvester.

Patent Document 1 only discloses a technique for displaying an overhead image in a passenger vehicle, and neither discloses nor suggests displaying images for recognizing the surroundings of a harvester such as a combine, locations of on-board cameras suited to harvesters, or the like.

An object of the present invention is to provide a means for making it easier to understand a work environment around a harvester, a state of the harvester, and the like.

Patent Document 1 only discloses a technique for displaying an overhead image in a passenger vehicle. Patent Document 1 neither discloses nor suggests displaying images for recognizing a vehicle body, the surroundings, and so on of a harvester such as a combine, selecting a shooting range suited to a harvester, or the like.

An object of the present invention is to provide a means for making it easier to understand a work environment around a harvester, a state of the harvester, and the like.

With the display device described in Patent Document 2, a region where a shot image shot by a camera and a region where information about the vehicle body is displayed are separated. Accordingly, it may be difficult to grasp, at a glance, what the information displayed is about, what part of the vehicle body the information is about, and so on.

An object of the present invention is to provide a means for displaying information related to harvesting operations in an easy-to-understand manner.

As a means to solve the above-described first problem, a harvester according to the present invention includes: a vehicle body; a front camera, a rear camera, a first side camera, and a second side camera that shoot a vicinity of the vehicle body and generate shot images; a storage unit for storing vehicle body data indicating an external shape of the vehicle body; an image compositing unit that generates a composite image showing the vehicle body and the vicinity of the vehicle body based on (i) the shot images generated by the front camera, the rear camera, the first side camera, and the second side camera and (ii) the vehicle body data stored in the storage unit; and a display unit that displays the composite image generated by the image compositing unit. The vehicle body includes a harvesting unit that harvests a crop in a field, a driving section provided behind the harvesting unit, a transport unit that is provided laterally to the driving section and that transports a harvested crop harvested by the harvesting unit, a threshing device that is provided behind the transport unit and that threshes the harvested crop transported by the transport unit, a grain tank that is provided behind the driving section and laterally to the threshing device and that stores grain obtained by the threshing device, a discharge device that is provided behind the grain tank and that discharges the grain stored in the grain tank to outside, and a rear cover part that covers the discharge device or the threshing device from behind. The front camera is provided on a front part of the driving section, the rear camera is provided on the rear cover part, the first side camera is provided on (i) a side part of the driving section on an outer side in a left-right direction of the vehicle body or (ii) a side part of the grain tank on an outer side in the left-right direction of the vehicle body, and the second side camera is provided on a side part of the threshing device on an outer side in the left-right direction of the vehicle body.

According to this feature, a composite image based on the shot images generated by the front camera, the rear camera, the first side camera, and the second side camera and the vehicle body data is displayed in the display unit, and the vehicle body and the vicinity thereof are shown. In other words, the state in the vicinity of the harvester is displayed in the display unit, which makes it easy to grasp the work environment. Additionally, the front camera is provided on a front part of the driving section, the rear camera is provided on the rear cover part, the first side camera is provided on a side part of the driving section on an outer side in a left-right direction of the vehicle body or a side part of the grain tank on an outer side in the left-right direction of the vehicle body, and the second side camera is provided on a side part of the threshing device on an outer side in the left-right direction of the vehicle body, and thus a wide range in four directions around the vehicle body can be shot in a harvester in which the harvesting unit, the driving section, the threshing device, the grain tank, and the rear cover part are arranged as described above. Accordingly, a wide range around the vehicle body can be shown in the composite image, which makes it easier to grasp the work environment in the vicinity of the harvester.

As a means to solve the above-described first problem, a harvester according to the present invention includes: a vehicle body; a front camera, a rear camera, a first side camera, and a second side camera that shoot a vicinity of the vehicle body and generate shot images; a storage unit for storing vehicle body data indicating an external shape of the vehicle body; an image compositing unit that generates a composite image showing the vehicle body and the vicinity of the vehicle body based on (i) the shot images generated by the front camera, the rear camera, the first side camera, and the second side camera and (ii) the vehicle body data stored in the storage unit; and a display unit that displays the composite image generated by the image compositing unit. The vehicle body includes a harvesting unit that harvests a crop in a field, a driving section provided behind the harvesting unit, a transport unit that is provided laterally to the driving section and that transports a harvested crop harvested by the harvesting unit, a threshing device that is provided behind the transport unit and that threshes the harvested crop transported by the transport unit, and a grain tank that is provided behind the driving section and laterally to the threshing device and that stores grain obtained by the threshing device. The front camera is provided on a front part of the driving section, the rear camera is provided on a rear part of the threshing device or the grain tank, the first side camera is provided on (i) a side part of the driving section on an outer side in a left-right direction of the vehicle body or (ii) a side part of the grain tank on an outer side in the left-right direction of the vehicle body, and the second side camera is provided on a side part of the threshing device on an outer side in the left-right direction of the vehicle body.

According to this feature, a composite image based on the shot images generated by the front camera, the rear camera, the first side camera, and the second side camera and the vehicle body data is displayed in the display unit, and the vehicle body and the vicinity thereof are shown. In other words, the state in the vicinity of the harvester is displayed in the display unit, which makes it easy to grasp the work environment. Additionally, the front camera is provided on a front part of the driving section, the rear camera is provided on a rear part of the threshing device or the grain tank, the first side camera is provided on a side part of the driving section on an outer side in a left-right direction of the vehicle body or a side part of the grain tank on an outer side in the left-right direction of the vehicle body, and the second side camera is provided on a side part of the threshing device on an outer side in the left-right direction of the vehicle body, and thus a wide range in four directions around the vehicle body can be shot in a harvester in which the harvesting unit, the driving section, the threshing device, and the grain tank are arranged as described above. Accordingly, a wide range around the vehicle body can be shown in the composite image, which makes it easier to grasp the work environment in the vicinity of the harvester.

In the present invention, preferably, the front camera and the rear camera are located in a central part in the left-right direction of the vehicle body.

According to this feature, the front camera and the rear camera are located in a central part of the vehicle body in the left-right direction, and thus a wide range to the front and the rear of the vehicle body can be shot. Accordingly, a wide range to the front and the rear of the vehicle body can be shown in the composite image, which makes it even easier to grasp the work environment in the vicinity of the harvester.

In the present invention, preferably, the front camera is provided on the front part of the driving section, and is adjacent to the transport unit.

According to this feature, the front camera is provided on the front part of the driving section, and is adjacent to the transport unit, and thus the front camera is located toward the center of the vehicle body in the left-right direction. Accordingly, a wide range to the front of the vehicle body can be shown in the composite image, which makes it even easier to grasp the work environment in the vicinity of the harvester.

In the present invention, preferably, the first side camera is provided on a rear part of the driving section, and is adjacent on an outer side in the left-right direction of the vehicle body.

According to this feature, the first side camera is provided on a rear part of the driving section, and is adjacent on an outer side in the left-right direction of the vehicle body, and thus the first side camera is located toward the center of the vehicle body in the front-back direction. Accordingly, a wide range to the side of the vehicle body can be shown in the composite image, which makes it even easier to grasp the work environment in the vicinity of the harvester.

In the present invention, preferably, the first side camera is provided behind a driver's seat included in the driving section.

According to this feature, the first side camera is provided behind a driver's seat included in the driving section, and thus the first side camera is located toward the center of the vehicle body in the front-back direction. Accordingly, a wide range to the side of the vehicle body can be shown in the composite image, which makes it even easier to grasp the work environment in the vicinity of the harvester.

In the present invention, preferably, the harvester further includes an engine provided below the driver's seat, a radiator provided on an opposite side of the transport unit to the engine, and a dust-resistant unit that is provided on an opposite side of the transport unit to the radiator and that removes dust from outside air supplied to the radiator, and the first side camera is provided above the dust-resistant unit.

According to this feature, the first side camera is provided above the dust-resistant unit, and thus the first side camera is located toward the top and the center of the vehicle body in the front-back direction. Accordingly, a wide range to the side of the vehicle body can be shown in the composite image, which makes it even easier to grasp the work environment in the vicinity of the harvester.

In the present invention, preferably, a roof part included in the driving section includes a projecting part that projects farther outward in the left-right direction of the vehicle body than a side glass, and the first side camera is provided directly below the projecting part.

According to this feature, because the first side camera is provided directly below the projecting part, the projecting part suppresses direct sunlight from entering the first side camera, which makes it possible to improve the quality of the shot image generated by the first side camera. This makes it even easier to grasp the work environment in the vicinity of the harvester.

In the present invention, preferably, the first side camera is provided on a front part of the grain tank, adjacent on an outer side in the left-right direction of the vehicle body.

According to this feature, the first side camera is provided on a front part of the grain tank, adjacent on an outer side in the left-right direction of the vehicle body, and thus the first side camera is located toward the center of the vehicle body in the front-back direction. Accordingly, a wide range to the side of the vehicle body can be shown in the composite image, which makes it even easier to grasp the work environment in the vicinity of the harvester.

In the present invention, preferably, the second side camera is provided on a front part of the threshing device, adjacent on an outer side in the left-right direction of the vehicle body.

According to this feature, the second side camera is provided on a front part of the threshing device, adjacent on an outer side in the left-right direction of the vehicle body, and thus the second side camera is located toward the center of the vehicle body in the front-back direction. Accordingly, a wide range to the side of the vehicle body can be shown in the composite image, which makes it even easier to grasp the work environment in the vicinity of the harvester.

In the present invention, preferably, the threshing device includes a main body part and a top panel that opens and closes an opening provided in an upper surface of the main body part, and the second side camera is provided on the front part of the threshing device, and on a part of the upper surface of the main body part located farther outward than the top panel.

According to this feature, second side camera is provided on the front part of the threshing device, and on a part of the upper surface of the main body part located farther outward than the top panel, and thus the second side camera is located toward the top and the center of the vehicle body in the front-back direction. Accordingly, a wide range to the side of the vehicle body can be shown in the composite image, which makes it even easier to grasp the work environment in the vicinity of the harvester.

As a means to solve the above-described second problem, a harvester according to the present invention includes: a vehicle body; a front camera, a rear camera, a first side camera, and a second side camera that shoot a vicinity of the vehicle body and generate shot images; a storage unit for storing vehicle body data indicating an external shape of the vehicle body; an image compositing unit that generates a composite image showing the vehicle body and the vicinity of the vehicle body based on (i) the shot images generated by the front camera, the rear camera, the first side camera, and the second side camera and (ii) the vehicle body data stored in the storage unit; and a display unit that displays the composite image generated by the image compositing unit. The vehicle body includes a harvesting unit that harvests a crop in a field, a driving section provided behind the harvesting unit, a transport unit that is provided laterally to the driving section and that transports a harvested crop harvested by the harvesting unit, a feed chain that transports the harvested crop transported by the transport unit toward a rear, a threshing device that is provided behind the transport unit and that threshes the harvested crop transported by the feed chain, and a grain tank that is provided behind the driving section and laterally to the threshing device and that stores grain obtained by the threshing device. The front camera is provided on a front part of the driving section, the rear camera is provided on a rear part of the threshing device or the grain tank, the first side camera is provided on (i) a side part of the driving section on an outer side in a left-right direction of the vehicle body or (ii) a side part of the grain tank on an outer side in the left-right direction of the vehicle body, and the second side camera is provided above a receiving part where the harvested crop is received by the feed chain from the transport unit.

According to this feature, a composite image based on the shot images generated by the front camera, the rear camera, the first side camera, and the second side camera and the vehicle body data is displayed in the display unit, and the vehicle body and the vicinity thereof are shown. In other words, the state in the vicinity of the harvester is displayed in the display unit, which makes it easy to grasp the work environment. Additionally, the front camera is provided on a front part of the driving section, the rear camera is provided on a rear part of the threshing device or the grain tank, the first side camera is provided on a side part of the driving section on an outer side in a left-right direction of the vehicle body or a side part of the grain tank on an outer side in the left-right direction of the vehicle body, and the second side camera is provided above a receiving part where the harvested crop is received by the feed chain from the transport unit, and thus a wide range in four directions around the vehicle body can be shot in a harvester in which the harvesting unit, the driving section, the threshing device, and the grain tank are arranged as described above. Accordingly, a wide range around the vehicle body can be shown in the composite image, which makes it easier to grasp the work environment in the vicinity of the harvester.

Additionally, because the second side camera is provided above the receiving part where the harvested crop is received by the feed chain from the transport unit, the receiving part can be shown in the composite image, which makes it easier to grasp the state of receiving of the harvested crop.

In the present invention, preferably, the second side camera is provided so as to be capable of shooting the receiving part.

According to this feature, the second side camera is provided so as to be capable of shooting the receiving part. As such, when the second side camera shoots the receiving part, the receiving part can be shown in the composite image, which makes it easier to grasp the state of receiving of the harvested crop.

In the present invention, preferably, a rail stand located vertically opposite to the feed chain such that the rail stand and the feed chain sandwich the harvested crop, and the second side camera is provided farther forward than the rail stand.

According to this feature, the second side camera is provided farther forward than the rail stand, which makes it easy to show the state of the harvesting unit progressing between the rail stand and the feed chain in the composite image, and makes it easier to grasp the state of receiving of the harvested crop.

In the present invention, preferably, the second side camera is provided forward of an outer part of a front wall included in the threshing device.

According to this feature, the second side camera is provided foward of an outer part of a front wall included in the threshing device. As such, the second side camera is supported by the sturdy front wall, and the state of receiving of the harvested crop can be shot reliably.

In the present invention, preferably, the first side camera is provided farther forward than the grain tank.

According to this feature, the first side camera is provided farther forward than the grain tank, and thus the first side camera is located toward the center of the vehicle body in the front-back direction. Accordingly, a wide range to the side of the vehicle body can be shown in the composite image, which makes it even easier to grasp the work environment in the vicinity of the harvester.

In the present invention, preferably, the first side camera is provided behind a driver's seat included in the driving section.

According to this feature, the first side camera is provided behind a driver's seat included in the driving section, and thus the first side camera is located toward the center of the vehicle body in the front-back direction. Accordingly, a wide range to the side of the vehicle body can be shown in the composite image, which makes it even easier to grasp the work environment in the vicinity of the harvester.

In the present invention, preferably, the harvester further includes an engine provided below the driver's seat, a radiator provided on an opposite side of the transport unit to the engine, and a dust-resistant unit that is provided on an opposite side of the transport unit to the radiator and that removes dust from outside air supplied to the radiator, and the first side camera is provided above the dust-resistant unit.

According to this feature, the first side camera is provided above the dust-resistant unit, and thus the first side camera is located toward the top and the center of the vehicle body in the front-back direction. Accordingly, a wide range to the side of the vehicle body can be shown in the composite image, which makes it even easier to grasp the work environment in the vicinity of the harvester.

In the present invention, preferably, the first side camera is provided at a position higher than the grain tank.

According to this feature, the first side camera is provided at a position higher than the grain tank, and thus the first side camera is located toward the top and toward the center of the vehicle body in the front-back direction. Accordingly, a wide range to the side of the vehicle body can be shown in the composite image, which makes it even easier to grasp the work environment in the vicinity of the harvester.

In the present invention, preferably, a roof part included in the driving section includes a projecting part that projects farther outward in the left-right direction of the vehicle body than a side glass, and the first side camera is provided directly below the projecting part.

According to this feature, because the first side camera is provided directly below the projecting part, the projecting part suppresses direct sunlight from entering the first side camera, which makes it possible to improve the quality of the shot image generated by the first side camera. This makes it even easier to grasp the work environment in the vicinity of the harvester.

In the present invention, preferably, a satellite positioning module that detects a self vehicle position is provided, and the front camera, the rear camera, the first side camera, and the second side camera are provided at a position lower than the satellite positioning module.

According to this feature, all of the four cameras are provided at a position lower than the satellite positioning module, and thus the occurrence of adverse effects on the detection of the self vehicle position by the satellite positioning module due to the presence of the cameras can be suppressed.

As a means that solves the above-described third problem, a harvester according to the present invention includes: a vehicle body; a plurality of cameras that generate shot images; an image compositing unit that generates a composite image by compositing the shot images generated by the plurality of cameras into an image from a single viewpoint; and a display unit that displays the composite image generated by the image compositing unit. A harvesting unit and a front camera serving as one of the cameras are provided on a front part of the vehicle body, the front camera is provided such that part or all of the harvesting unit is included in a shooting range, and the part or all of the harvesting unit shot by the front camera is shown in the composite image generated by the image compositing unit.

According to this feature, shot images from a plurality of cameras including the front camera are composited and displayed in the display unit. As such, the field, the state of the vehicle body, and the like over a relatively wide range can be grasped at a glance, which makes it easy to grasp the work environment in the vicinity of the harvester, the state of the harvester, and the like. Additionally, the front camera is provided such that part or all of the harvesting unit is included in the shooting range and the shot harvesting unit is shown in the composite image, and thus the state of the harvesting unit and the crop processed by the harvesting unit can therefore be grasped easily.

In the present invention, preferably, the harvesting unit includes a frame and an auger, the front camera is provided such that part or all of the frame and part or all of the auger are included in the shooting range, and the part or all of the frame and the part or all of the auger shot by the front camera are shown in the composite image generated by the image compositing unit.

According to this feature, the front camera includes the frame and the auger in the shooting range, and the shot frame and auger are shown in the composite image. As such, the state of the frame and the auger of the harvesting unit, and the state of the crop processed by the auger, can be grasped easily.

In the present invention, preferably, the front camera is provided such that a rear part of the frame and a region farther rearward than the frame are included in the shooting range, and the rear part of the frame and the region farther rearward than the frame, shot by the front camera, are shown in the composite image generated by the image compositing unit.

According to this feature, the front camera includes the rear part of the frame and a region farther rearward than the frame in the shooting range, and the rear part of the frame and the region farther rearward than the frame, which have been shot, are shown in the composite image. As such, the state of the rear part of the frame of the harvesting unit, and the state of the mowed area rearward from the frame, can be grasped easily.

In the present invention, preferably, the harvesting unit includes a lifting device that lifts a crop in a field, the front camera is provided such that part or all of the lifting device is included in the shooting range, and the part or all of the lifting device shot by the front camera is shown in the composite image generated by the image compositing unit.

According to this feature, the front camera includes the lifting device in the shooting range, and the lifting device which has been shot is shown in the composite image. As such, the state of the lifting device and the state of the crop lifted by the lifting device can be grasped easily.

In the present invention, preferably, the front camera is provided such that a region farther rearward than the lifting device is included in the shooting range, and the region farther rearward than the lifting device shot by the front camera is shown in the composite image generated by the image compositing unit.

According to this feature, the front camera includes the region farther rearward than the lifting device in the shooting range, and the region farther rearward from the lifting device which has been shot is shown in the composite image. As such, the state of the crop sent rearward from the lifting device can be grasped easily.

In the present invention, preferably, the harvesting unit includes a left divider and a right divider, the front camera is provided such that part or all of at least the left divider is included in the shooting range, and the part or all of the left divider shot by the front camera is shown in the composite image generated by the image compositing unit.

According to this feature, the front camera includes the left divider in the shooting range, and the left divider which has been shot is shown in the composite image. As such, the state of division of the crop in the field by the dividers can be grasped easily.

In the present invention, preferably, a waste straw processing device and a rear camera serving as one of the cameras are provided on a rear part of the vehicle body, the rear camera is provided such that part or all of the waste straw processing device is included in the shooting range, and the part or all of the waste straw processing device shot by the rear camera is shown in the composite image generated by the image compositing unit.

According to this feature, the rear camera includes the waste straw processing device in the shooting range, and the waste straw processing device which has been shot is shown in the composite image. As such, the state of processing of waste straw can be grasped easily.

In the present invention, preferably, the rear camera is provided such that a region farther rearward than the waste straw processing device is included in the shooting range, and the region farther rearward than the waste straw processing device shot by the rear camera is shown in the composite image generated by the image compositing unit.

According to this feature, the rear camera includes the region farther rearward than the waste straw processing device in the shooting range, and the region which has been shot is shown in the composite image. As such, the state of waste straw discharged from the waste straw processing device can be grasped easily.

In the present invention, preferably, a lower camera serving as one of the cameras at a position of the vehicle body below the front camera, the lower camera is provided such that a lower part of the vehicle body is included in a shooting range, and the lower part of the vehicle body shot by the lower camera is shown in the composite image generated by the image compositing unit.

According to this feature, the lower camera includes the lower part of the vehicle body in the shooting range, and the lower part of the vehicle body which has been shot is shown in the composite image. As such, the state of the lower part of the vehicle body can be grasped easily.

In the present invention, preferably, a traveling device in a lower part of the vehicle body, the lower camera is provided such that a front part of the traveling device is included in the shooting range, and the front part of the traveling device shot by the lower camera is shown in the composite image generated by the image compositing unit.

According to this feature, the lower camera includes the front part of the traveling device in the shooting range, and the front part of the traveling device which has been shot is shown in the composite image. As such, the state of the front part of the traveling device can be grasped easily.

In the present invention, preferably, a waste straw processing device is provided in a rear part of the vehicle body, the lower camera is provided such that a region below the waste straw processing device is included in the shooting range, and the region below the waste straw processing device shot by the lower camera is shown in the composite image generated by the image compositing unit.

According to this feature, the lower camera includes the region below the waste straw processing device in the shooting range, and the region below which has been shot is shown in the composite image. As such, the state of the region below the waste straw processing device (e.g., the mowed area, the state of the waste straw, and the like) can be grasped easily.

In the present invention, preferably, a feed chain that grips and transports the crop harvested by the harvesting unit and causes the threshing device to thresh the crop is provided, the lower camera is provided at a position lower than the feed chain and is provided such that a region below the feed chain is included in the shooting range, and the region below the feed chain shot by the lower camera is shown in the composite image generated by the image compositing unit.

When a camera is provided at a position higher than the feed chain, it is difficult to shoot a region below the feed chain (the field and the like) due to the presence of crops transported by the feed chain. According to this feature, the lower camera is provided at a position lower than the feed chain, the lower camera includes the region below the feed chain in the shooting range, and the region below which is shot is shown in the composite image. As such, the state of the region below the feed chain can be grasped easily.

As a means to solve the above-described fourth problem, a harvester according to the present invention includes: a vehicle body that performs harvesting operations for a crop while traveling in a field; a camera that generates a shot image; a display unit that displays an image; a storage unit for storing vehicle body data indicating an external shape of the vehicle body; a first compositing unit that generates a first composite image based on the shot image generated by the camera and the vehicle body data stored in the storage unit, the first composite image being an image showing the vehicle body and the field around the vehicle body; a second compositing unit that generates a second composite image by compositing an information presentation image indicating information related to the harvesting operations with the first composite image generated by the first compositing unit at a related position, the related position being a position in the first composite image which position is related to the information presentation image; and a display control unit that causes the second composite image generated by the second compositing unit to be displayed in the display unit.

According to this feature, an image indicating information related to the harvesting operations is composited with an image showing the vehicle body and the field in the vicinity of the vehicle body at a position related to that information, and is displayed in the display unit. As such, it is easy to understand to which part or position of the vehicle body, the field, or the like the information related to the harvesting operations is related. This makes it possible to improve the efficiency, safety, and the like of the harvesting operations.

In the present invention, preferably, the information presentation image is an image for an alert of an obstruction being present in the field, and the related position is a position in the first composite image which position corresponds to a position of the obstruction or a position in a vicinity of the obstruction.

According to this feature, an image for an alert of an obstruction being present in the field is composited with the image showing the vehicle body and the field in the vicinity of the vehicle body at the position of the obstruction or a position in the vicinity thereof, and is displayed in the display unit. As such, the presence of the obstruction can be understood easily. This makes the driver aware of the obstruction, and makes it possible to improve the safety of the harvesting operations.

In the present invention, preferably, the information presentation image is an image making an alert regarding a state of the vehicle body, and the related position is a position in the first composite image which position corresponds to a position of the vehicle body or a position in a vicinity of the vehicle body.

According to this feature, an image making an alert regarding the state of the vehicle body is composited with the image showing the vehicle body and the field in the vicinity of the vehicle body at the position of the vehicle body or a position in the vicinity thereof, and is displayed in the display unit. As such, the state of the vehicle body can be understood easily. This makes the driver aware of the state of the vehicle body, e.g., the speed of the vehicle body, the presence or absence of malfunctions, the capacity of the grain tank, and the like, which makes it possible to improve the efficiency of the harvesting operations.

In the present invention, preferably, the information presentation image is an image indicating a state of the harvested crop, and the related position is a position in the first composite image which position corresponds to a position where the crop is harvested or a position in a vicinity of the position where the crop is harvested.

According to this feature, an image making an alert regarding the state of the harvested crop is composited with the image showing the vehicle body and the field in the vicinity of the vehicle body at the position where the harvested crop was harvested or a position in the vicinity thereof, and is displayed in the display unit. As such, the state of the harvested crop can be understood easily. This makes the driver aware of the state of the harvested crop, e.g., the quality, yield, and the like of the harvested crop, which makes it possible to improve the efficiency of the harvesting operations.

In the present invention, preferably, the information presentation image is an image showing a state of a subregion that is a partial region of the field, and the related position is a position in the first composite image which position corresponds to a position of the subregion or a position in a vicinity of the subregion.

According to this feature, an image making an alert regarding the state of the subregion is composited with the image showing the vehicle body and the field in the vicinity of the vehicle body at the position of the subregion or a position in the vicinity thereof, and is displayed in the display unit. As such, the state of the subregion can be understood easily. This makes the driver aware of the state of the subregion in the field, e.g., a distinction between already-mowed/unmowed areas, whether crops are fallen, the growth state, and the like, which makes it possible to improve the efficiency of the harvesting operations.

In the present invention, preferably, the information presentation image is an image showing a state of an unharvested crop in the subregion.

According to this feature, an image making an alert regarding the state of the crop in the subregion is composited with the image showing the vehicle body and the field in the vicinity of the vehicle body at the position of the subregion or a position in the vicinity thereof, and is displayed in the display unit. As such, the state of the unharvested crop in the subregion. This makes the driver aware of the state of the crop in the subregion in the field, e.g., whether crops are fallen, the growth state, and the like, which makes it possible to improve the efficiency of the harvesting operations.

In the present invention, preferably, the information presentation image is an image showing a target path of the vehicle body, and the related position is a position of the first composite image forward on the target path.

According to this feature, an image showing the target path is composited with the image showing the vehicle body and the field in the vicinity of the vehicle body at a position forward on the target path, and displayed in the display unit. As such, the target path can be shown in an easy-to-understand manner. This makes the driver aware of the target path, and makes it possible to improve the efficiency of the harvesting operations.

In the present invention, preferably, the information presentation image is an image showing that an event has occurred during harvesting operations, and the related position is a position in the first composite image which position corresponds to a position where the event occurred or a position in a vicinity of the position where the event occurred.

According to this feature, an image indicating that an event has occurred is composited with the image showing the vehicle body and the field in the vicinity of the vehicle body at the position where the event occurred or a position in the vicinity thereof, and displayed in the display unit. As such, the occurrence of an event can be shown in an easy-to-understand manner. This makes the driver aware of an event, e.g., that the grain tank has become full, a malfunction has occurred in the vehicle body, or the like, which makes it possible to improve the efficiency of the harvesting operations.

In the present invention, preferably, the harvester further includes a third compositing unit that generates a third composite image by compositing a map image with the second composite image generated by the second compositing unit, the map image being an image expressing a map indicating a point in the field corresponding to the related position, and the display control unit causes the third composite image generated by the third compositing unit to be displayed in the display unit.

According to this feature, a map indicating a point where an event has occurred is composited with an image showing the vehicle body and the field in the vicinity of the vehicle body, and displayed in the display unit. As such, the point where the event occurred can be shown to the driver in an easy-to-understand manner. This makes it possible for the driver to grasp, for example, at what point in the field the grain tank has become full. In other words, according to this feature, the driver is made aware of the point in the field where an event has occurred, as well as the state of the harvesting operations, which makes it possible to improve the efficiency of the harvesting operations.

As a means to solve the above-described fourth problem, a system according to the present invention includes: a harvester including a vehicle body that performs harvesting operations of a crop while traveling in a field and a camera that generates a shot image; a display unit that displays an image; a storage unit for storing vehicle body data indicating an external shape of the vehicle body; a first compositing unit that generates a first composite image based on the shot image generated by the camera and the vehicle body data stored in the storage unit, the first composite image being an image showing the vehicle body and the field around the vehicle body; a second compositing unit that generates a second composite image by compositing an information presentation image indicating information related to the harvesting operations with the first composite image generated by the first compositing unit at a related position, the related position being a position in the first composite image which position is related to the information presentation image; and a display control unit that causes the second composite image generated by the second compositing unit to be displayed in the display unit.

As a means to solve the above-described fourth problem, a program according to the present invention is a program for a harvester. The harvester includes a vehicle body that performs harvesting operations for a crop while traveling in a field, a camera that generates a shot image, a display unit that displays an image, and a storage unit for storing vehicle body data indicating an external shape of the vehicle body. The program causing a computer to implement: a first compositing function of generating a first composite image based on the shot image generated by the camera and the vehicle body data stored in the storage unit, the first composite image being an image showing the vehicle body and the field around the vehicle body; a second compositing function of generating a second composite image by compositing an information presentation image indicating information related to the harvesting operations with the first composite image generated by the first compositing unit at a related position, the related position being a position in the first composite image which position is related to the information presentation image; and a display control function that causes the second composite image generated by the second compositing function to be displayed in the display unit.

As a means to solve the above-described fourth problem, a recording medium according to the present invention is a recording medium in which is recorded a program for a harvester. The harvester includes a vehicle body that performs harvesting operations for a crop while traveling in a field, a camera that generates a shot image, a display unit that displays an image, and a storage unit for storing vehicle body data indicating an external shape of the vehicle body. The program causes a computer to implement: a first compositing function of generating a first composite image based on the shot image generated by the camera and the vehicle body data stored in the storage unit, the first composite image being an image showing the vehicle body and the field around the vehicle body; a second compositing function of generating a second composite image by compositing an information presentation image indicating information related to the harvesting operations with the first composite image generated by the first compositing unit at a related position, the related position being a position in the first composite image which position is related to the information presentation image; and a display control function that causes the second composite image generated by the second compositing function to be displayed in the display unit.

As a means to solve the above-described fourth problem, a method according to the present invention is a method for a harvester. The harvester including a vehicle body that performs harvesting operations for a crop while traveling in a field, a camera that generates a shot image, a display unit that displays an image, and a storage unit for storing vehicle body data indicating an external shape of the vehicle body. The method includes: a first compositing step of generating a first composite image based on the shot image generated by the camera and the vehicle body data stored in the storage unit, the first composite image being an image showing the vehicle body and the field around the vehicle body; a second compositing step of generating a second composite image by compositing an information presentation image indicating information related to the harvesting operations with the first composite image generated in the first compositing step at a related position, the related position being a position in the first composite image which position is related to the information presentation image; and a display control step of causing the second composite image generated in the second compositing step to be displayed in the display unit.

BRIEF DESCRIPTION OF THE DRAWINGS

FIG. 45 is a diagram illustrating an example of a composite image according to a variation on the sixth embodiment.

DETAILED DESCRIPTION OF PREFERRED EMBODIMENTS

First Embodiment

Figure 1:
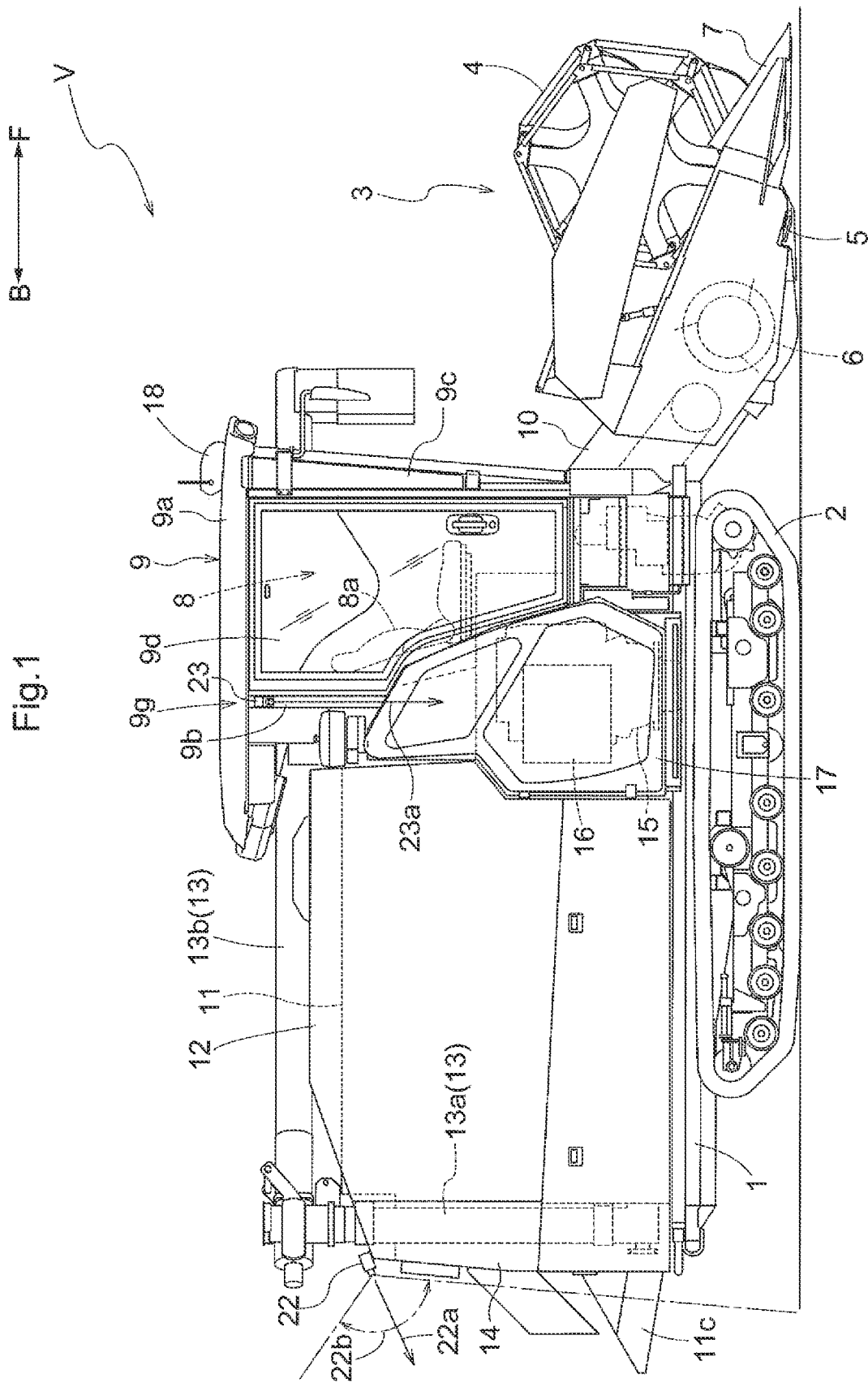
FIG. 1 is a right-side view of a vehicle body of a standard combine according to a first embodiment.

An embodiment of the present invention will be described on the basis of the drawings. In the following descriptions, the direction of an arrow F corresponds to a "vehicle body front side", the direction of an arrow B corresponds to a "vehicle body rear side", the direction of an arrow L corresponds to a "vehicle body left side", and the direction of an arrow R corresponds to a "vehicle body right side".

Overall Configuration of Combine

FIGS. 1 to 5 illustrate a standard combine, which is an example of a harvester. A vehicle body V of this standard combine includes a vehicle body frame 1, and a pair of crawler traveling devices 2 on the left and right sides. A mowing unit 3 (an example of a harvesting unit) that mows planted grain culm in a field is provided in a front part of the vehicle body V. The mowing unit 3 is provided with a raking reel 4 that rakes in the planted grain culm, a cutting blade 5 that cuts the planted grain culm, and a raking auger 6 that rakes in the cut grain culm. The mowing unit 3 is provided with a pair of dividers 7 on the left and right that divide the planted grain culm in the field into grain culm to be cut and grain culm not to be cut. The mowing unit 3 has a mowing width that is wider than a width of the vehicle body. A mowing frame 3a extending in the left-right direction is provided at a rear end part of the mowing unit 3.

A driving section 8, and a cabin 9 that encloses the driving section 8, are provided to the rear of the mowing unit 3 in the vehicle body V. The driving section 8 is located on the right side in a front part of the vehicle body V. A feeder 10 (an example of a transport unit) that transports a harvested crop harvested by the mowing unit 3 is provided to the left of the driving section 8.

A threshing device 11 that threshes the harvested crop transported by the feeder 10 is provided to the rear of the feeder 10. The threshing device 11 includes a main body part 11a and a top panel 11b that opens and closes an opening provided in an upper surface of the main body part 11a. A left end part of the top panel 11b is supported by the main body part 11a in a state where the top panel 11b can rotate about a rotation axis extending in a front-back direction. A waste straw processing device 11c that cuts waste straw is provided in a rear part of the threshing device 11.

A grain tank 12 that stores grain obtained by the threshing device 11 is provided to the rear of the driving section 8 and to the right of the threshing device 11. A discharge device 13 that discharges the grain stored in the grain tank 12 to outside is provided to the rear of the grain tank 12. A rear cover part 14 that covers the grain tank 12 and the discharge device 13 from behind is provided in a rear part of the vehicle body V.

The discharge device 13 is provided with a vertical transport unit 13a connected to the grain tank 12 and extending along an up-down direction, and a horizontal transport unit 13b connected to an upper end of the vertical transport unit 13a so as to be capable of pivoting vertically. The discharge device 13 can be swiveled about a swivel axis center extending in the up-down direction.

A driver's seat 8a in which a driver sits is provided in the driving section 8. The cabin 9 is provided with a roof part 9a and a cabin frame 9b that supports the roof part 9a. The cabin frame 9b supports a windshield 9c, a door 9d, a side glass 9e, and the like of the cabin 9.

An engine 15 is provided below the driver's seat 8a. A radiator 16 is provided on the opposite side of the feeder 10 to the engine 15, i.e., to the right of the engine 15. A dust-resistant case 17 (an example of a dust-resistant unit) that removes dust from outside air supplied to the radiator 16 is provided on the opposite side of the feeder 10 to the radiator 16, i.e., to the right of the radiator 16.

A satellite positioning module 18 that receives a GNSS (Global Navigation Satellite System) signal from a satellite and detects the self vehicle position on the basis of that signal is provided. GPS, QZSS, Galileo, GLONASS, BeiDou, or the like can be used as the GNSS. The satellite positioning module 18 is provided on the left side at the front part of the driving section 8. The satellite positioning module 18 is provided above the roof part 9a.

Cameras

A front camera 21, a rear camera 22, a right camera 23 (an example of a first side camera), and a left camera 24 (an example of a second side camera) are provided on the vehicle body V of the standard combine. These four cameras generate shot images and output the images to an image processing device 30 (described below). In the present embodiment, the four cameras mainly shoot images of fields, ridges, roads, and the like around the vehicle body V, and may also shoot images of parts of the vehicle body V. As such, part of the vehicle body V may be shown in the shot images. In the present embodiment, the shot images, a preliminary composite image (described later), and a composite image may be still images, or may be moving images and video obtained by sequentially displaying still images. Assuming an optical axis (shooting direction) is oriented in the horizontal direction, a shooting range (angle of view) of each camera is 180° or more (e.g., 195°) in the horizontal direction and 100° or more (e.g., 120°) in the vertical direction central to the optical axis.

Placement of Front Camera

Figure 2:
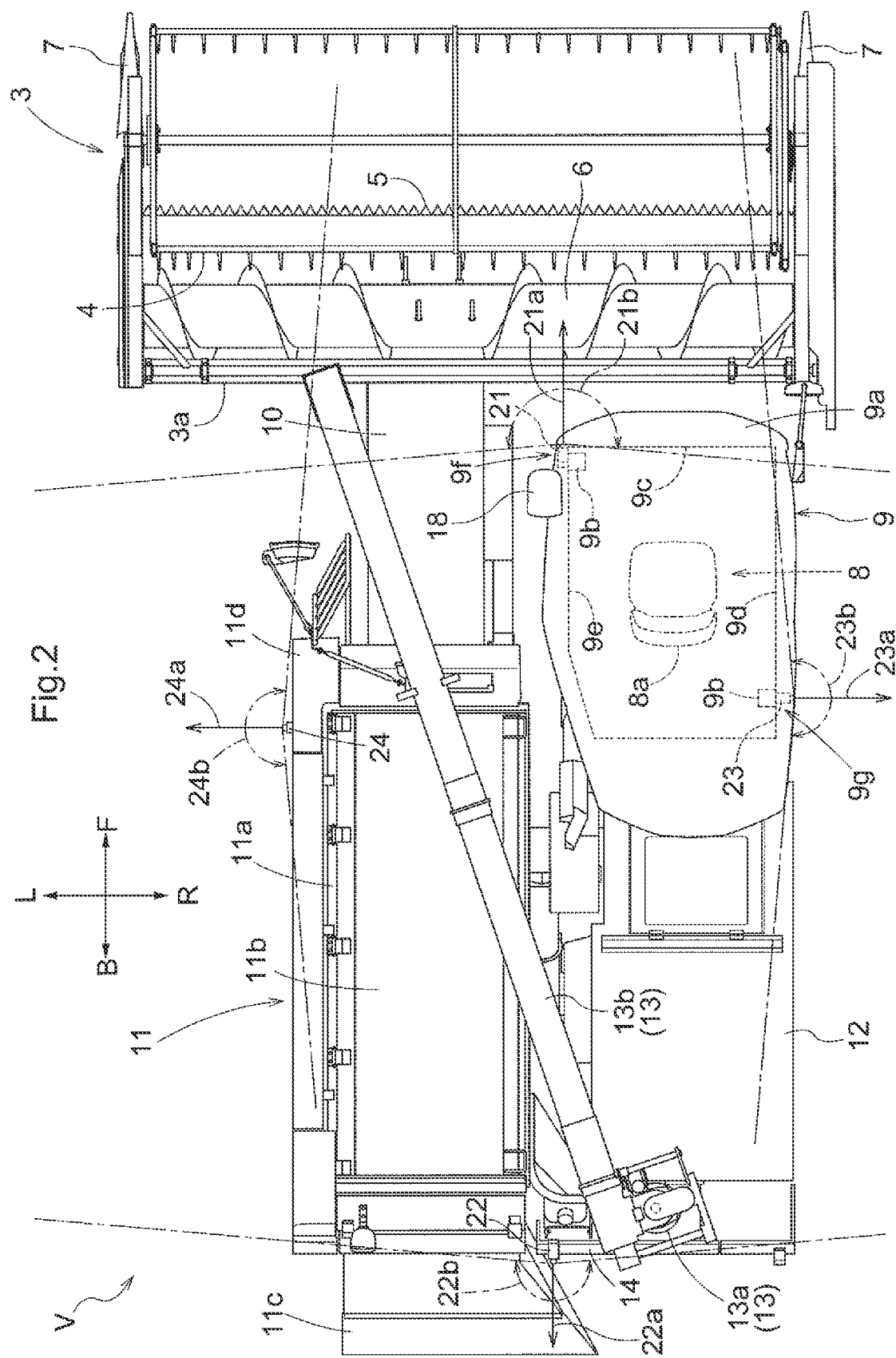
FIG. 2 is a plan view of the vehicle body of the standard combine according to the first embodiment.
Figure 3:
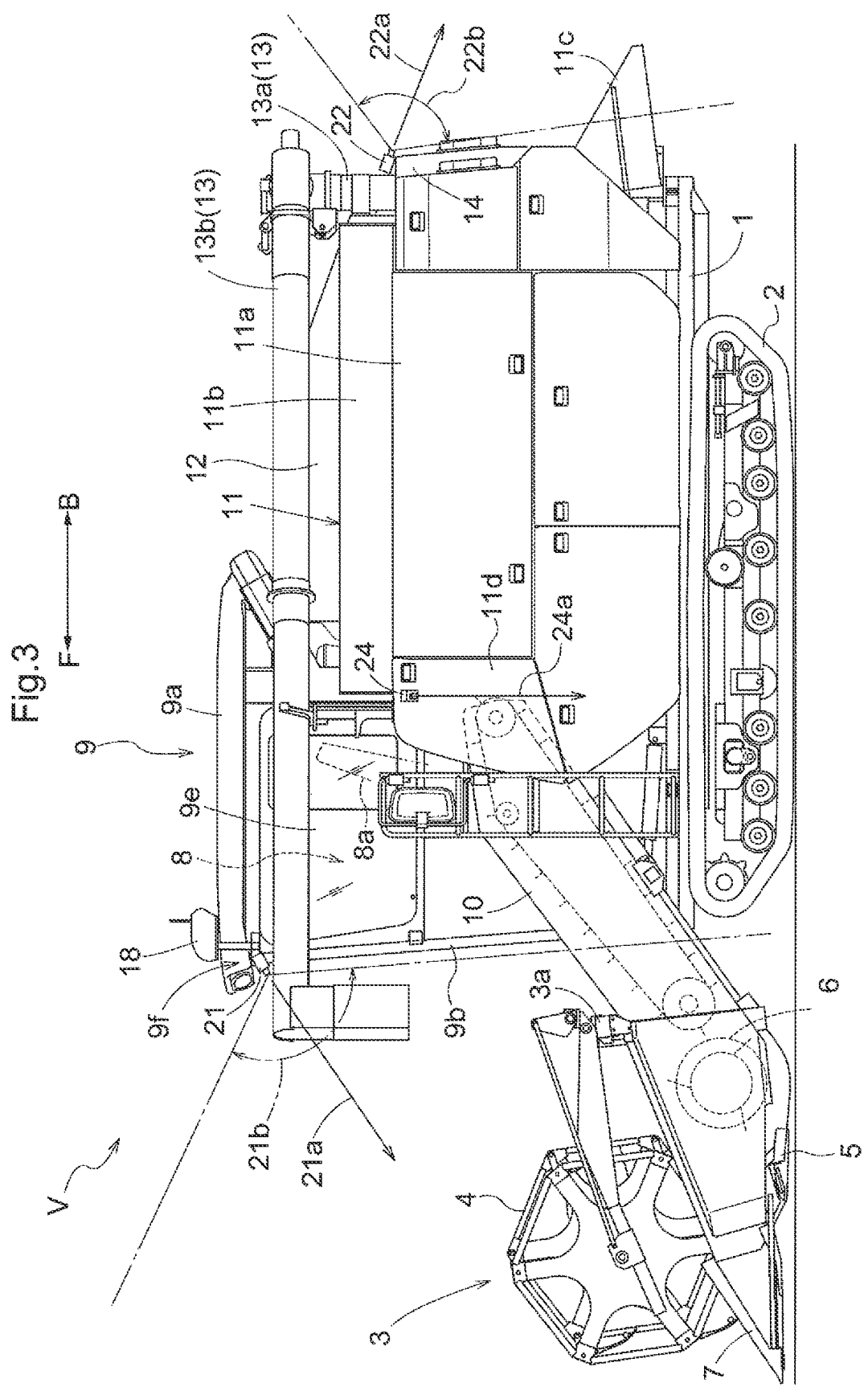
FIG. 3 is a left-side view of the vehicle body of the standard combine according to the first embodiment.
Figure 4:
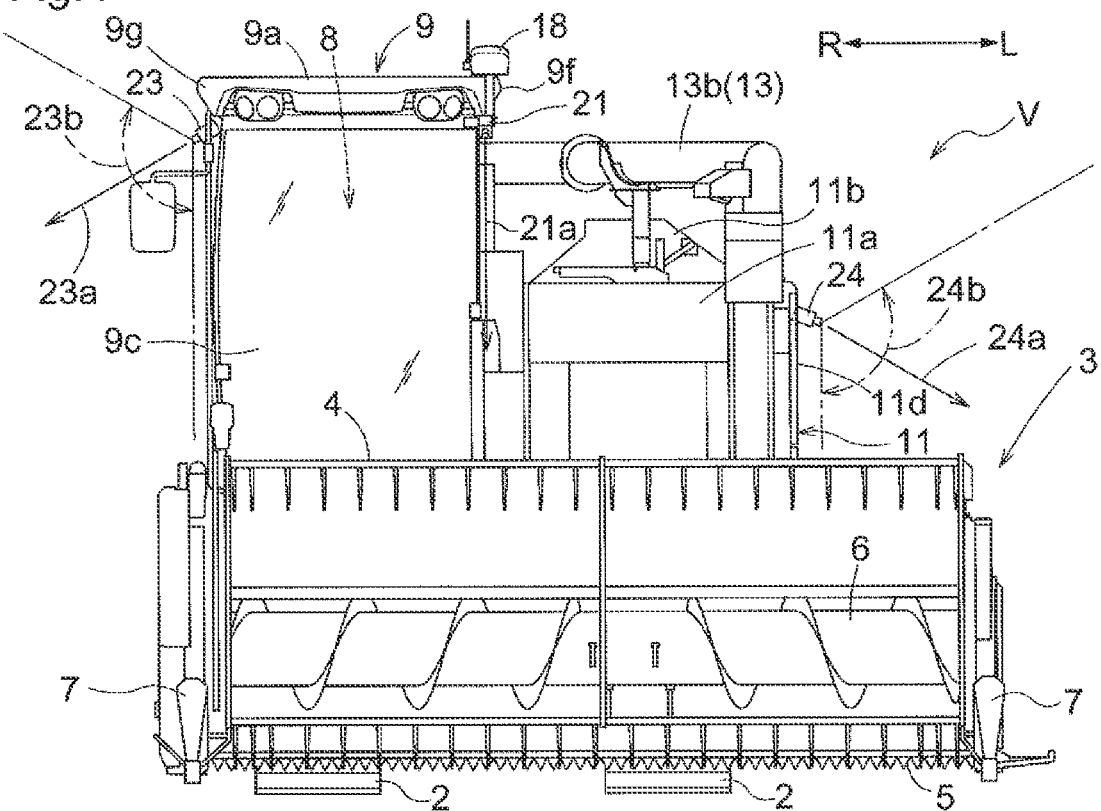
FIG. 4 is a front view of the vehicle body of the standard combine according to the first embodiment.
Figure 5:
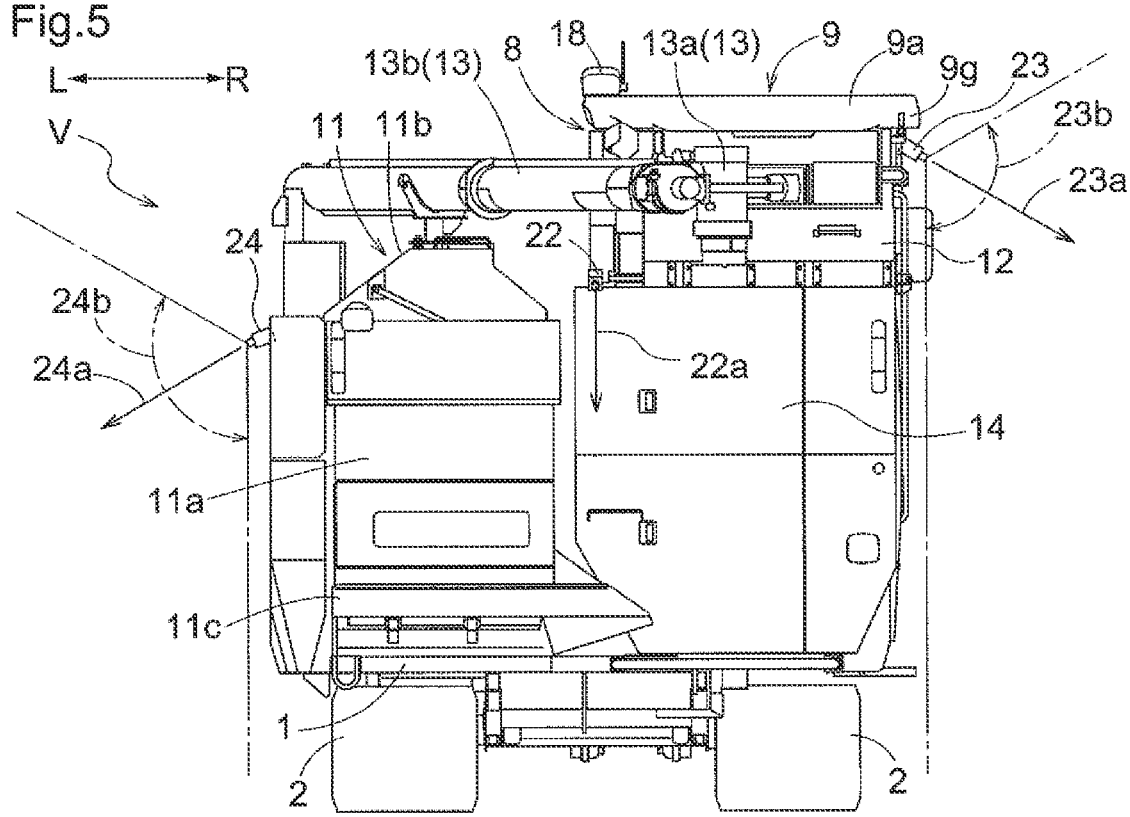
FIG. 5 is a rear view of the vehicle body of the standard combine according to the first embodiment.

As illustrated in FIGS. 2 to 4, the front camera 21 is provided in a front part of the driving section 8 so as to be located in a central part of the vehicle body V in the left-right direction. Specifically, the front camera 21 is provided in the front part of the driving section 8, adjacent to the side of the threshing device 11. In other words, the front camera 21 is placed on a left side surface of the front part of the driving section 8.

The front camera 21 is supported by the cabin frame 9b using a stay. The roof part 9a provided in the driving section 8 includes a projecting part 9f that projects further to the left than the side glass 9e. The front camera 21 is provided directly below the projecting part 9f. The front camera 21 is provided at a position lower than the satellite positioning module 18.

A shooting direction 21a of the front camera 21 is oriented diagonally downward toward the front, i.e., toward the mowing unit 3. The front camera 21 is provided so that the entire mowing unit 3 and a region around the mowing unit 3 (part of the field) are included in a shooting range 21b thereof. In other words, the shooting range 21b of the front camera 21 includes the mowing frame 3a, the raking reel 4, the raking auger 6, the dividers 7, part of the feeder 10, a region to the front of the mowing unit 3, a region to the rear of the mowing unit 3, a region to the right of the mowing unit 3, and a region to the left of the mowing unit 3.

Placement of Rear Camera

As illustrated in FIGS. 1 to 3 and 5, the rear camera 22 is provided in an upper part of the rear cover part 14 so as to be located in a central part of the vehicle body V in the left-right direction. Specifically, the rear camera 22 is provided at a left end part of the upper surface of the rear cover part 14. The rear camera 22 is supported by the rear cover part 14 using a stay. The rear camera 22 is provided at a position lower than the satellite positioning module 18.

A shooting direction 22a of the rear camera 22 is oriented diagonally downward toward the rear, i.e., toward the rear of the waste straw processing device 11c. The rear camera 22 is provided so that the entire waste straw processing device 11c and a region around the waste straw processing device 11c (part of the field) are included in a shooting range 22b thereof. In other words, the shooting range 22b of the rear camera 22 includes the waste straw processing device 11c, a region to the rear of the waste straw processing device 11c, a region to the right of the waste straw processing device 11c, and a region to the left of the waste straw processing device 11c.

Placement of Right Camera

As illustrated in FIGS. 1, 2, 4, and 5, the right camera 23 is provided in a right side part of the driving section 8 so as to be located in a central part of the vehicle body V in the front-back direction. Specifically, the right camera 23 is provided in the rear part of the driving section 8, adjacent on the right side. In other words, the right camera 23 is placed on a right side surface of the rear part of the driving section 8. The right camera 23 is provided further to the rear than the driver's seat 8a included in the driving section 8.

The right camera 23 is supported by the cabin frame 9b using a stay. The roof part 9a provided in the driving section 8 includes a projecting part 9g that projects further to the right than the door 9d. The right camera 23 is provided directly below the projecting part 9g. The right camera 23 is provided above the dust-resistant case 17. The right camera 23 is provided at a position lower than the satellite positioning module 18.

A shooting direction 23a of the right camera 23 is oriented diagonally downward toward the right, i.e., toward the right of the driving section 8. The right camera 23 is provided so that a region to the right of the driving section 8, a region to the right of the grain tank 12, and a region to the right of the mowing unit 3 are included in a shooting range 23b thereof.

Placement of Left Camera

As illustrated in FIGS. 2 to 5, the left camera 24 is provided in a left side part of the threshing device 11 so as to be located in a central part of the vehicle body V in the front-back direction. Specifically, the left camera 24 is provided in the front part of the threshing device 11, adjacent on the left side. In other words, the left camera 24 is placed on a left side surface of the front part of the threshing device 11.

The left camera 24 is supported by the threshing device 11 using a stay. Specifically, the left camera 24 is provided on an upper part of a cover 11d provided on a left side part of the threshing device 11 so as to be capable of opening and closing. The left camera 24 is provided at a position lower than the satellite positioning module 18.

A shooting direction 24a of the left camera 24 is oriented diagonally downward toward the left, i.e., toward the left of the threshing device 11. The left camera 24 is provided so that a region to the left of the threshing device 11, a region to the left of the feeder 10, and a region to the left of the mowing unit 3 are included in a shooting range 24b thereof.

Image Processing Device

Figure 6:
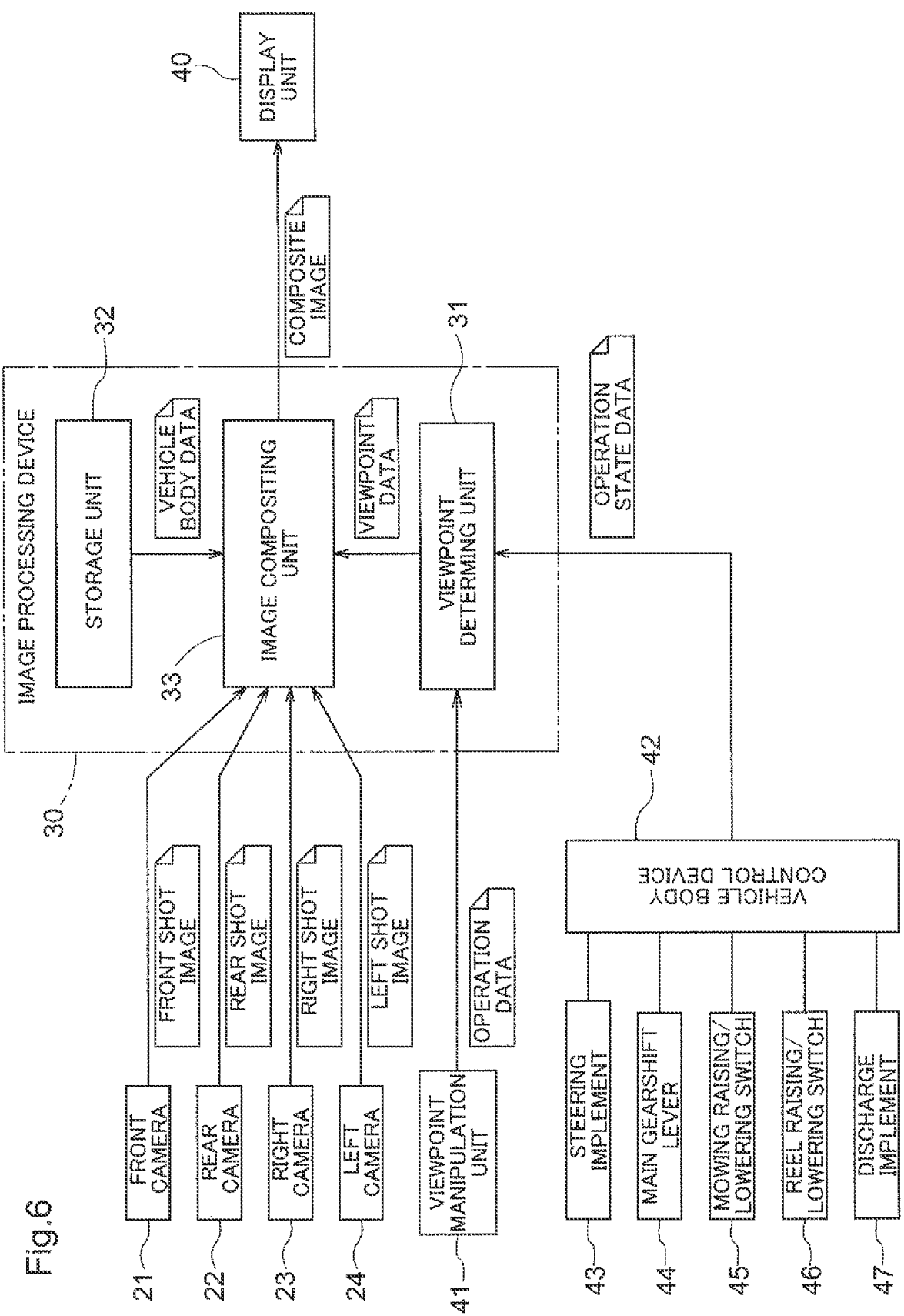
FIG. 6 is a block diagram illustrating a control configuration according to the first embodiment.

Configurations pertaining to the image processing device 30 provided in the standard combine will be described hereinafter with reference to the block diagram in FIG. 6.

The vehicle body V of the standard combine is provided with the image processing device 30 and a display unit 40. The image processing device 30 generates a composite image on the basis of the shot images output from the front camera 21, the rear camera 22, the right camera 23, and the left camera 24, and outputs the composite image to the display unit 40. The display unit 40 displays the composite image output by the image processing device 30. The image processing device 30 is configured including a microcomputer, and executes image processing according to a preset program. The image processing device 30 and the display unit 40 are provided in the driving section 8.

The front camera 21, the rear camera 22, the right camera 23, and the left camera 24 are connected to the image processing device 30. A front shot image from the front camera 21, a rear shot image from the rear camera 22, a right shot image from the right camera 23, and a left shot image from the left camera 24 are input to the image processing device 30.

A viewpoint manipulation unit 41 and a vehicle body control device 42 are connected to the image processing device 30. The viewpoint manipulation unit 41 accepts operations for changing/specifying a viewpoint from an operator and outputs operation data to the image processing device 30. The viewpoint manipulation unit 41 may be, for example, an implement such as a button, a knob, a joystick, or the like, or an input means such as a touch panel provided on the display unit 40.

The vehicle body control device 42 outputs, to the image processing device 30, operation state data indicating an operation state of the vehicle body V of the standard combine. The operation state data includes data indicating operation states of the vehicle body V such as moving forward, reversing, turning, stopped, and the like; data indicating operation states of the mowing unit 3 such as operating, stopped, working position, non-working position, swinging position, and the like; and data indicating operation states of the discharge device 13 such as operating, stopped, retracted position, discharge position, swivel position, and the like.

Implements such as a steering implement 43, a main gearshift lever 44, a mowing raising/lowering switch 45, a reel raising/lowering switch 46, a discharge implement 47, and the like are connected to the vehicle body control device 42. The vehicle body control device 42 generates the operation state data on the basis of operations input to these implements, and outputs the data to the image processing device 30. Note that the vehicle body control device 42 may generate the operation state data on the basis of outputs from sensors (not shown) provided in these implements, the mowing unit 3, the discharge device 13, and the like.

The image processing device 30 includes a viewpoint determining unit 31, a storage unit 32, and an image compositing unit 33.

On the basis of the operation data output from the viewpoint manipulation unit 41 or the operation state data input from the vehicle body control device 42, the viewpoint determining unit 31 determines a composite viewpoint to serve as a viewpoint of the composite image generated by the image compositing unit 33, and outputs data indicating the composite viewpoint to the image compositing unit 33 as viewpoint data. Specifically, the viewpoint determining unit 31 determines the composite viewpoint as a viewpoint of viewing the vehicle body V from directly above, a viewpoint viewing the vehicle body V from diagonally above, and a viewpoint viewing the vehicle body V from the front/rear or the left/right. The "viewpoint viewing the vehicle body V from diagonally above" is, for example, a viewpoint viewing the vehicle body V diagonally above from the front, a viewpoint viewing the vehicle body V diagonally above from the rear, a viewpoint viewing the vehicle body V diagonally above from the right, a viewpoint viewing the vehicle body V diagonally above from the left, or the like.

The storage unit 32 for storing vehicle body data indicating the external shape of the vehicle body V. The vehicle body data is data expressing the three-dimensional shape of the vehicle body V, e.g., data expressing a 3D model of the vehicle body V. The vehicle body data includes data expressing the external shape of the crawler traveling devices 2, data expressing the external shape of the mowing unit 3, and data expressing the external shape of the discharge device 13.

The vehicle body data also includes data expressing the external shape of the mowing unit 3 in the working position, data expressing the external shape of the mowing unit 3 in the non-working position, data expressing the external shape of the discharge device 13 in the retracted position, and data expressing the external shape of the discharge device 13 in the discharge position. The vehicle body data is prepared in advance and stored in the storage unit 32.

On the basis of the four shot images input from the front camera 21, the rear camera 22, the right camera 23, and the left camera 24, and the vehicle body data stored in the storage unit 32, the image compositing unit 33 generates the composite image, which is an image seen from the viewpoint determined by the viewpoint determining unit 31 and showing the vehicle body V and the surroundings thereof, and outputs the composite image to the display unit 40. Some parts of the vehicle body V captured by the cameras will appear in the composite image. However, if the viewpoint determined by the viewpoint determining unit 31 is a viewpoint from which one of those parts of the vehicle body V cannot be seen, those parts will not appear in the composite image.

First, the image compositing unit 33 generates the preliminary composite image by performing image processing including viewpoint conversion and compositing in the shot images from the four cameras, and converting the composite viewpoint of the viewpoint data input from the viewpoint determining unit 31 into an image. The preliminary composite image is an image obtained by compositing the shot images shot and generated by the four cameras into a single image. Planar projection transformation using homography matrices, projection processing in three-dimensional space, and the like are specific methods for the image processing.

Next, the image compositing unit 33 reads out the vehicle body data from the storage unit 32 and generates an image of the vehicle body V viewed from the viewpoint indicated by the viewpoint data (a vehicle body image) from the vehicle body data. At this time, referring to the operation state data input from the vehicle body control device 42, the image compositing unit 33 generates a vehicle body image that matches the operation state using the vehicle body data based on the operation states of the mowing unit 3 and the discharge device 13. The image compositing unit 33 then generates the composite image by compositing the preliminary composite image generated earlier with the vehicle body image.

Example of Composite Image

Figure 7:
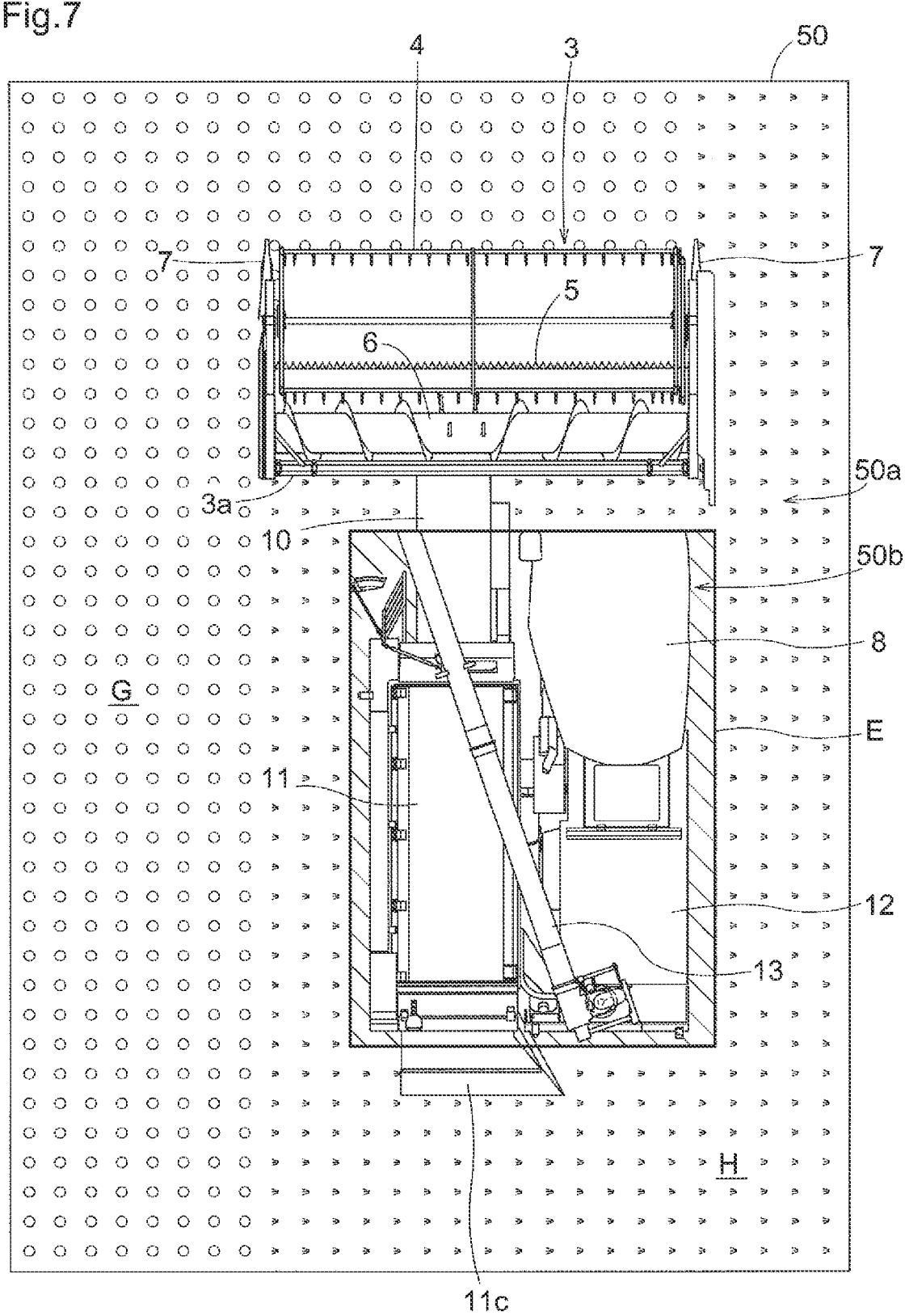
FIG. 7 is a diagram illustrating an example of a composite image according to the first embodiment.

Assume that the standard combine is performing harvesting operations while traveling forward in a field. An example of the composite image generated by the image compositing unit 33 at this time is illustrated in FIG. 7 as a composite image 50.

The operation state of the vehicle body V at this time is that the vehicle body V is traveling straight forward, the mowing unit 3 is in the working position and is operating, and the discharge device 13 is in the retracted position and is stopped. The vehicle body control device 42 outputs, to the image processing device 30, operation state data indicating the stated operation state of the vehicle body V.

Assume that the viewpoint manipulation unit 41 has accepted an operation specifying a planar viewpoint. The viewpoint manipulation unit 41 outputs operation data indicating the planar viewpoint to the viewpoint determining unit 31. On the basis of accepting the input of the operation data, the viewpoint determining unit 31 of the image processing device 30 determines the viewpoint of the composite image composited by the image compositing unit 33 (the composite viewpoint) as the planar viewpoint, and outputs viewpoint data to that effect to the image compositing unit 33.

The image compositing unit 33 generates the preliminary composite image by performing image processing including viewpoint conversion to the planar viewpoint and compositing in the shot images input from the four cameras. Next, the image compositing unit 33 generates the vehicle body image by referring to the operation state data input from the vehicle body control device 42 and the viewpoint data input from the viewpoint determining unit 31. Specifically, the vehicle body image showing the vehicle body V from the planar viewpoint is generated using the data expressing the external shapes of the mowing unit 3 in the working position and the feeder 10, the data expressing the external shape of the discharge device 13 in the retracted position, and the vehicle body data pertaining to remaining parts of the vehicle body V. The image compositing unit 33 then generates the composite image 50 by compositing the vehicle body image with the preliminary composite image.

FIG. 7 illustrates the composite image 50 generated by the image compositing unit 33. A region 50a outside a boundary line E in the composite image 50 is an image originating from the preliminary composite image, and is an image originating from the shot images shot by the four cameras. The shot mowing unit 3 (the mowing frame 3a, the raking reel 4, the raking auger 6, and the dividers 7), the feeder 10, the waste straw processing device 11c, the region to the rear of the mowing unit 3, the region to the rear of the waste straw processing device 11c, an already-mowed area H to the right and to the rear of the vehicle body V, and an unmowed area G to the left and to the front of the vehicle body V are indicated in this region 50a. A region 50b inside the boundary line E in the composite image 50 is a region originating from the vehicle body image. The driving section 8, the feeder 10, the threshing device 11, the grain tank 12, the discharge device 13, and the like are shown in the region 50b.

Figure 8:
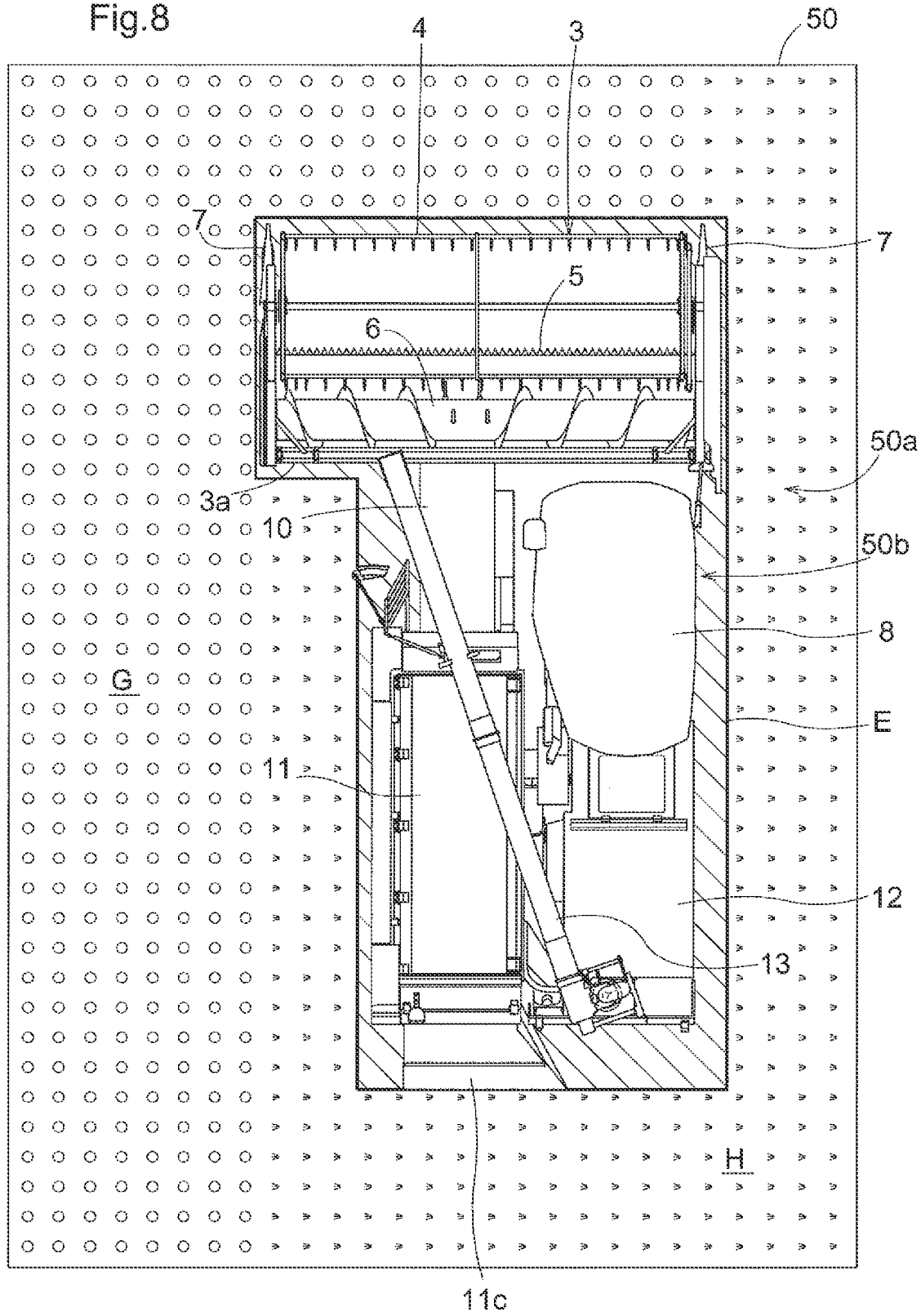
FIG. 8 is a diagram illustrating an example of a composite image according to the first embodiment.

FIG. 8 illustrates another example of the composite image 50. As in the foregoing example, the region 50a outside the boundary line E in the composite image 50 is an image originating from the preliminary composite image, and is an image originating from the shot images shot by the four cameras. A region 50b inside the boundary line E in the composite image 50 is a region originating from the vehicle body image. In the example in FIG. 8, the already-mowed area H to the right and to the rear of the vehicle body V, and the unmowed area G to the left and to the front of the vehicle body V, are shown in the region 50a. The mowing unit 3 (the mowing frame 3a, the raking reel 4, the raking auger 6, and the dividers 7), the driving section 8, the feeder 10, the threshing device 11, the waste straw processing device 11c, the grain tank 12, the discharge device 13, and the like are shown in the region 50b.

In other words, in the example in FIG. 7, the mowing unit 3, the mowing frame 3a, the raking reel 4, the raking auger 6, the dividers 7, and the waste straw processing device 11c are shown, in the composite image 50, in images captured by the front camera 21 and the rear camera 22. In the example in FIG. 8, the mowing unit 3, the mowing frame 3a, the raking reel 4, the raking auger 6, the dividers 7, and the waste straw processing device 11c are shown, in the composite image 50, in an image generated on the basis of the vehicle body data (the vehicle body image). The change in the image format described above can be achieved by changing the image processing method, settings, and the like used by the image compositing unit 33.

Switching Viewpoint of Composite Image

In the standard combine according to the present embodiment described thus far, the viewpoint of the composite image displayed in the display unit 40 can be switched at any time in response to an operation made by the driver through the viewpoint manipulation unit 41, a change in the operation state of the vehicle body V, or the like. Specifically, in response to accepting an operation from the driver specifying a viewpoint, the viewpoint manipulation unit 41 outputs operation data indicating that viewpoint to the viewpoint determining unit 31. In response to a change in the operation state of the vehicle body V, the vehicle body control device 42 outputs operation state data indicating the operation state of the vehicle body V to the viewpoint determining unit 31. Each time the input of the operation data and the operation state data is accepted, the viewpoint determining unit 31 determines the composite viewpoint and outputs viewpoint data indicating the composite viewpoint to the image compositing unit 33. The image compositing unit 33 generates the composite image so that the viewpoint of the generated composite image is the composite viewpoint indicated by the input viewpoint data, and outputs the composite image to the display unit 40. The viewpoint of the composite image displayed in the display unit 40 can be switched in this manner.

The viewpoint determining unit 31 may be configured such that when determining the composite viewpoint in accordance with the operation state data input from the vehicle body control device 42, the viewpoint determining unit 31 determines the composite viewpoint by selecting a viewpoint from a plurality of viewpoints viewing the vehicle body V diagonally from above. For example, the viewpoint determining unit 31 may be configured to determine a viewpoint viewing the vehicle body V diagonally above from the rear as the composite viewpoint in response to the input operation state data indicating that the vehicle body V is traveling forward, determine a viewpoint viewing the vehicle body V diagonally above from the front as the composite viewpoint in response to the vehicle body V traveling in reverse, and determine a viewpoint viewing the vehicle body V diagonally above from the left as the composite viewpoint in response to the discharge device 13 discharging grain.

Figure 9:
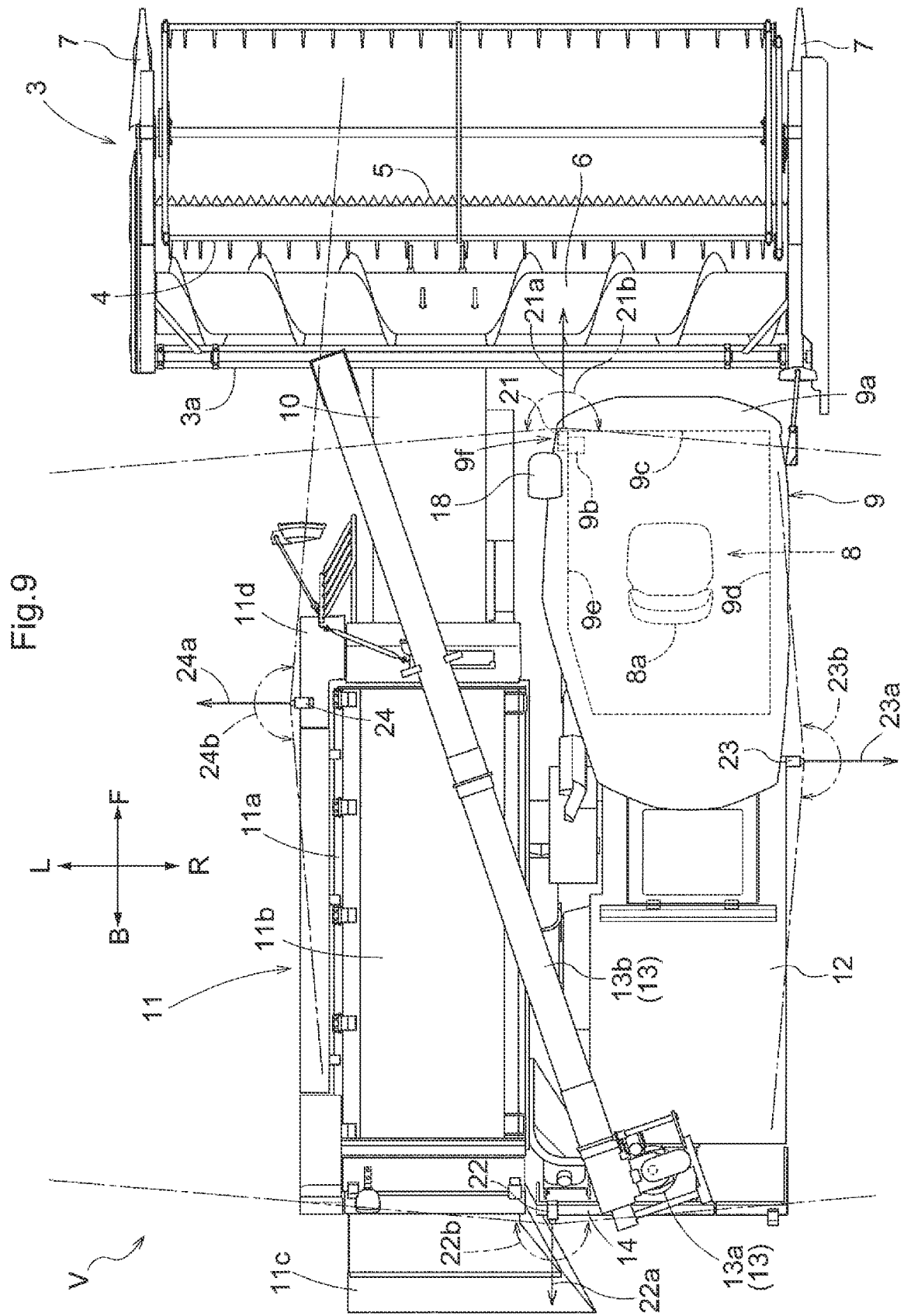
FIG. 9 is a plan view of the vehicle body of the standard combine according to a variation on the first embodiment.
Figure 10:
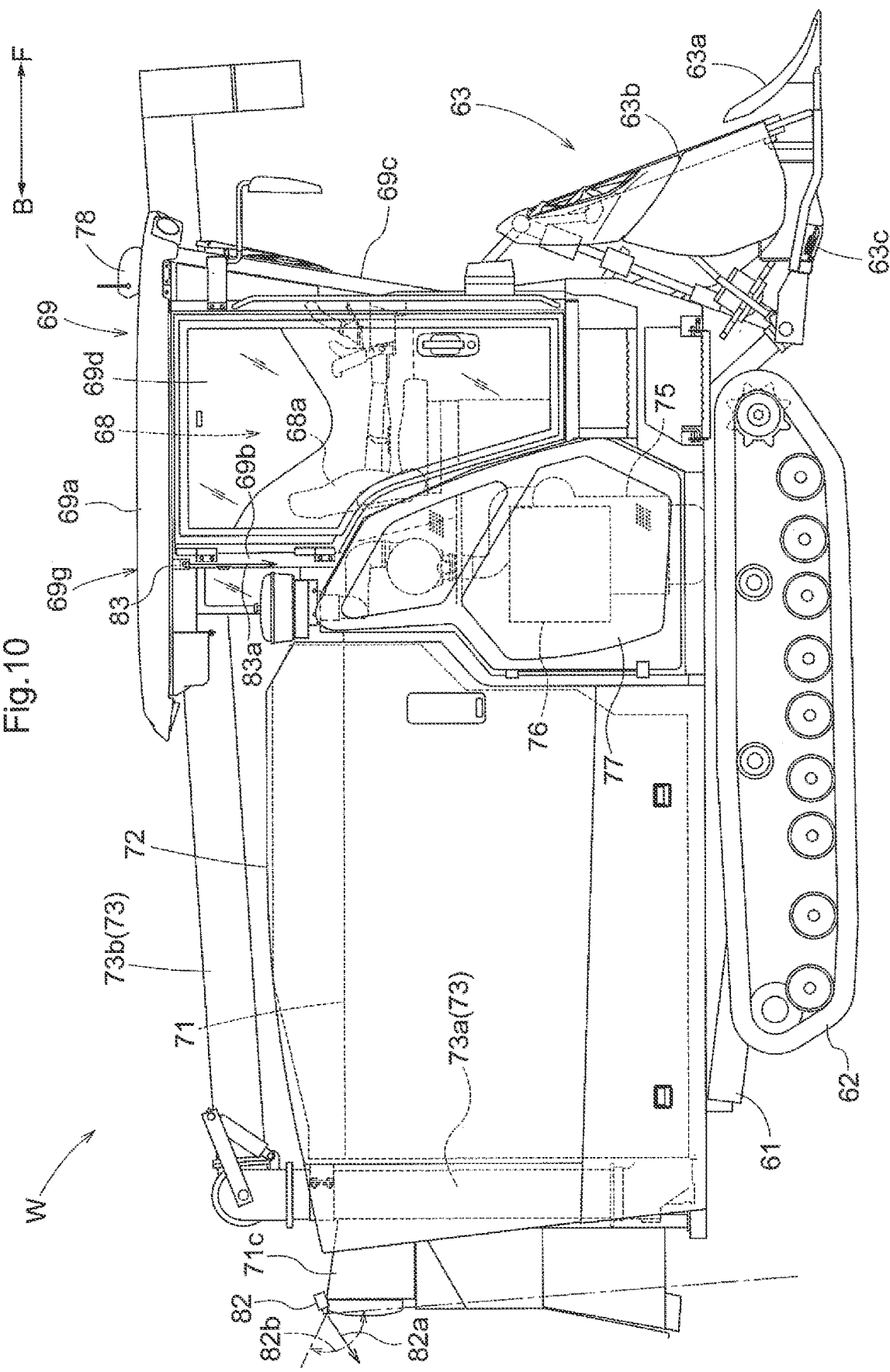
FIG. 10 is a right-side view of a vehicle body of a head-feeding combine according to a second embodiment.

Variations on First Embodiment (1) In the following descriptions, configurations that are the same as those in the foregoing embodiment may be given the same reference signs, and may not be described. FIG. 9 illustrates another form of the standard combine. In this standard combine, the right camera 23 is provided on a right side part of the grain tank 12 so as to be located in a central part of the vehicle body V in the front-back direction. Specifically, the right camera 23 is provided in the front part of the grain tank 12, adjacent on the right side. In other words, the right camera 23 is placed on a right side surface of the front part of the grain tank 12. The right camera 23 is supported by the grain tank 12 using a stay.

The left camera 24 is provided in a front part of the threshing device 11, on a left-side part of the top panel 11b on the upper surface of the main body part 11a, so as to be located in a central part of the vehicle body V in the front-back direction. In other words, the left camera 24 is located further to the left than the top panel 11b.

(2) In the foregoing embodiment, the rear cover part 14 covers both the grain tank 12 and the discharge device 13 from behind, but a form in which the rear cover part 14 covers only one of the grain tank 12 and the discharge device 13 is also possible.

(2) In the foregoing first embodiment, four cameras are provided on the standard combine and a head-feeding combine. There may be five or more cameras. In other words, in addition to the front camera 21, the rear camera 22, the right camera 23, and the left camera 24, a camera that shoots part of the vehicle body, a camera that shoots the field below the vehicle body, or the like may be provided in the standard combine and the head-feeding combine, and shot images from those cameras may be shown in the composite image 50.

Second Embodiment

Another embodiment of the present invention will be described on the basis of the drawings. FIGS. 10 to 14 illustrate a head-feeding combine, which is an example of a harvester. A vehicle body W of this head-feeding combine includes a vehicle body frame 61, and a pair of crawler traveling devices 62 on the left and right sides. A mowing unit 63 (an example of a harvesting unit) that mows planted grain culm in a field is provided in a front part of the vehicle body W.

A driving section 68, and a cabin 69 that encloses the driving section 68, are provided to the rear of the mowing unit 63 in the vehicle body W. The driving section 68 is located on the right side in a front part of the vehicle body W. A transport unit 70 that transports a harvested crop harvested by the mowing unit 63 is provided to the left of the driving section 68.

A threshing device 71 that threshes the harvested crop transported by the transport unit 70 is provided to the rear of the transport unit 70. A waste straw processing device 71c that cuts waste straw is provided in a rear part of the threshing device 71.

A grain tank 72 that stores grain obtained by the threshing device 71 is provided to the rear of the driving section 68 and to the right of the threshing device 71. A discharge device 73 that discharges the grain stored in the grain tank 72 to outside is provided to the rear of the grain tank 72.

The discharge device 73 is provided with a vertical transport unit 73a connected to the grain tank 72 and extending along an up-down direction, and a horizontal transport unit 73b connected to an upper end of the vertical transport unit 73a so as to be capable of pivoting vertically. The discharge device 73 can be swiveled about a swivel axis center extending in the up-down direction.

A driver's seat 68a in which a driver sits is provided in the driving section 68. The cabin 69 is provided with a roof part 69a and a cabin frame 69b that supports the roof part 69a. The cabin frame 69b supports a windshield 69c, a door 69d, a side glass 69e, and the like of the cabin 69.

An engine 75 is provided below the driver's seat 68a. A radiator 76 is provided on the opposite side of the mowing unit 63 to the engine 75, i.e., to the right of the engine 75. A dust-resistant case 77 (an example of a dust-resistant unit) that removes dust from outside air supplied to the radiator 76 is provided on the opposite side of the mowing unit 63 to the radiator 76, i.e., to the right of the radiator 76.

A satellite positioning module 78 that receives a GNSS (Global Navigation Satellite System) signal from a satellite and detects the self vehicle position on the basis of that signal is provided. GPS, QZSS, Galileo, GLONASS, BeiDou, or the like can be used as the GNSS. The satellite positioning module 78 is provided on the left side at the front part of the driving section 68. The satellite positioning module 78 is provided above the roof part 69a.

The mowing unit 63 is provided with a pair of dividers 63a on the left and right that divide the planted grain culm in the field into grain culm to be cut and grain culm not to be cut, a lifting device 63b that lifts the planted grain culm, a cutting blade 63c that cuts the planted grain culm, and a merging transport unit 63d that merges the cut grain culm and transports the cut grain culm to the transport unit 70.

The transport unit 70 includes a first transport device 70a that takes the cut grain culm from the merging transport unit 63d of the mowing unit 63 and transports the cut grain culm toward the threshing device 71, and a second transport device 70b that takes the cut grain culm from the first transport device 70a and transports the cut grain culm toward the threshing device 71. The first transport device 70a and the second transport device 70b transport the base side parts of the cut grain culm. The first transport device 70a is configured so that the depth of processing can be adjusted by changing the attitude thereof.

A feed chain 70c that transports the cut grain culm transported by the second transport device 70b of the transport unit 70 to the rear, and a rail stand 70d that supports the cut grain culm along with the feed chain 70c at a position vertically opposite to the feed chain 70c, are provided. The threshing device 71 threshes the cut grain culm transported by the feed chain 70c.

Cameras

A front camera 81, a rear camera 82, a right camera 83 (an example of a first side camera), and a left camera 84 (an example of a second side camera) are provided in the vehicle body W of the head-feeding combine. These four cameras generate shot images and output the images to the image processing device 30 included in the vehicle body W. In the present embodiment, the four cameras mainly shoot images of fields, ridges, roads, and the like around the vehicle body W, and may also shoot images of parts of the vehicle body W. As such, part of the vehicle body W may be shown in the shot images. In the present embodiment, the shot images, a preliminary composite image (described later), and a composite image may be still images, or may be moving images and video obtained by sequentially displaying still images. Assuming an optical axis (shooting direction) is oriented in the horizontal direction, a shooting range (angle of view) of each camera is 180° or more (e.g., 195°) in the horizontal direction and 100° or more (e.g., 120°) in the vertical direction central to the optical axis.

Placement of Front Camera

Figure 11:
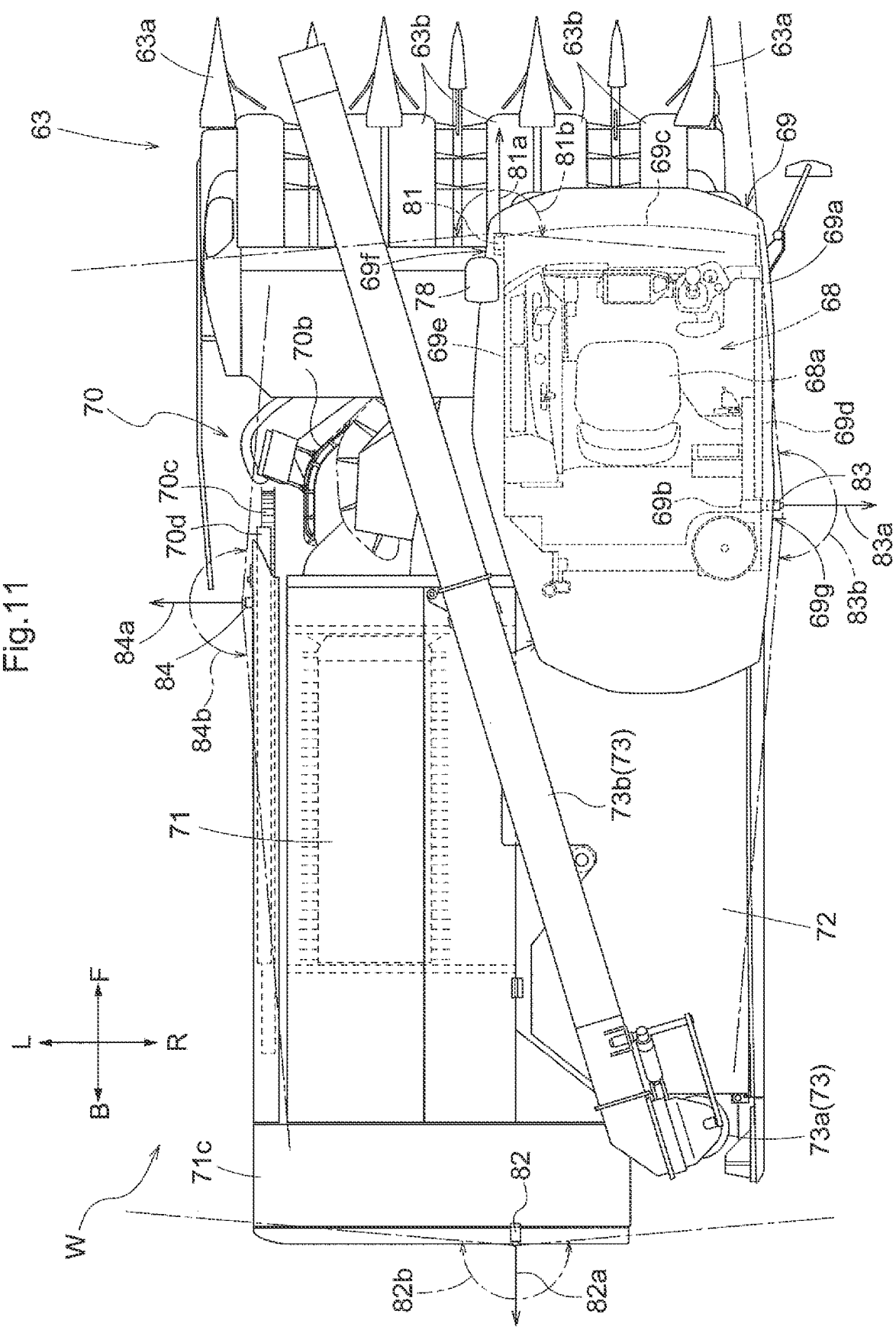
FIG. 11 is a plan view of the vehicle body of the head-feeding combine according to the second embodiment.
Figure 12:
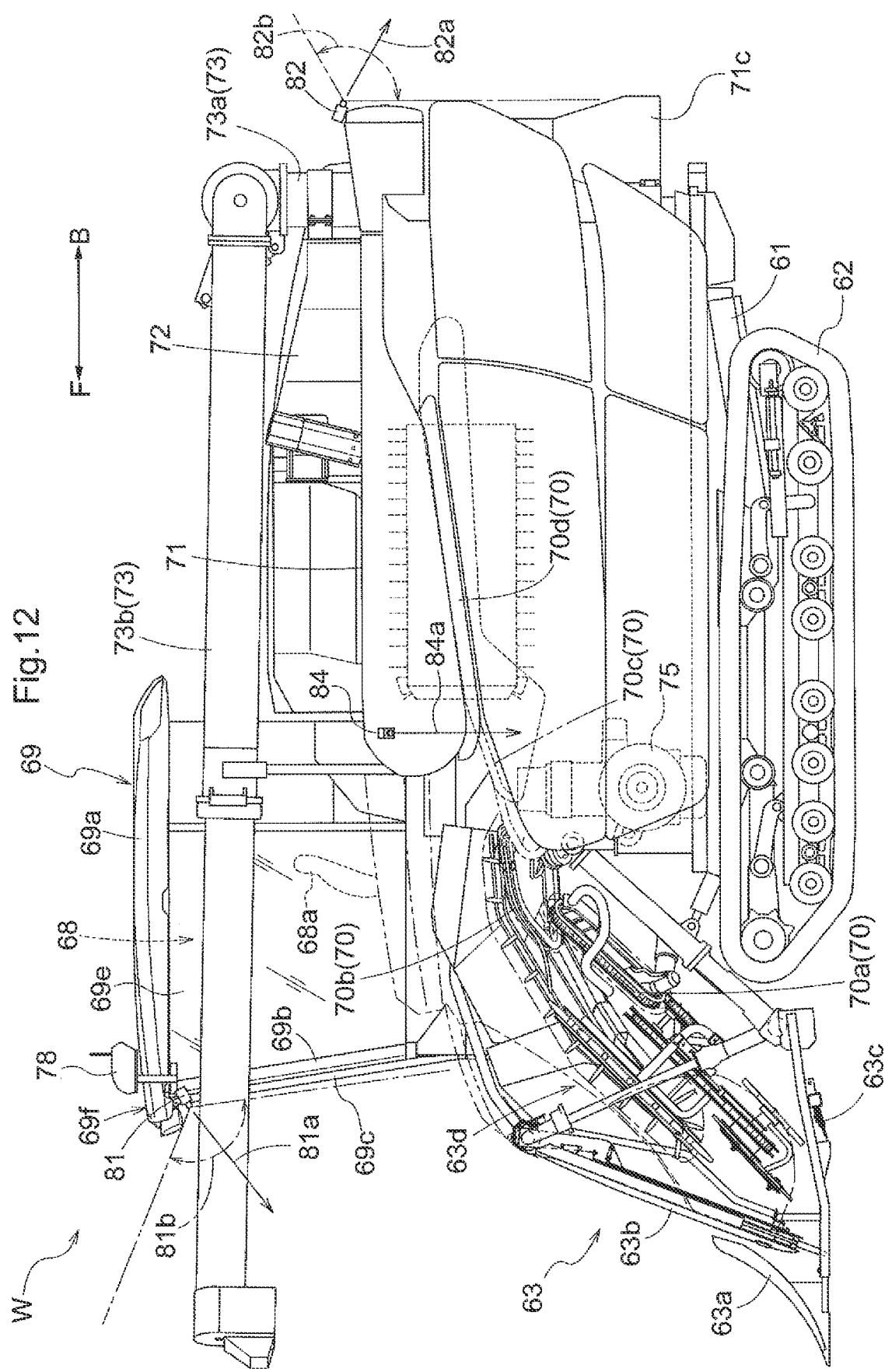
FIG. 12 is a left-side view of the vehicle body of the head-feeding combine according to the second embodiment.
Figure 13:
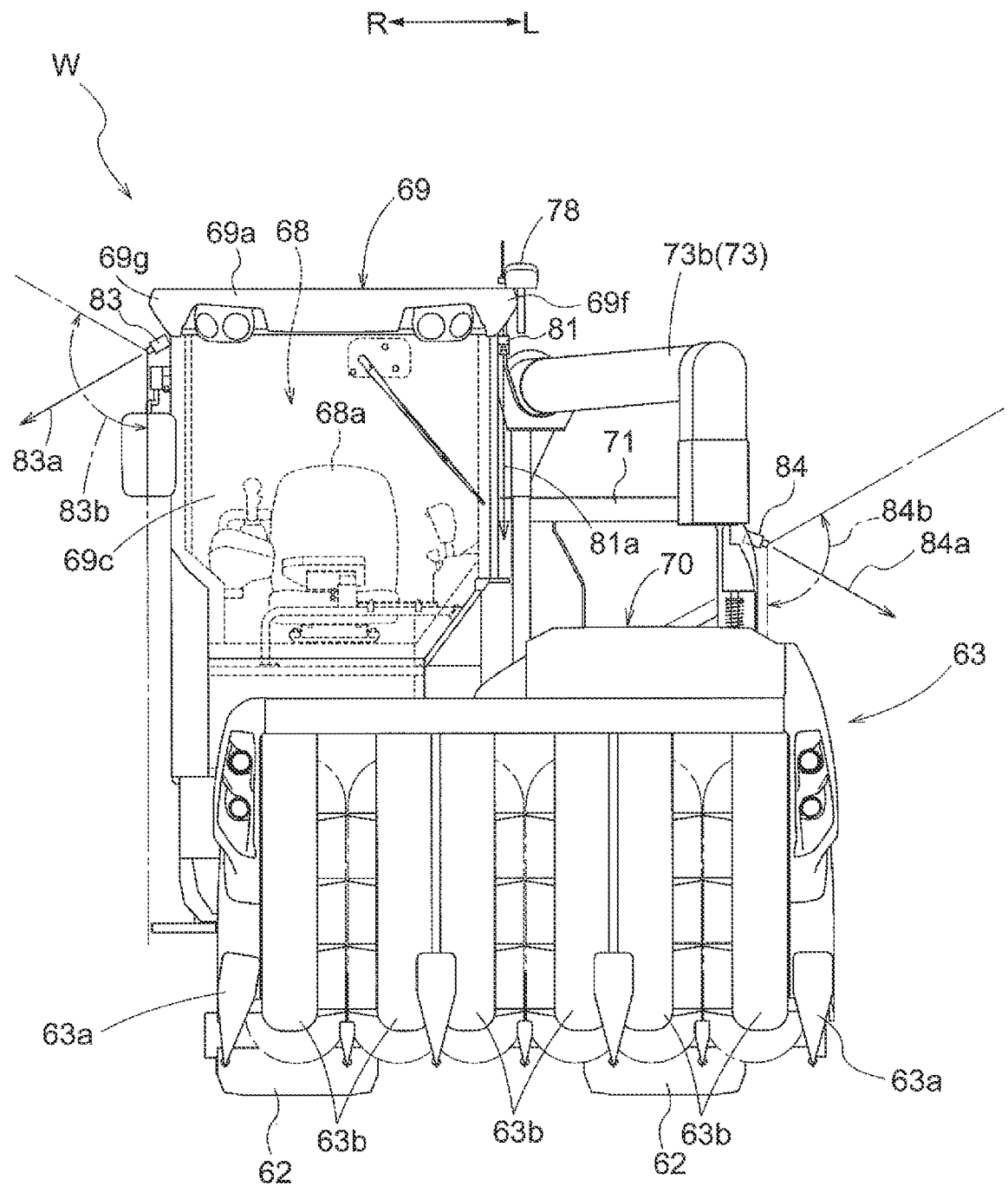
FIG. 13 is a front view of the vehicle body of the head-feeding combine according to the second embodiment.
Figure 14:
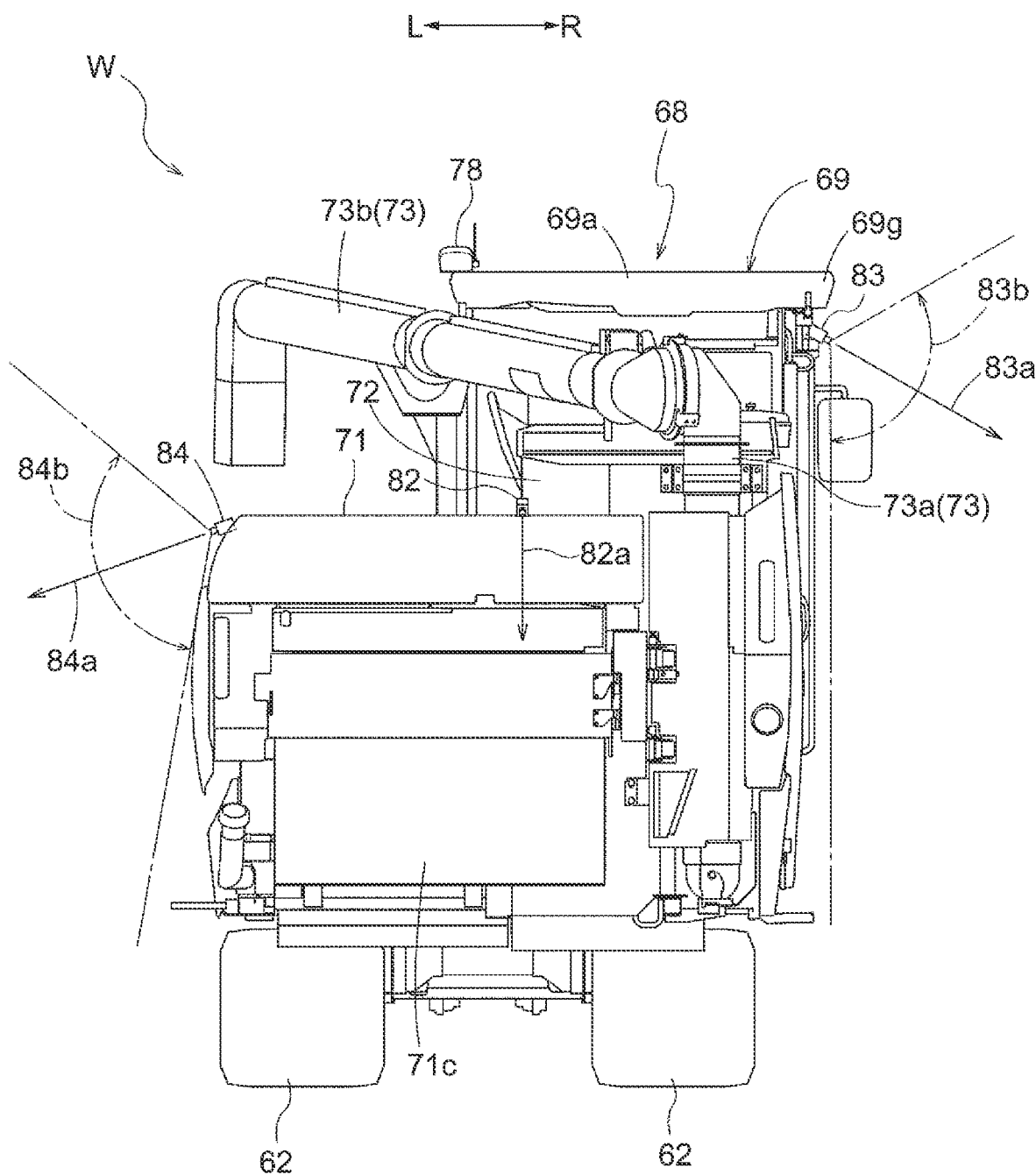
FIG. 14 is a rear view of the vehicle body of the head-feeding combine according to the second embodiment.

As illustrated in FIGS. 11 to 13, the front camera 81 is provided in a front part of the driving section 68 so as to be located in a central part of the vehicle body W in the left-right direction. Specifically, the front camera 81 is provided in the front part of the driving section 68, adjacent to the side of the threshing device 71. In other words, the front camera 81 is placed on a left side surface of the front part of the driving section 68.

The front camera 81 is supported by the cabin frame 69b using a stay. The roof part 69a provided in the driving section 68 includes a projecting part 69f that projects further to the left than the side glass 69e. The front camera 81 is provided directly below the projecting part 69f. The front camera 81 is provided at a position lower than the satellite positioning module 78.

A shooting direction 81a of the front camera 81 is oriented diagonally downward toward the front, i.e., toward the mowing unit 63. The front camera 81 is provided so that the entire mowing unit 63 and a region around the mowing unit 63 (part of the field) are included in a shooting range 81b thereof. In other words, the shooting range 81b of the front camera 81 includes the dividers 63a, the lifting device 63b, the merging transport unit 63d, a region to the front of the mowing unit 63, a region to the rear of the mowing unit 63, a region to the right of the mowing unit 63, and a region to the left of the mowing unit 63.

Placement of Rear Camera

As illustrated in FIGS. 10 to 12 and 14, the rear camera 82 is provided in a rear part of the threshing device 71 so as to be located in a central part of the vehicle body W in the left-right direction. Specifically, the rear camera 82 is provided in a location further toward the right side on the upper surface of the waste straw processing device 71c of the threshing device 71. The rear camera 82 is supported by the threshing device 71 using a stay. The rear camera 82 is provided at a position lower than the satellite positioning module 78.

A shooting direction 82a of the rear camera 82 is oriented diagonally downward toward the rear, i.e., toward the rear of the waste straw processing device 71c. The rear camera 82 is provided so that the entire waste straw processing device 71c and a region around the waste straw processing device 71c (part of the field) are included in a shooting range 82b thereof. In other words, the shooting range 82b of the rear camera 82 includes the waste straw processing device 71c, a region to the rear of the waste straw processing device 71c, a region to the right of the waste straw processing device 71c, and a region to the left of the waste straw processing device 71c.

Placement of Right Camera

As illustrated in FIGS. 10, 11, 13, and 14, the right camera 83 is provided in a right side part of the driving section 68 so as to be located in a central part of the vehicle body W in the front-back direction. Specifically, the right camera 83 is provided in the rear part of the driving section 68, adjacent on the right side. In other words, the right camera 83 is placed on a right side surface of the rear part of the driving section 68. The right camera 83 is provided further to the rear than the driver's seat 68a included in the driving section 68.

The right camera 83 is supported by the cabin frame 69b using a stay. The roof part 69a provided in the driving section 68 includes a projecting part 69g that projects further to the right than the door 69d. The right camera 83 is provided directly below the projecting part 69g. The right camera 83 is provided above the dust-resistant case 77. The right camera 83 is provided at a position lower than the satellite positioning module 78.

A shooting direction 83a of the right camera 83 is oriented diagonally downward toward the right, i.e., toward the right of the driving section 68. The right camera 83 is provided so that a region to the right of the driving section 68, a region to the right of the grain tank 72, and a region to the right of the mowing unit 63 are included in a shooting range 83b thereof.

Placement of Left Camera

As illustrated in FIGS. 11 to 14, the left camera 84 is provided in a left side part of the threshing device 71 so as to be located in a central part of the vehicle body W in the front-back direction. Specifically, the left camera 84 is provided in the front part of the threshing device 71, adjacent on the left side. In other words, the left camera 84 is placed on a left side surface of the front part of the threshing device 71. The left camera 84 is supported by the threshing device 71 using a stay. The left camera 84 is provided at a position lower than the satellite positioning module 78.

A shooting direction 84a of the left camera 84 is oriented diagonally downward toward the left, i.e., toward the left of the threshing device 71. The left camera 84 is provided so that a region to the left of the threshing device 71, a region to the left of the transport unit 70, and a region to the left of the mowing unit 63 are included in a shooting range 84b thereof.

Image Processing Device

Like the standard combine described in the first embodiment, the head-feeding combine includes the image processing device 30 and the display unit 40. The front camera 81, the rear camera 82, the right camera 83, and the left camera 84 are connected to the image processing device 30. In the standard combine too, the composite image is generated by the image processing device 30 and displayed by the display unit 40 in the same manner as in the foregoing embodiment.

Figure 15:
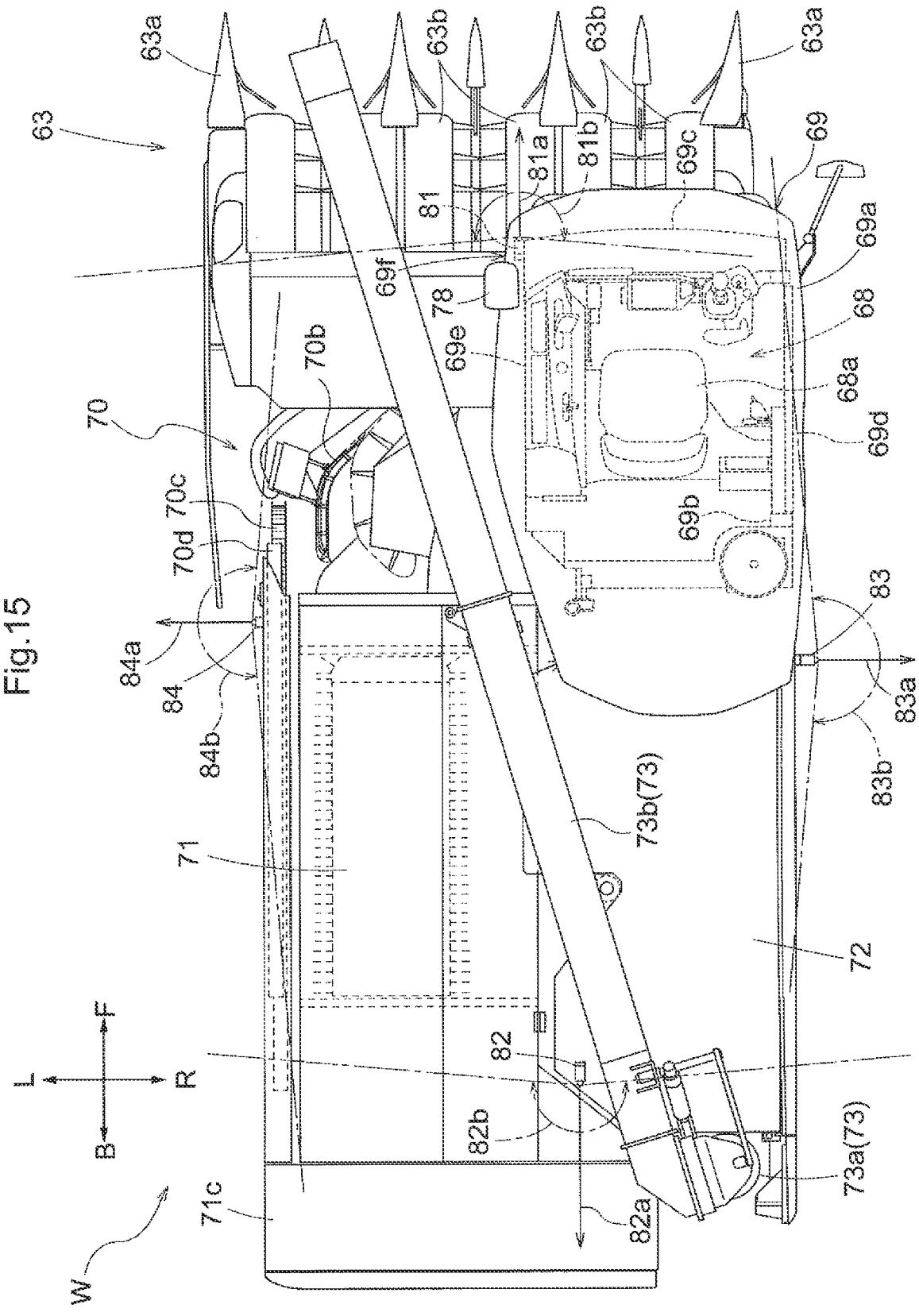
FIG. 15 is a plan view of the vehicle body of the head-feeding combine according to a variation on the second embodiment.
Figure 16:
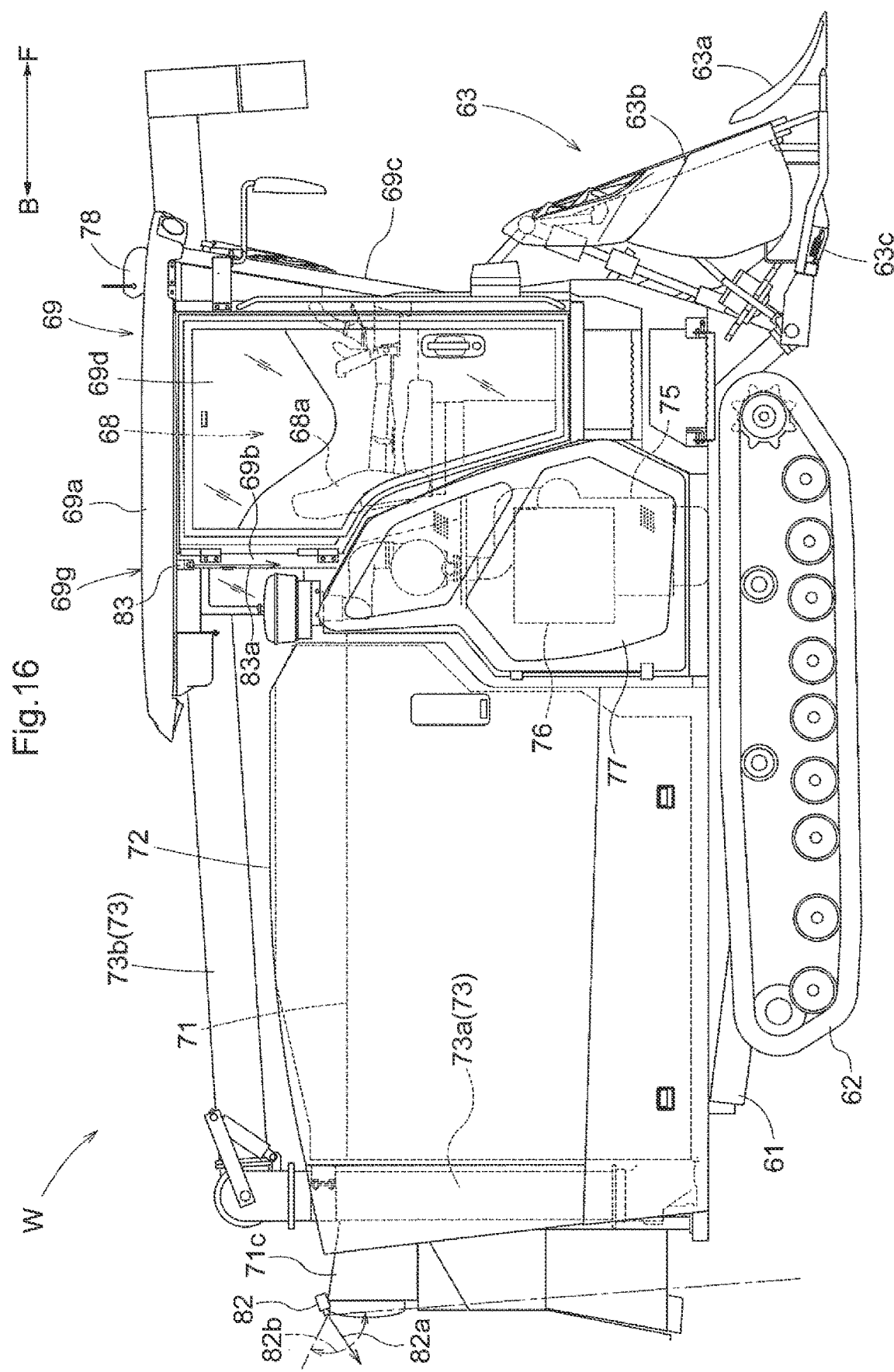
FIG. 16 is a right-side view of a vehicle body of a head-feeding combine according to a third embodiment.
Figure 17:
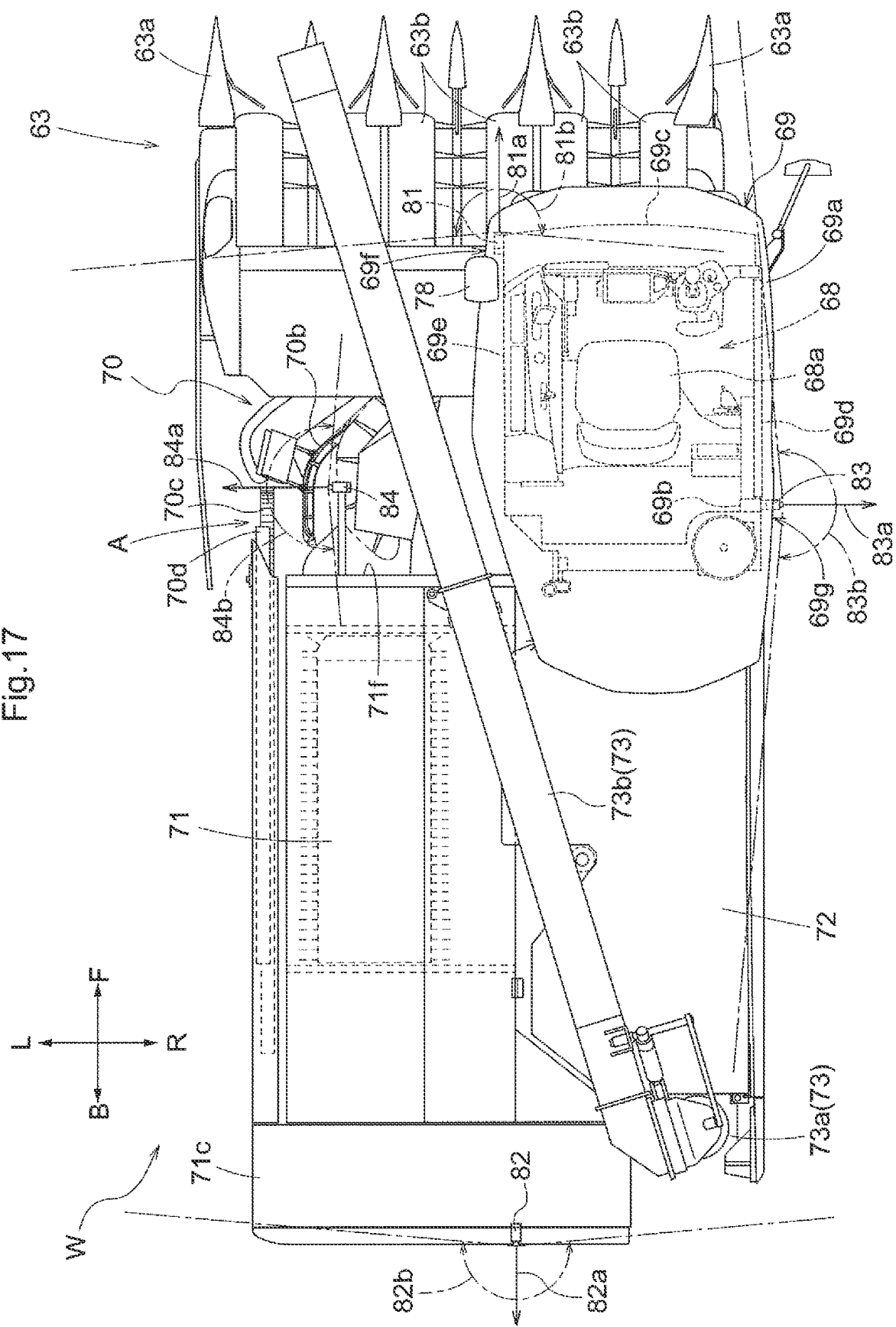
FIG. 17 is a plan view of the vehicle body of the head-feeding combine according to the third embodiment.
Figure 18:
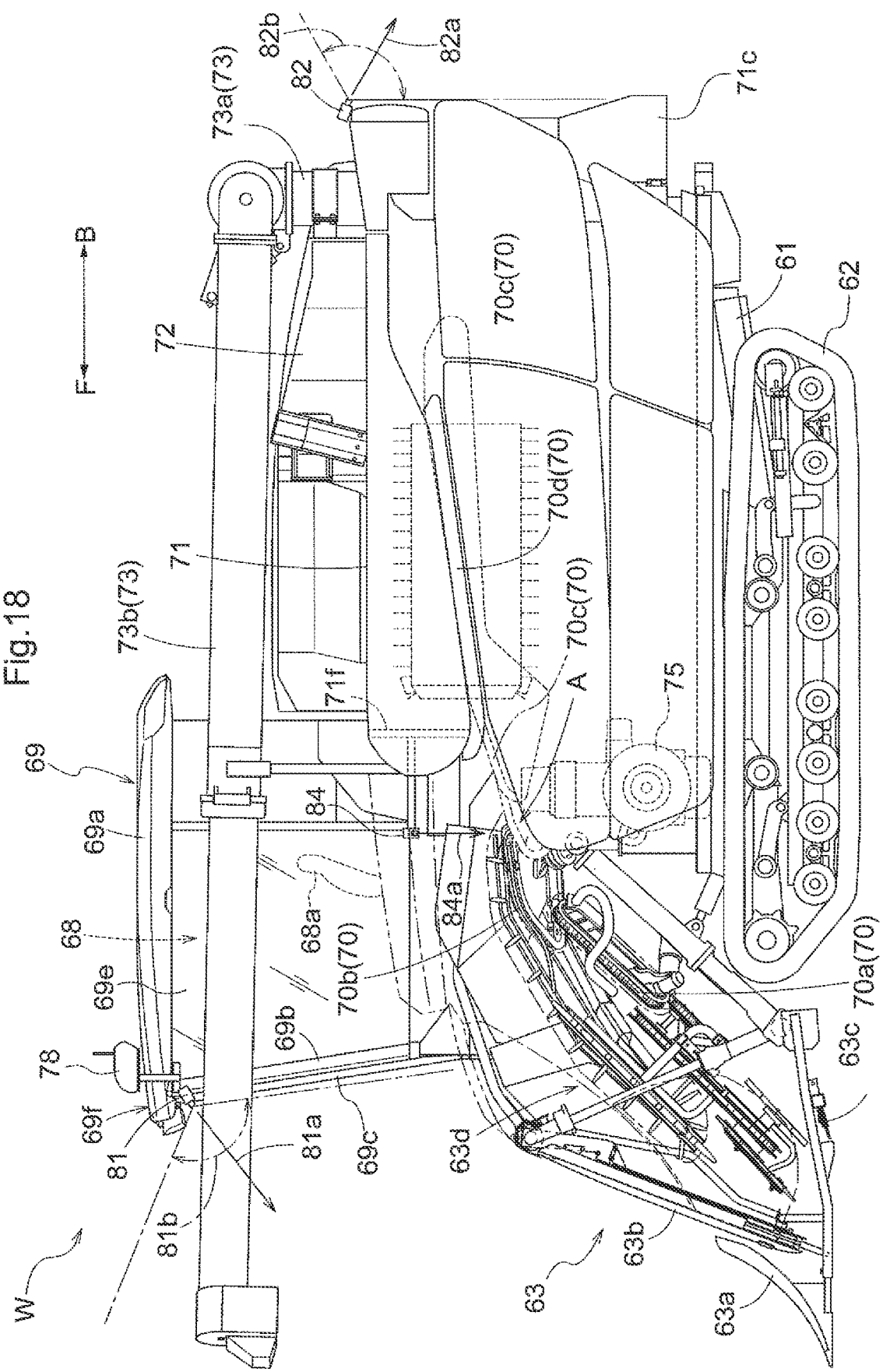
FIG. 18 is a left-side view of the vehicle body of the head-feeding combine according to the third embodiment.
Figure 19:
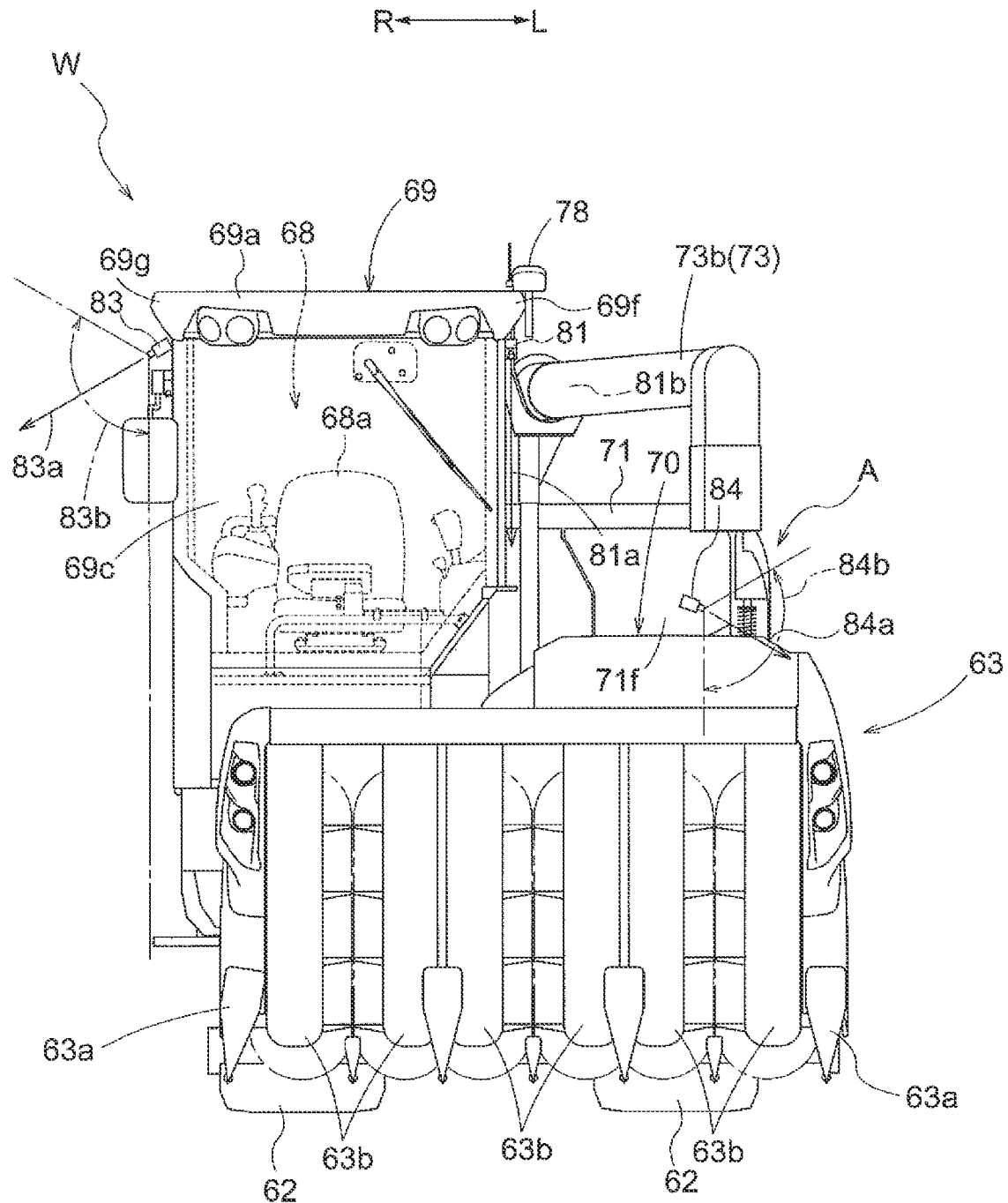
FIG. 19 is a front view of the vehicle body of the head-feeding combine according to the third embodiment.
Figure 20:
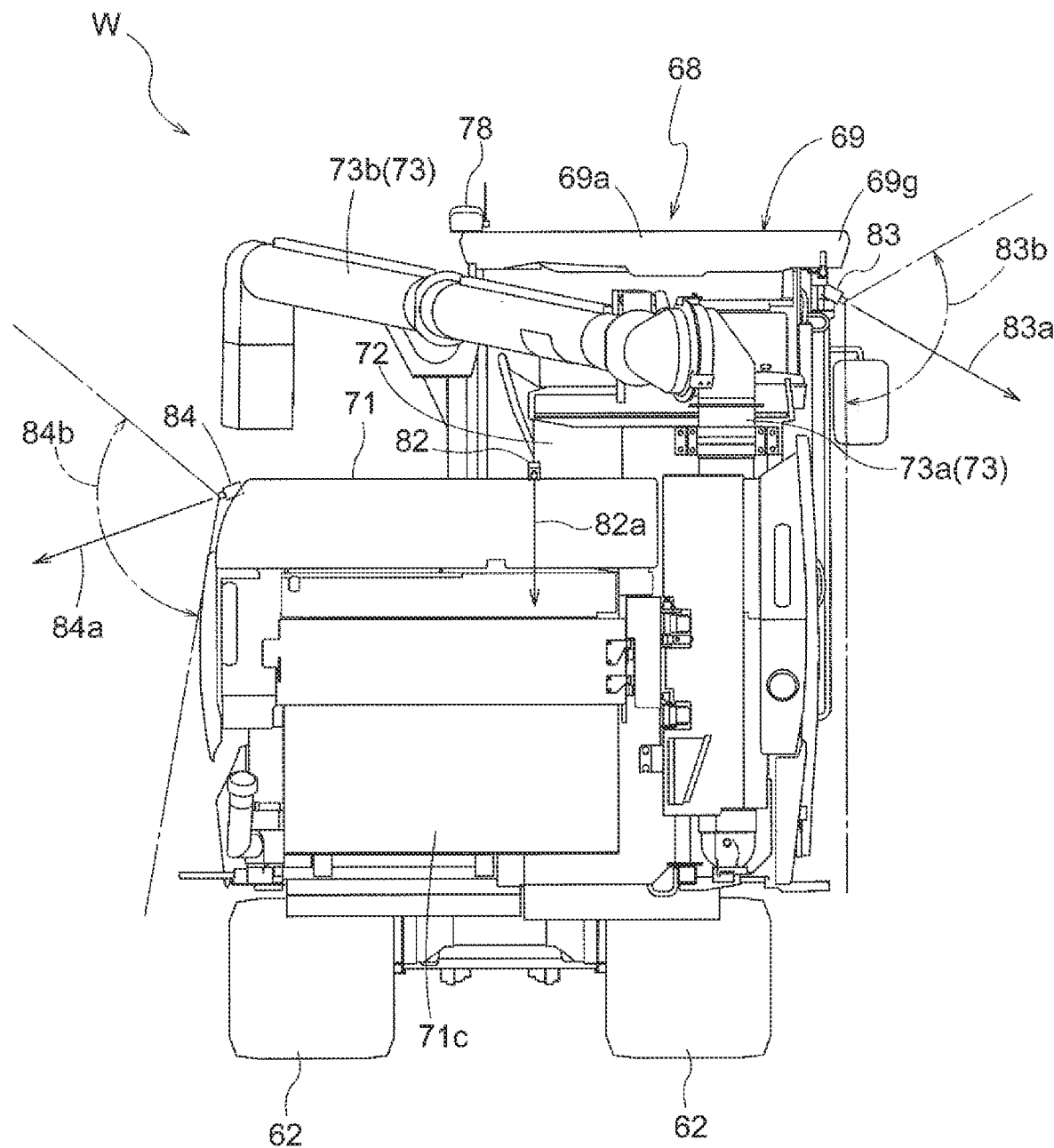
FIG. 20 is a rear view of the vehicle body of the head-feeding combine according to the third embodiment.

Variations on Second Embodiment (1) FIG. 15 illustrates another form of the head-feeding combine. In this head-feeding combine, the rear camera 82 is provided on a rear part of the grain tank 72 so as to be located in a central part of the vehicle body W in the left-right direction. Specifically, the rear camera 82 is provided in a location further toward the left side on the upper surface of the grain tank 72. The rear camera 82 is supported by the grain tank 72 using a stay.

The right camera 83 is provided on a right side part of the grain tank 72 so as to be located in a central part of the vehicle body W in the front-back direction. Specifically, the right camera 83 is provided in the front part of the grain tank 72, adjacent on the right side. In other words, the right camera 83 is placed on a right side surface of the front part of the grain tank 72. The right camera 83 is supported by the grain tank 72 using a stay.

(2) In the foregoing second embodiment, four cameras are provided on the standard combine and a head-feeding combine. There may be five or more cameras. In other words, in addition to the front camera 81, the rear camera 82, the right camera 83, and the left camera 84, a camera that shoots part of the vehicle body, a camera that shoots the field below the vehicle body, or the like may be provided in the standard combine and the head-feeding combine, and shot images from those cameras may be shown in the composite image 50.

Third Embodiment

An embodiment of the present invention will be described on the basis of the drawings. Note that configurations that are the same as those in the foregoing embodiment may be given the same reference signs, and may not be described in detail.

Overall Configuration of Combine

FIGS. 16 to 20 illustrate a head-feeding combine, which is an example of a harvester. The configuration of this head-feeding combine is the same as in the head-feeding combine of the second embodiment (FIGS. 10 to 15).

Cameras

A front camera 81, a rear camera 82, a right camera 83 (an example of a first side camera), and a left camera 84 (an example of a second side camera) are provided in the vehicle body W of the head-feeding combine. The placements, support structures, and shooting ranges of the front camera 81 and the rear camera 82 are the same as in the second embodiment.

Placement of Right Camera

As illustrated in FIGS. 16, 17, 19, and 20, the right camera 83 is provided in a right side part of the driving section 68 so as to be located in a central part of the vehicle body W in the front-back direction. Specifically, the right camera 83 is provided in the rear part of the driving section 68, adjacent on the right side. In other words, the right camera 83 is placed on a right side surface of the rear part of the driving section 68. The right camera 83 is provided further to the rear than the driver's seat 68*a* included in the driving section 68. The right camera 83 is provided further to the front than the grain tank 72. The support structure and shooting range of the right camera 83 are the same as in the second embodiment.

Placement of Left Camera

As illustrated in FIGS. 17 to 20, the left camera 84 is provided above a receiving part A where the cut grain culm is passed from the transport unit 70 to the feed chain 70*c*. Specifically, the left camera 84 is provided forward of a left-side part of a front wall 71*f* of the threshing device 71. The left camera 84 is supported by the front wall 71*f* of the threshing device 71 using a stay. The left camera 84 is provided further to the front than the rail stand 70*d*.

A shooting direction 84*a* of the left camera 84 is oriented diagonally downward toward the left, i.e., toward the receiving part A. The left camera 84 is provided so that the transport unit 70, the receiving part A, a region to the left of the threshing device 71, a region to the left of the transport unit 70, and a region to the left of the mowing unit 63 are included in a shooting range 84*b* thereof. In other words, the left camera 84 is provided so as to be capable of shooting the receiving part A.

Image Processing Device

Figure 21:
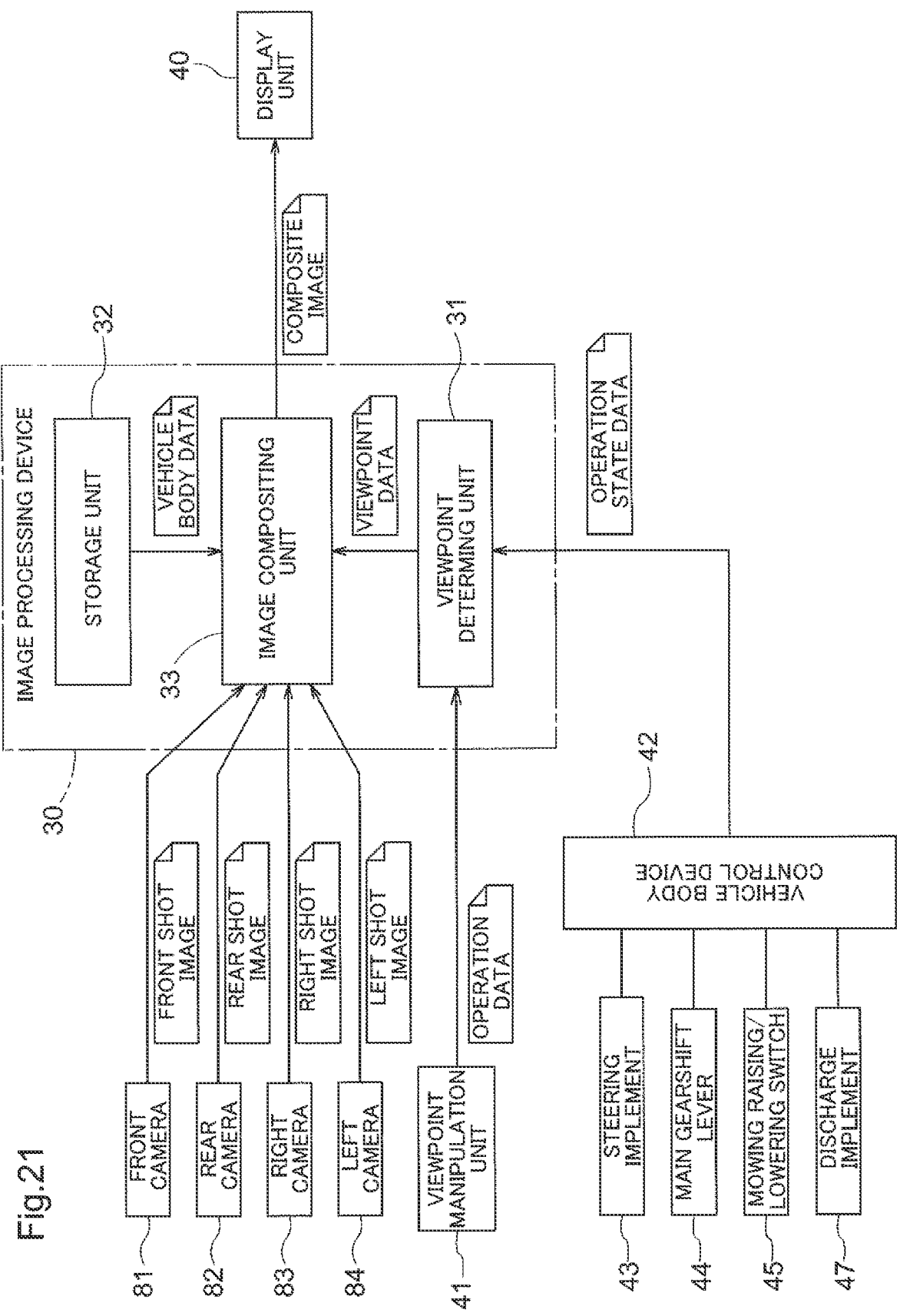
FIG. 21 is a block diagram illustrating a control configuration according to the third embodiment.

Like the standard combine described in the first embodiment, the head-feeding combine includes the image processing device 30 and the display unit 40. As illustrated in FIG. 21, the front camera 81, the rear camera 82, the right camera 83, and the left camera 84 are connected to the image processing device 30. In the standard combine too, the composite image is generated by the image processing device 30 and displayed by the display unit 40 in the same manner as in the first embodiment.

Example of Composite Image

Figure 22:
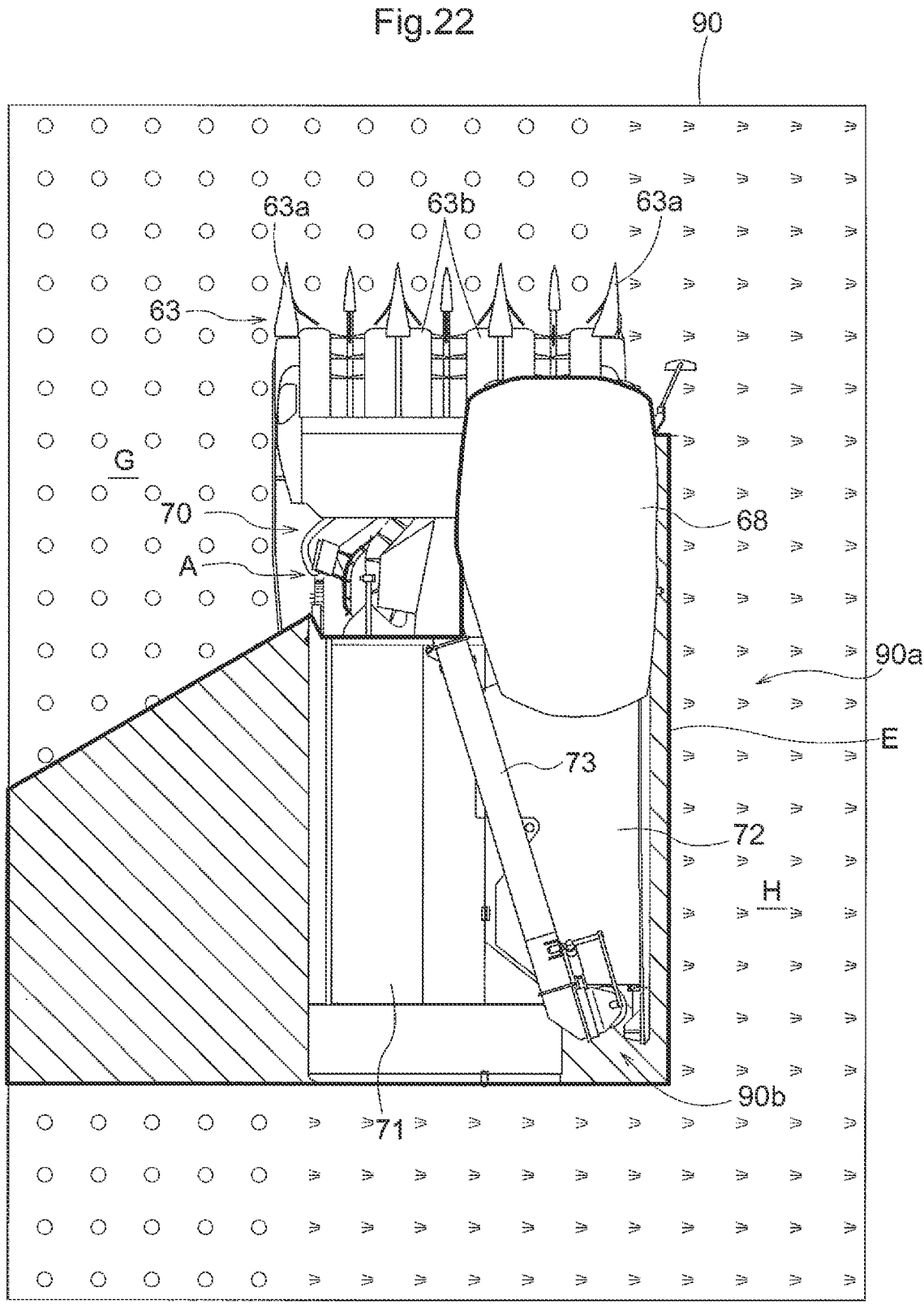
FIG. 22 is a diagram illustrating an example of a composite image according to the third embodiment.

Assume that the head-feeding combine is performing harvesting operations while traveling forward in a field. An example of the composite image generated by the image compositing unit 33 at this time is illustrated in FIG. 22 as a composite image 90.

The operation state of the vehicle body W at this time is that the vehicle body W is traveling straight forward, the mowing unit 63 is in the working position and is operating, and the discharge device 73 is in the retracted position and is stopped. The vehicle body control device 42 outputs, to the image processing device 30, operation state data indicating the stated operation state of the vehicle body W.

Assume that the viewpoint manipulation unit 41 has accepted an operation specifying a planar viewpoint. The viewpoint manipulation unit 41 outputs operation data indicating the planar viewpoint to the viewpoint determining unit 31. On the basis of accepting the input of the operation data, the viewpoint determining unit 31 of the image processing device 30 determines the viewpoint of the composite image composited by the image compositing unit 33 (the composite viewpoint) as the planar viewpoint, and outputs viewpoint data to that effect to the image compositing unit 33.

The image compositing unit 33 generates the preliminary composite image by performing image processing including viewpoint conversion to the planar viewpoint and compositing in the shot images input from the four cameras. Next, the image compositing unit 33 generates the vehicle body image by referring to the operation state data input from the vehicle body control device 42 and the viewpoint data input from the viewpoint determining unit 31. Specifically, the vehicle body image showing the vehicle body W from the planar viewpoint is generated using the data expressing the external shapes of the mowing unit 63 in the working position and the transport unit 70, the data expressing the external shape of the discharge device 73 in the retracted position, and the vehicle body data pertaining to remaining parts of the vehicle body W. The image compositing unit 33 then generates the composite image 90 by compositing the vehicle body image with the preliminary composite image.

FIG. 22 illustrates the composite image 90 generated by the image compositing unit 33. A region 90*a* outside a boundary line E in the composite image 90 is an image originating from the preliminary composite image, and is an image originating from the shot images shot by the four cameras. The mowing unit 63, the dividers 63*a*, the lifting device 63*b*, a region to the rear of the lifting device 63*b* (a rear part of the mowing unit 63) the transport unit 70, the receiving part A, the already-mowed area H to the right and to the rear of the vehicle body W, and the unmowed area G to the left and to the front of the vehicle body W, which have been shot, are shown in the region 90*a*. A region 90*b* inside the boundary line E in the composite image 90 is a region originating from the vehicle body image. The driving section 68, the threshing device 71, the grain tank 72, part of the discharge device 73, and the like are shown in the region 90*b*.

Figure 23:
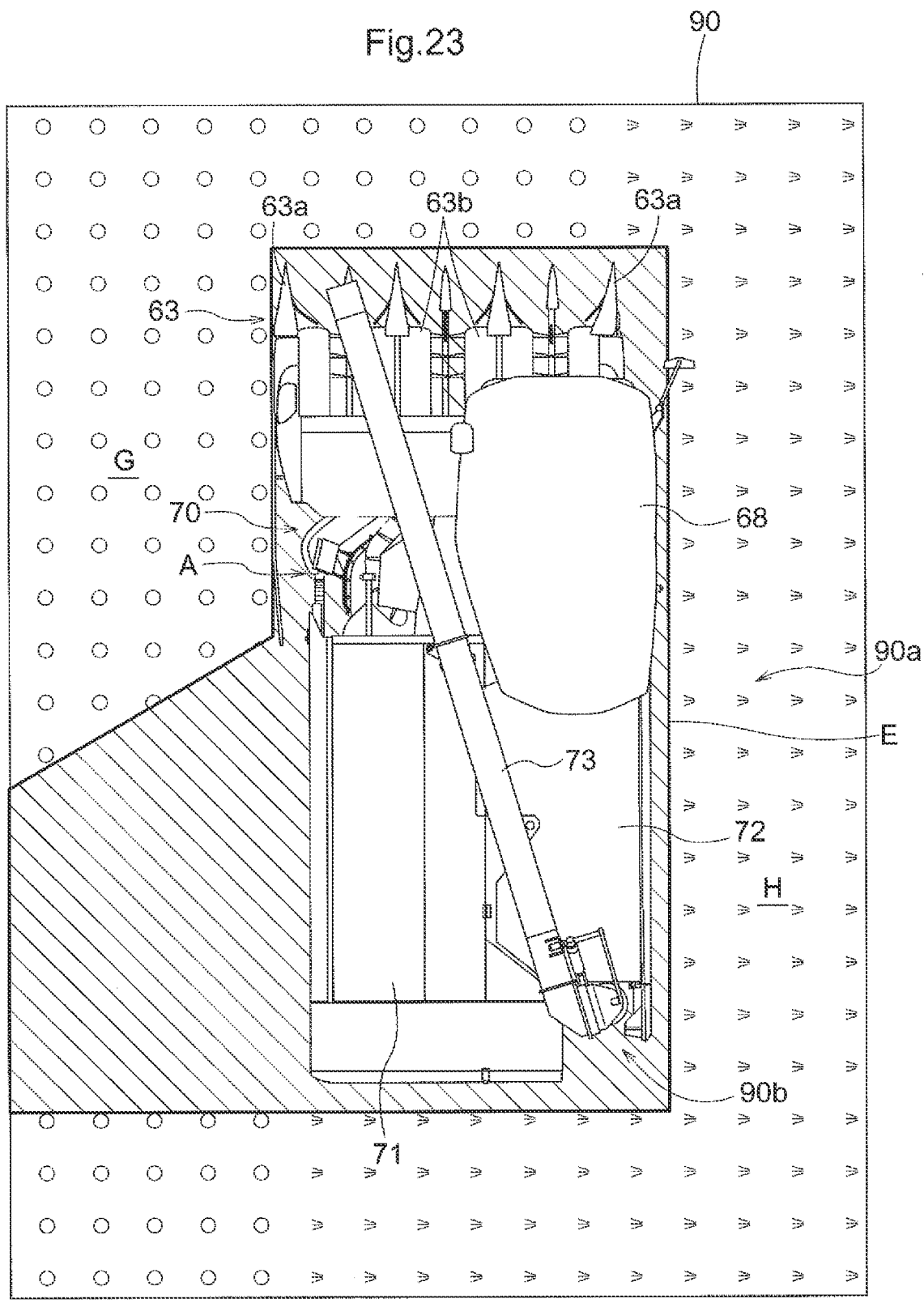
FIG. 23 is a diagram illustrating an example of a composite image according to the third embodiment.

FIG. 23 illustrates another example of the composite image 90. As in the foregoing example, the region 90*a* outside the boundary line E in the composite image 90 is an image originating from the preliminary composite image, and is an image originating from the shot images shot by the four cameras. A region 90*b* inside the boundary line E in the composite image 90 is a region originating from the vehicle body image. In the example in FIG. 23, the already-mowed area H to the right and to the rear of the vehicle body W, and the unmowed area G to the left and to the front of the vehicle body W, are shown in the region 90*a*. The mowing unit 63 (the dividers 63*a* and the lifting device 63*b*), the driving section 68, the transport unit 70, the threshing device 71, the grain tank 72, the discharge device 73, and the like are shown in the region 90*b*.

In other words, in the example in FIG. 22, the mowing unit 63 (the dividers 63*a* and the lifting device 63*b*), the transport unit 70, and the receiving part A are shown in the composite image 90 from the images captured by the front camera 81, the rear camera 82, and the right camera 83. In the example in FIG. 23, the mowing unit 63 (the dividers 63*a* and the lifting device 63*b*) and the transport unit 70 are shown in the composite image 90 from an image generated on the basis of the vehicle body data (the vehicle body image). The change in the image format described above can be achieved by changing the image processing method, settings, and the like used by the image compositing unit 33.

Switching Viewpoint of Composite Image

In the head-feeding combine according to the present embodiment described thus far, the viewpoint of the composite image displayed in the display unit 40 can be switched at any time in response to an operation made by the driver through the viewpoint manipulation unit 41, a change in the operation state of the vehicle body W, or the like. Specifically, in response to accepting an operation from the driver specifying a viewpoint, the viewpoint manipulation unit 41 outputs operation data indicating that viewpoint to the viewpoint determining unit 31. In response to a change in the operation state of the vehicle body W, the vehicle body control device 42 outputs operation state data indicating the operation state of the vehicle body W to the viewpoint determining unit 31. Each time the input of the operation data and the operation state data is accepted, the viewpoint determining unit 31 determines the composite viewpoint and outputs viewpoint data indicating the composite viewpoint to the image compositing unit 33. The image compositing unit 33 generates the composite image so that the viewpoint of the generated composite image is the composite viewpoint indicated by the input viewpoint data, and outputs the composite image to the display unit 40. The viewpoint of the composite image displayed in the display unit 40 can be switched in this manner.

The viewpoint determining unit 31 may be configured such that when determining the composite viewpoint in accordance with the operation state data input from the vehicle body control device 42, the viewpoint determining unit 31 determines the composite viewpoint by selecting a viewpoint from a plurality of viewpoints viewing the vehicle body W diagonally from above. For example, the viewpoint determining unit 31 may be configured to determine a viewpoint viewing the vehicle body W diagonally above from the rear as the composite viewpoint in response to the input operation state data indicating that the vehicle body W is traveling forward, determine a viewpoint viewing the vehicle body W diagonally above from the front as the composite viewpoint in response to the vehicle body W traveling in reverse, and determine a viewpoint viewing the vehicle body W diagonally above from the left as the composite viewpoint in response to the discharge device 73 discharging grain.

Figure 24:
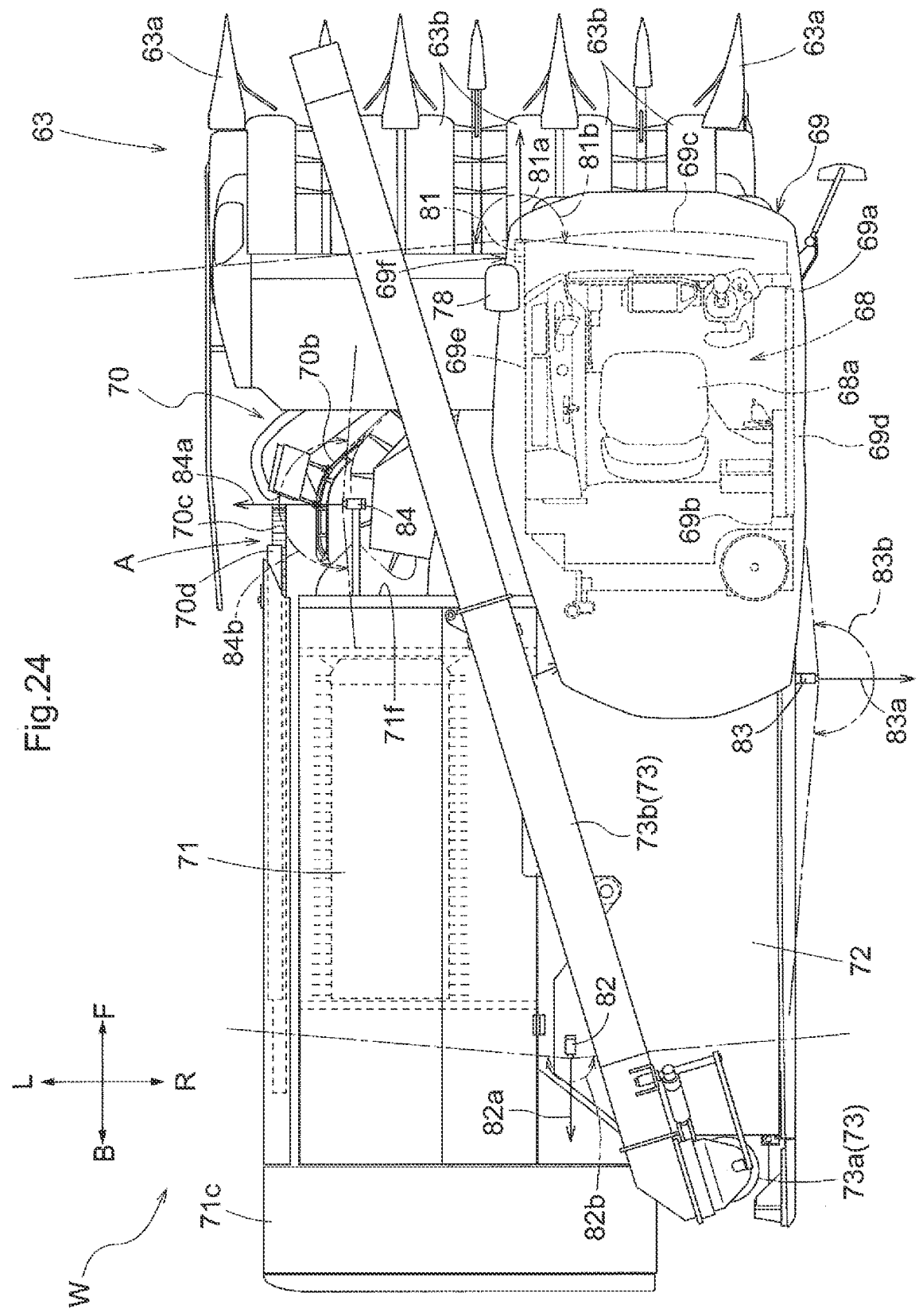
FIG. 24 is a plan view of the vehicle body of the head-feeding combine according to a variation on the third embodiment.

Variations on Third Embodiment (1) FIG. 24 illustrates another form of the head-feeding combine. In this head-feeding combine, the rear camera 82 is provided on a rear part of the grain tank 72 so as to be located in a central part of the vehicle body W in the left-right direction. Specifically, the rear camera 82 is provided in a location further toward the left side on the upper surface of the grain tank 72. The rear camera 82 is supported by the grain tank 72 using a stay.

The right camera 83 is provided on a right side part of the grain tank 72 so as to be located in a central part of the vehicle body W in the front-back direction. Specifically, the right camera 83 is provided in the front part of the grain tank 72, adjacent on the right side. In other words, the right camera 83 is placed on a right side surface of the front part of the grain tank 72. The right camera 83 is supported by the grain tank 72 using a stay.

(2) In the foregoing embodiments, four cameras are provided on the head-feeding combine. There may be five or more cameras. In other words, in addition to the front camera 81, the rear camera 82, the right camera 83, and the left camera 84, a camera that shoots part of the vehicle body, a camera that shoots the field below the vehicle body, or the like may be provided in the head-feeding combine, and shot images from those cameras may be shown in the composite image 90.

(3) The foregoing embodiment described an example in which the shooting direction 84a is oriented diagonally downward toward the left such that the left camera 84 can shoot the receiving part A. The left camera 84 may be configured to be switchable between that state and a state in which the shooting direction 84a is oriented toward the left such that the receiving part A is not shot.

(4) In the foregoing third embodiment, four cameras are provided on the standard combine and a head-feeding combine. There may be five or more cameras. In other words, in addition to the front camera 81, the rear camera 82, the right camera 83, and the left camera 84, a camera that shoots part of the vehicle body, a camera that shoots the field below the vehicle body, or the like may be provided in the standard combine and the head-feeding combine, and shot images from those cameras may be shown in the composite image 50.

Fourth Embodiment

An embodiment of the present invention will be described on the basis of the drawings. Note that configurations that are the same as those in the foregoing embodiment may be given the same reference signs, and may not be described in detail.

Overall Configuration of Combine

FIGS. 25 to 29 illustrate a standard combine, which is an example of a harvester. The configuration of this standard combine is the same as in the standard combine of the first embodiment (FIGS. 1 to 5).

Cameras

The front camera 21 (an example of a camera), the rear camera 22 (an example of a camera), the right camera 23 (an example of a camera), the left camera 24 (an example of a camera), a lower-right camera 25 (an example of a camera and a lower camera), a lower-left camera 26 (an example of a camera and a lower camera), and a lower-rear camera 27 (an example of a camera and a lower camera) are provided in the vehicle body V of the standard combine. These seven cameras generate shot images and output the images to an image processing device 30 (described below). In the present embodiment, the seven cameras mainly shoot images of fields, ridges, roads, and the like around the vehicle body V, and may also shoot images of parts of the vehicle body V. As such, part of the vehicle body V may be shown in the shot images.

The placements, support structures, and shooting ranges of the front camera 21, the rear camera 22, the right camera 23, and the left camera 24 are the same as in the first embodiment.

Placement of Lower-Right Camera

Figure 25:
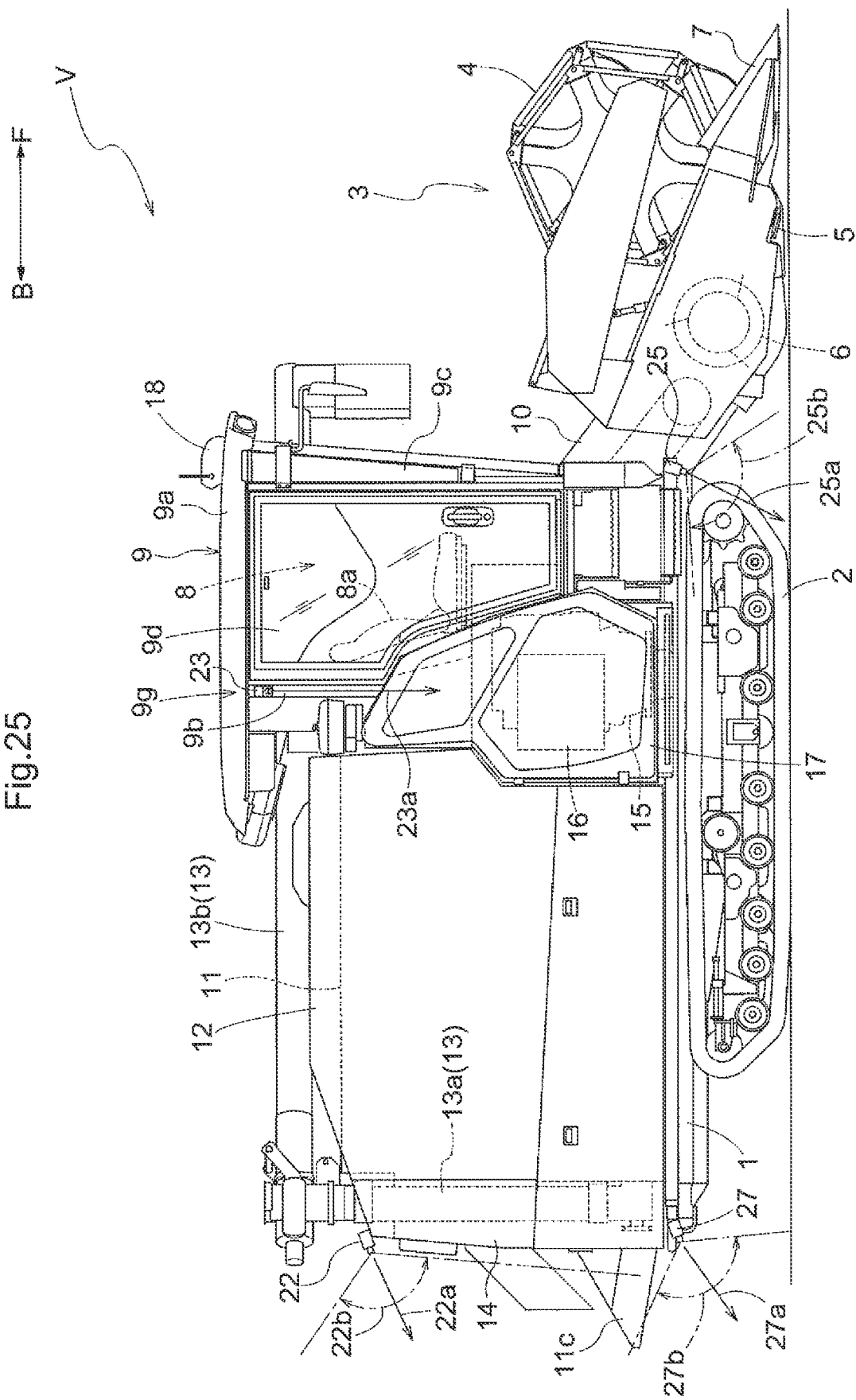
FIG. 25 is a right-side view of a vehicle body of a standard combine according to a fourth embodiment.
Figure 26:
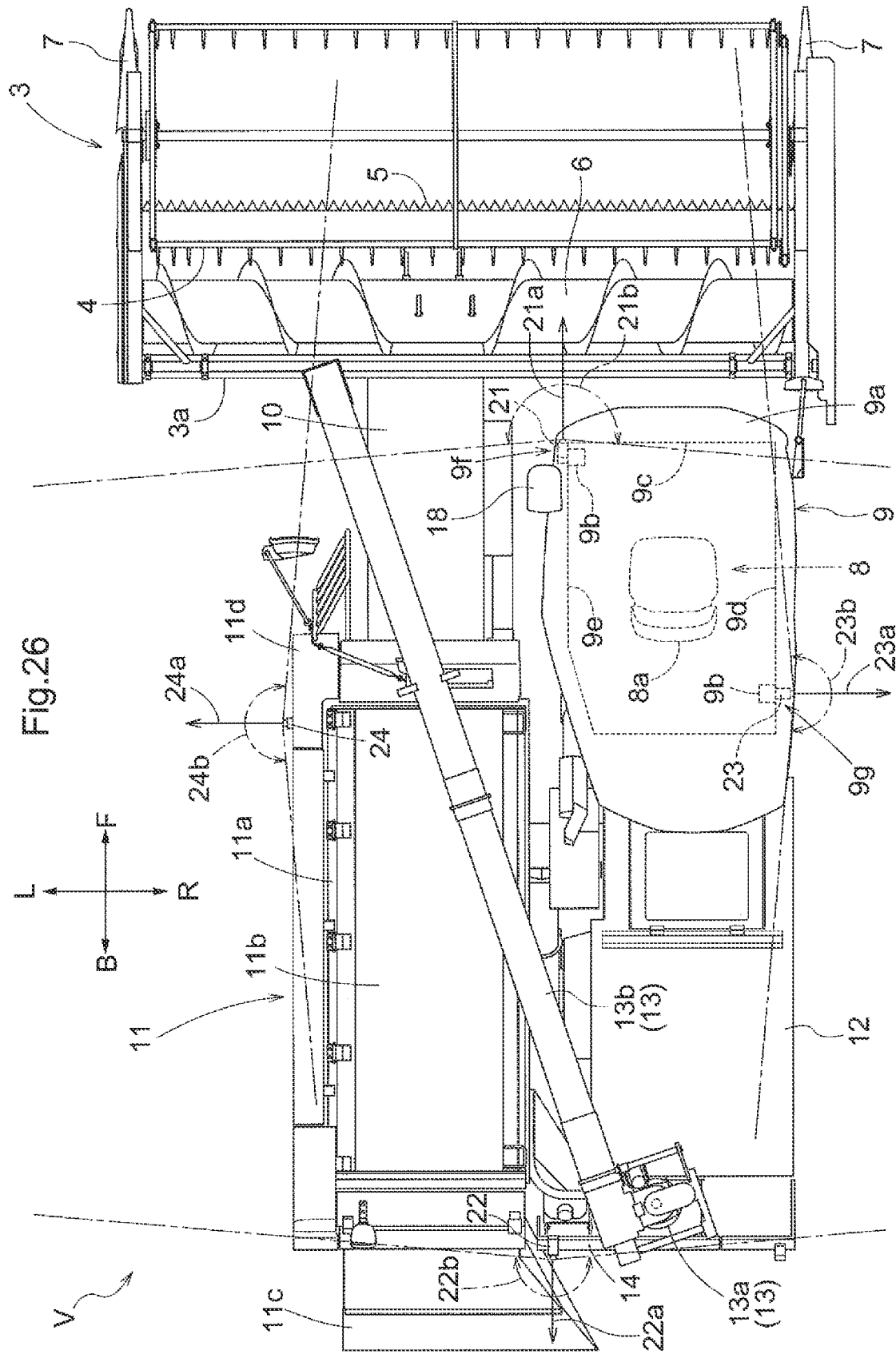
FIG. 26 is a plan view of the vehicle body of the standard combine according to the fourth embodiment.

As illustrated in FIG. 25, the lower-right camera 25 is provided in a position of the vehicle body V lower than the front camera 21. Specifically, the lower-right camera 25 is provided in a right-side part of the front part of the vehicle body frame 1. The lower-right camera 25 is located further to the right than the front camera 21. The lower-right camera 25 is located further to the front and to the left than the right crawler traveling device 2. The lower-right camera 25 is supported by the vehicle body frame 1 using a stay.

A shooting direction 25a of the lower-right camera 25 is oriented diagonally downward toward the right, i.e., toward the right crawler traveling device 2. The lower-right camera 25 is provided so that a lower part of the vehicle body V and the field below the vehicle body V are included in a shooting range 25b thereof. Specifically, a front part of the right crawler traveling device 2 and the field around the right crawler traveling device 2 are included in the shooting range 25b of the lower-right camera 25.

Placement of Lower-Left Camera

Figure 27:
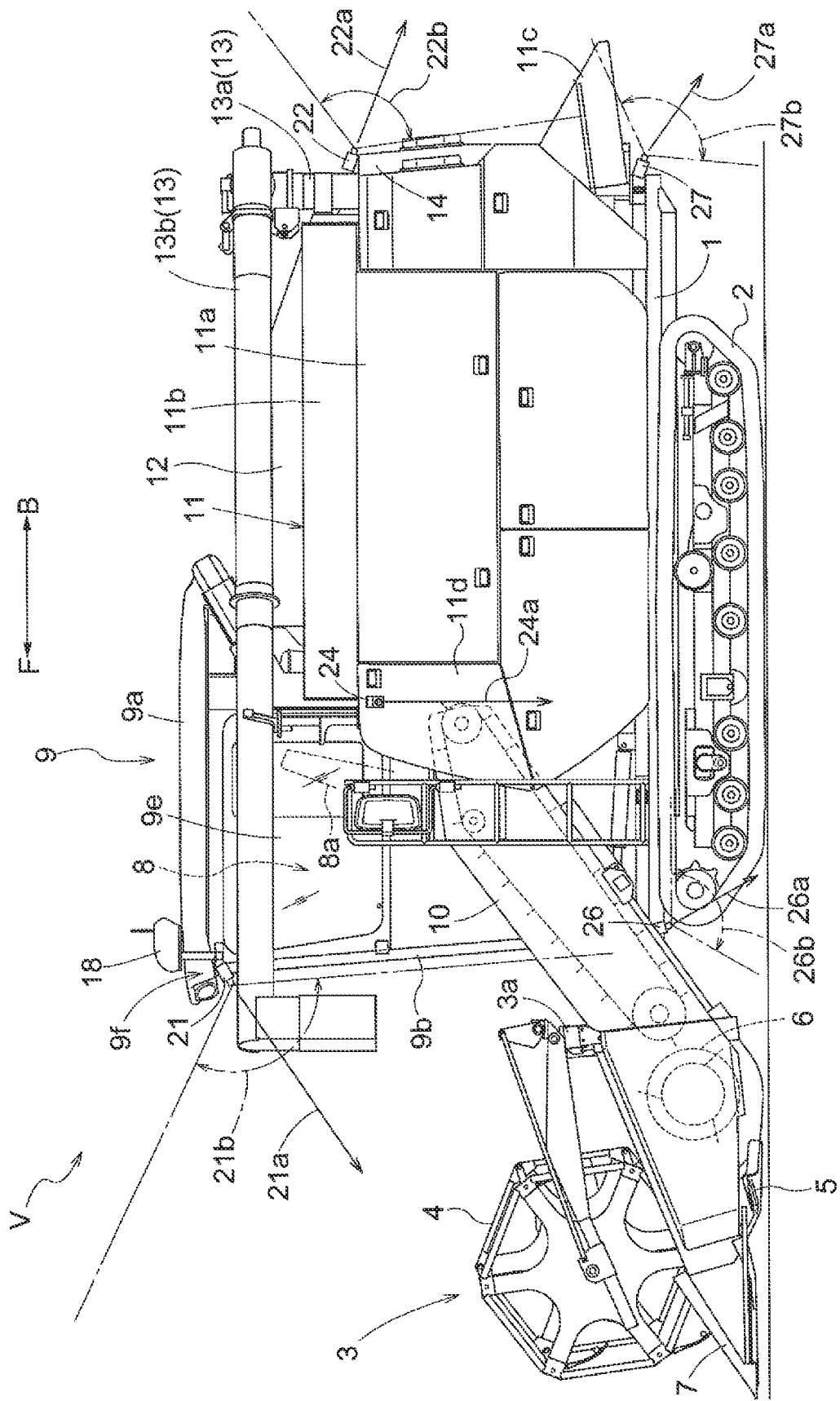
FIG. 27 is a left-side view of the vehicle body of the standard combine according to the fourth embodiment.
Figure 28:
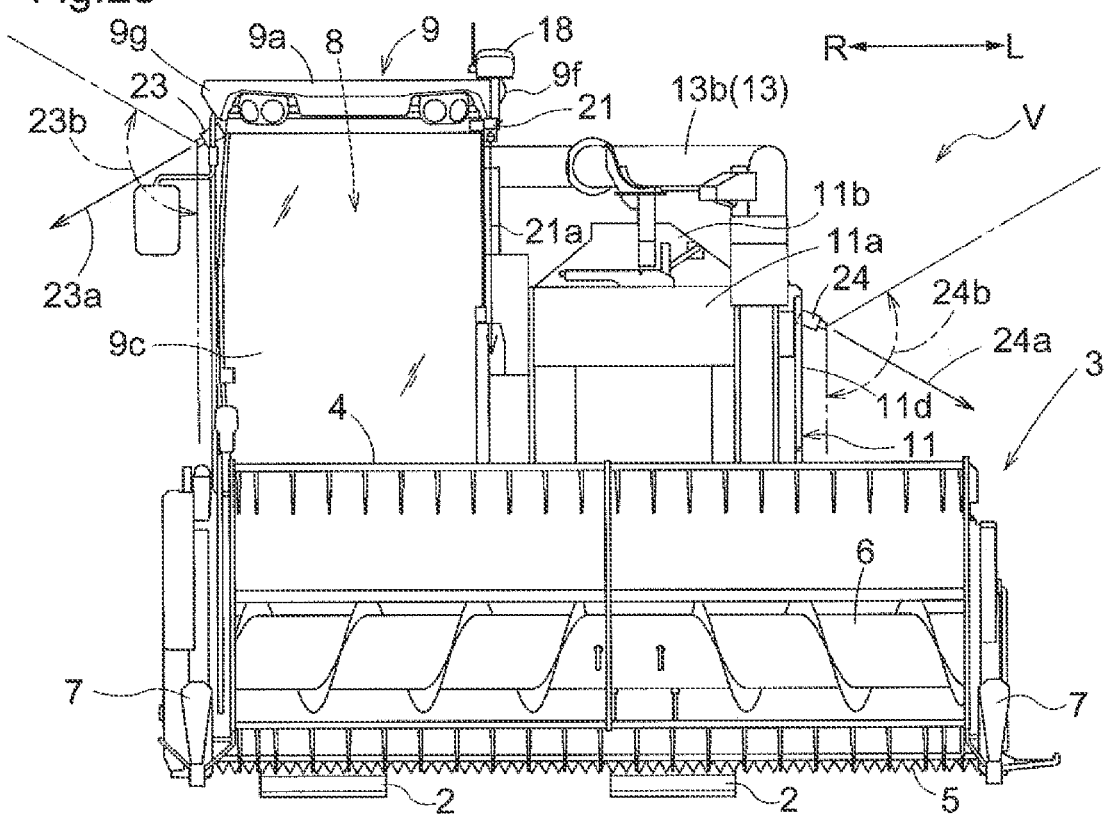
FIG. 28 is a front view of the vehicle body of the standard combine according to the fourth embodiment.

As illustrated in FIG. 27, the lower-left camera 26 is provided in a position of the vehicle body V lower than the front camera 21. Specifically, the lower-left camera 26 is provided in a left-side part of the front part of the vehicle body frame 1. The lower-left camera 26 is located further to the left than the front camera 21. The lower-left camera 26 is located further to the front and to the right than the left crawler traveling device 2. The lower-left camera 26 is supported by the vehicle body frame 1 using a stay.

A shooting direction 26a of the lower-left camera 26 is oriented diagonally downward toward the left, i.e., toward the left crawler traveling device 2. The lower-left camera 26 is provided so that a lower part of the vehicle body V and the field below the vehicle body V are included in a shooting range 26c thereof. Specifically, a front part of the left crawler traveling device 2 and the field around the left crawler traveling device 2 are included in the shooting range 26c of the lower-left camera 26.

Placement of Lower-Rear Camera

Figure 29:
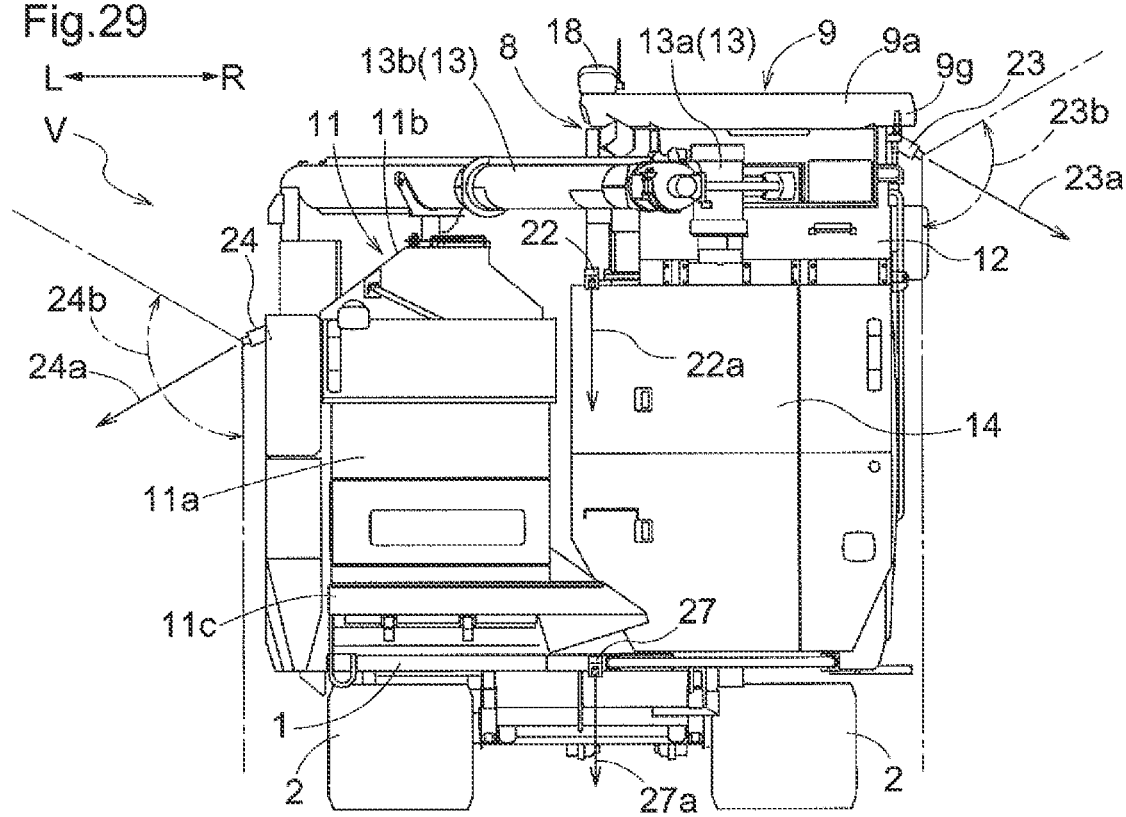
FIG. 29 is a rear view of the vehicle body of the standard combine according to the fourth embodiment.

As illustrated in FIGS. 25, 27, and 29, the lower-rear camera 27 is provided in a position of the vehicle body V lower than the front camera 21. Specifically, the lower-rear camera 27 is provided in a rear part of the vehicle body frame 1 so as to be located in a central part of the vehicle body V in the left-right direction. The lower-rear camera 27 is located in a position lower than the waste straw processing device 11c. The lower-rear camera 27 is supported by the vehicle body frame 1 using a stay.

A shooting direction 27a of the lower-rear camera 27 is oriented diagonally downward toward the rear, i.e., toward the field to the rear of the vehicle body V. The lower-rear camera 27 is provided so that a lower part of the vehicle body V, the field below the vehicle body V, and the field to the rear of the vehicle body V are included in a shooting range 27b thereof. Specifically, a lower part of the waste straw processing device 11c, the field below the waste straw processing device 11c, and the field to the rear of the waste straw processing device 11c are included in the shooting range 27b of the lower-rear camera 27.

Image Processing Device

Figure 30:
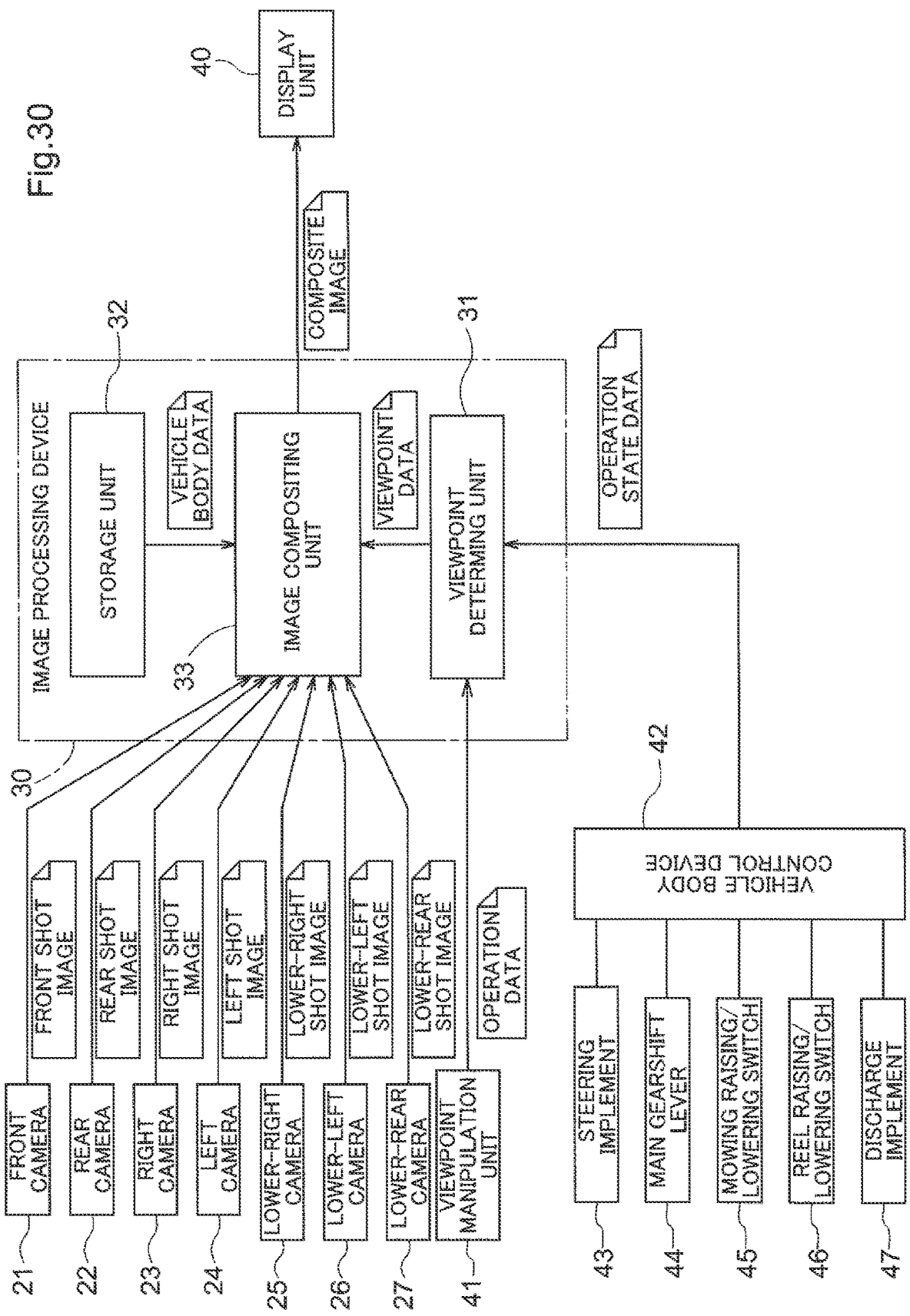
FIG. 30 is a block diagram illustrating a control configuration according to the fourth embodiment.

Like the standard combine described in the first embodiment, the standard combine according to the present embodiment includes the image processing device 30 and the display unit 40. As illustrated in FIG. 30, the front camera 21, the rear camera 22, the right camera 23, the left camera 24, the lower-right camera 25, the lower-left camera 26, and the lower-rear camera 27 are connected to the image processing device 30. A front shot image from the front camera 21, a rear shot image from the rear camera 22, a right shot image from the right camera 23, and a left shot image from the left camera 24 are input to the image processing device 30. A lower-right shot image from the lower-right camera 25, a lower-left shot image from the lower-left camera 26, and a lower-rear shot image from the lower-rear camera 27 are input to the image processing device 30. In the standard combine according to the present embodiment too, the composite image is generated by the image processing device 30 and displayed by the display unit 40 in the same manner as in the first embodiment.

The storage unit 32 for storing vehicle body data indicating the external shape of the vehicle body V. The vehicle body data is data expressing the three-dimensional shape of the vehicle body V, e.g., data expressing a 3D model of the vehicle body V. The vehicle body data includes data expressing the external shape of the crawler traveling devices 2, data expressing the external shape of the mowing unit 3, data expressing the external shape of the discharge device 13, and data expressing the external shape of the waste straw processing device 11c.

Example of Composite Image

Figure 31:
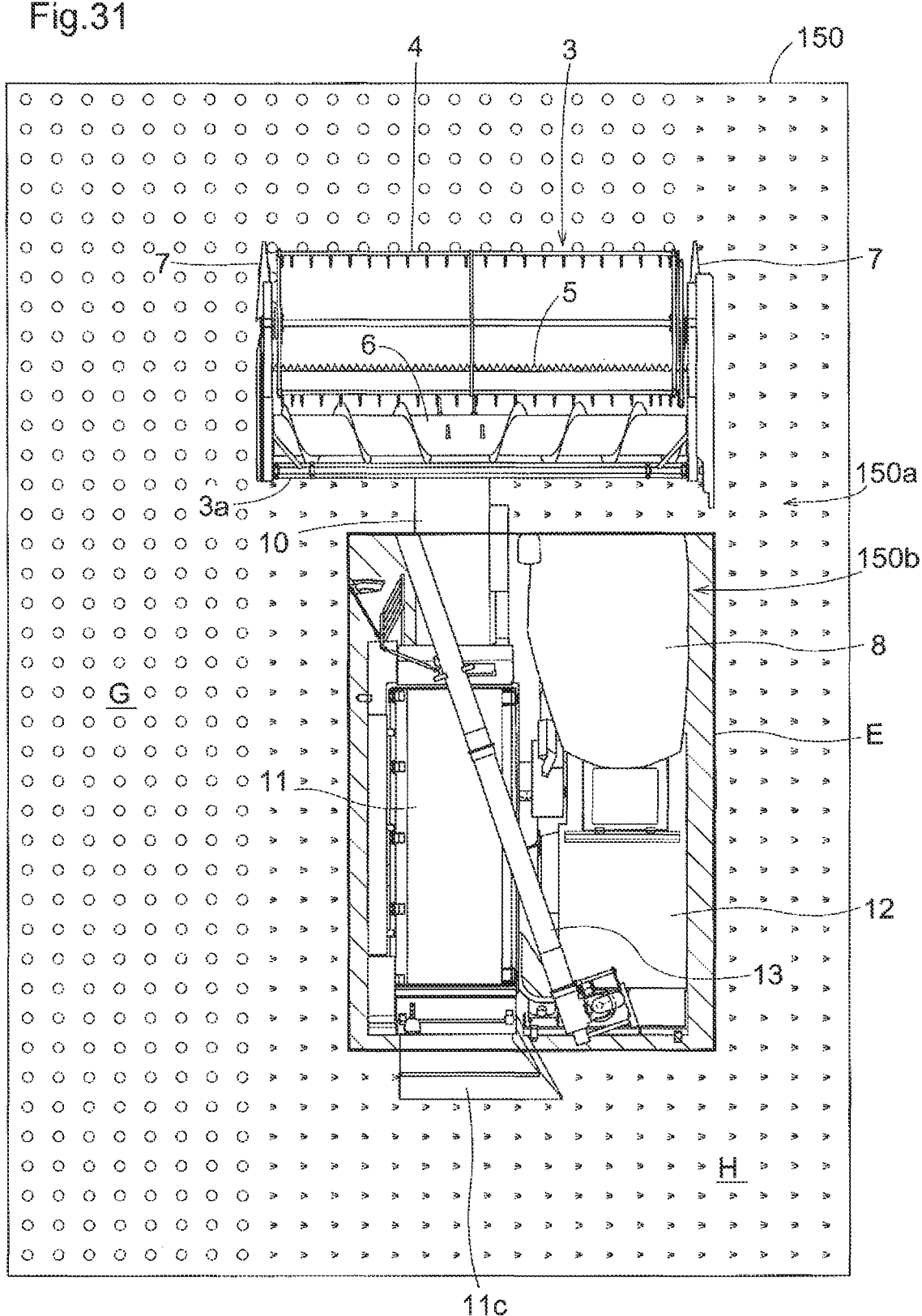
FIG. 31 is a diagram illustrating an example of a composite image according to the fourth embodiment.

Assume that the standard combine is performing harvesting operations while traveling forward in a field. An example of the composite image generated by the image compositing unit 33 at this time is illustrated in FIG. 31 as a composite image 150.

The operation state of the vehicle body V at this time is that the vehicle body V is traveling straight forward, the mowing unit 3 is in the working position and is operating, and the discharge device 13 is in the retracted position and is stopped. The vehicle body control device 42 outputs, to the image processing device 30, operation state data indicating the stated operation state of the vehicle body V.

Assume that the viewpoint manipulation unit 41 has accepted an operation specifying a planar viewpoint. The viewpoint manipulation unit 41 outputs operation data indicating the planar viewpoint to the viewpoint determining unit 31. On the basis of accepting the input of the operation data, the viewpoint determining unit 31 of the image processing device 30 determines the viewpoint of the composite image composited by the image compositing unit 33 (the composite viewpoint) as the planar viewpoint, and outputs viewpoint data to that effect to the image compositing unit 33.

The image compositing unit 33 generates the preliminary composite image by performing image processing including viewpoint conversion to the planar viewpoint and compositing in the shot images input from the seven cameras. Next, the image compositing unit 33 generates the vehicle body image by referring to the operation state data input from the vehicle body control device 42 and the viewpoint data input from the viewpoint determining unit 31. Specifically, the vehicle body image showing the vehicle body V from the planar viewpoint is generated using the data expressing the external shapes of the mowing unit 3 in the working position and the feeder 10, the data expressing the external shape of the discharge device 13 in the retracted position, and the vehicle body data pertaining to remaining parts of the vehicle body V. The image compositing unit 33 then generates the composite image 150 by compositing the vehicle body image with the preliminary composite image.

FIG. 31 illustrates the composite image 150 generated by the image compositing unit 33. A region 150a outside a boundary line E in the composite image 150 is an image originating from the preliminary composite image, and is an image originating from the shot images shot by the seven cameras. The shot mowing unit 3 (the mowing frame 3a, the raking reel 4, the raking auger 6, and the dividers 7), the feeder 10, the waste straw processing device 11c, the region to the rear of the mowing unit 3, the region to the rear of the waste straw processing device 11c, an already-mowed area H to the right and to the rear of the vehicle body V, and an unmowed area G to the left and to the front of the vehicle body V are indicated in this region 150a. A region 150b inside the boundary line E in the composite image 150 is a region originating from the vehicle body image. The driving section 8, the feeder 10, the threshing device 11, the grain tank 12, the discharge device 13, and the like are shown in the region 150b. In this example, the left and right crawler traveling devices 2, the field below the vehicle body V, and the field below the top panel 1ib are not shown in the composite image 150.

Figure 32:
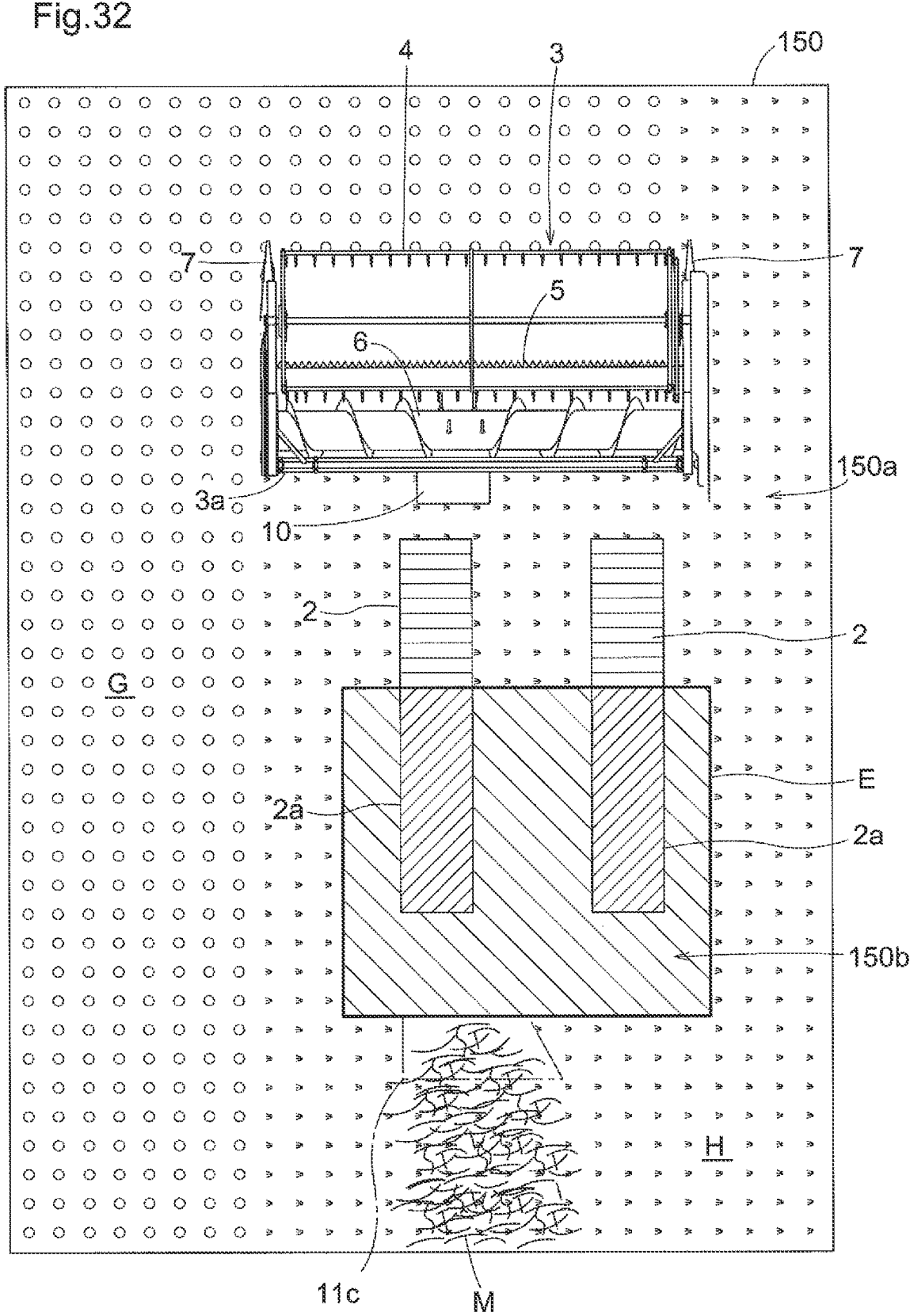
FIG. 32 is a diagram illustrating an example of a composite image according to the fourth embodiment.
Figure 33:
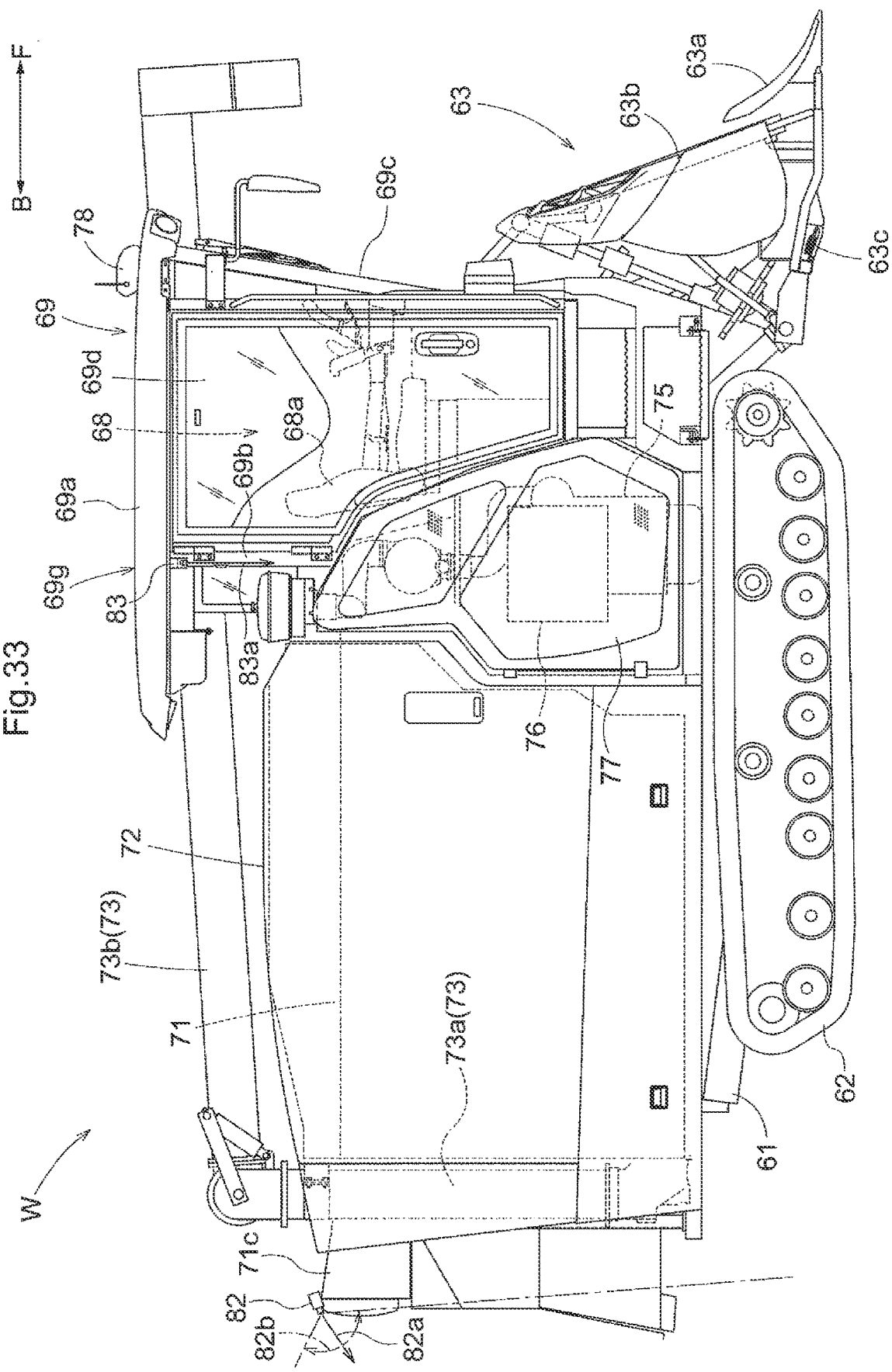
FIG. 33 is a right-side view of a vehicle body of a head-feeding combine according to a fifth embodiment.

FIG. 32 illustrates another example of the composite image 150. As in the foregoing example, the region 150a outside the boundary line E in the composite image 150 is an image originating mainly from the preliminary composite image, and is an image originating from the shot images shot by the seven cameras. The region 150b inside the boundary line E in the composite image 150 is a region originating mainly from the vehicle body image.

In the example in FIG. 32, the shot mowing unit 3 (the mowing frame 3a, the raking reel 4, the raking auger 6, and the dividers 7), the feeder 10, the region to the rear of the mowing unit 3, the region to the rear of the waste straw processing device 11c, an already-mowed area H to the right and to the rear of the vehicle body V, and an unmowed area G to the left and to the front of the vehicle body V are indicated in this region 150a. The front part of the crawler traveling devices 2 and the field around the crawler traveling devices 2 (the field below the vehicle body V), shot by the lower-right camera 25 and the lower-left camera 26, are shown in the region 150a. The field below the waste straw processing device 11c, the field to the rear of the waste straw processing device 11c, and already-cut waste straw M discharged from the waste straw processing device 11c, shot by the lower-rear camera 27, are shown in the region 150a. In the region 150a, the external shape of the waste straw processing device 11c generated from the vehicle body data is shown in a semi-transparent form.

An external shape 2a of the rear parts of the crawler traveling devices 2, generated from the vehicle body data, is shown in the region 150b.

In other words, in the example in FIG. 31, the external shapes of the driving section 8, the feeder 10, the threshing device 11, the grain tank 12, the discharge device 13, and the like, generated from the vehicle body data, are shown in the composite image 150. On the other hand, in the example in FIG. 32, instead of these external shape, the lower part of the vehicle body frame 1 (the front part of the crawler traveling devices 2) which has been shot, the field below the vehicle body frame 1 which has been shot, and the external shape 2a of the rear part of the crawler traveling devices 2 generated from the vehicle body data, are shown. The change in the image format described above can be achieved by changing the image processing method, settings, and the like used by the image compositing unit 33.

Switching Viewpoint of Composite Image

In the standard combine according to the present embodiment described thus far, the viewpoint of the composite image displayed in the display unit 40 can be switched at any time in response to an operation made by the driver through the viewpoint manipulation unit 41, a change in the operation state of the vehicle body V, or the like. Specifically, in response to accepting an operation from the driver specifying a viewpoint, the viewpoint manipulation unit 41 outputs operation data indicating that viewpoint to the viewpoint determining unit 31. In response to a change in the operation state of the vehicle body V, the vehicle body control device 42 outputs operation state data indicating the operation state of the vehicle body V to the viewpoint determining unit 31. Each time the input of the operation data and the operation state data is accepted, the viewpoint determining unit 31 determines the composite viewpoint and outputs viewpoint data indicating the composite viewpoint to the image compositing unit 33. The image compositing unit 33 generates the composite image so that the viewpoint of the generated composite image is the composite viewpoint indicated by the input viewpoint data, and outputs the composite image to the display unit 40. The viewpoint of the composite image displayed in the display unit 40 can be switched in this manner.

The viewpoint determining unit 31 may be configured such that when determining the composite viewpoint in accordance with the operation state data input from the vehicle body control device 42, the viewpoint determining unit 31 determines the composite viewpoint by selecting a viewpoint from a plurality of viewpoints viewing the vehicle body V diagonally from above. For example, the viewpoint determining unit 31 may be configured to determine a viewpoint viewing the vehicle body V diagonally above from the rear as the composite viewpoint in response to the input operation state data indicating that the vehicle body V is traveling forward, determine a viewpoint viewing the vehicle body V diagonally above from the front as the composite viewpoint in response to the vehicle body V traveling in reverse, and determine a viewpoint viewing the vehicle body V diagonally above from the left as the composite viewpoint in response to the discharge device 13 discharging grain.

Variations on Fourth Embodiment (1) The foregoing embodiment described an example in which the vehicle body V of the standard combine is provided with seven cameras. The number of cameras is not limited thereto, however, and two to six, or eight or more, cameras may be provided in the vehicle body V, depending on the combination of the front camera 21 and other cameras.

(2) In the foregoing embodiment, the entire mowing unit 3 (the entire mowing frame 3a, the entire raking reel 4, the entire raking auger 6, and the entire left and right dividers 7) is included in the shooting range 21b of the front camera 21, but the front camera 21 may be arranged such that part of the mowing unit 3 (part of the mowing frame 3a. part of the raking reel 4, part of the raking auger 6, and part of the left and right dividers 7) is included in the shooting range 21b of the front camera 21. In particular, the front camera 21 may be arranged such that all or part of the left divider 7, of the left and right dividers 7, is included in the shooting range 21b of the front camera 21.

(3) In the foregoing embodiment, the entire waste straw processing device 11c is included in the shooting range 22b of the rear camera 22, but the rear camera 22 may be arranged such that part of the waste straw processing device 11c is included in the shooting range 22b of the rear camera 22.

Fifth Embodiment

An embodiment of the present invention will be described on the basis of the drawings. Note that configurations that are the same as those in the foregoing embodiment may be given the same reference signs, and may not be described in detail.

Overall Configuration of Combine

FIGS. 33 to 37 illustrate a head-feeding combine, which is an example of a harvester. The configuration of this head-feeding combine is the same as in the head-feeding combine of the second embodiment (FIGS. 10 to 14).

Cameras

The front camera 81 (an example of a camera), the rear camera 82 (an example of a camera), the right camera 83 (an example of a camera), the left camera 84 (an example of a camera), and a lower-left camera 86 (an example of a camera and a lower camera) are provided in the vehicle body W of the head-feeding combine. These five cameras generate shot images and output the images to the image processing device 30 included in the vehicle body W. In the present embodiment, the five cameras mainly shoot images of fields, ridges, roads, and the like around the vehicle body W, and may also shoot images of parts of the vehicle body W. As such, part of the vehicle body W may be shown in the shot images.

The placements, support structures, and shooting ranges of the front camera 81, the rear camera 82, the right camera 83, and the left camera 84 are the same as in the first embodiment.

Placement of Lower-Left Camera

Figure 34:
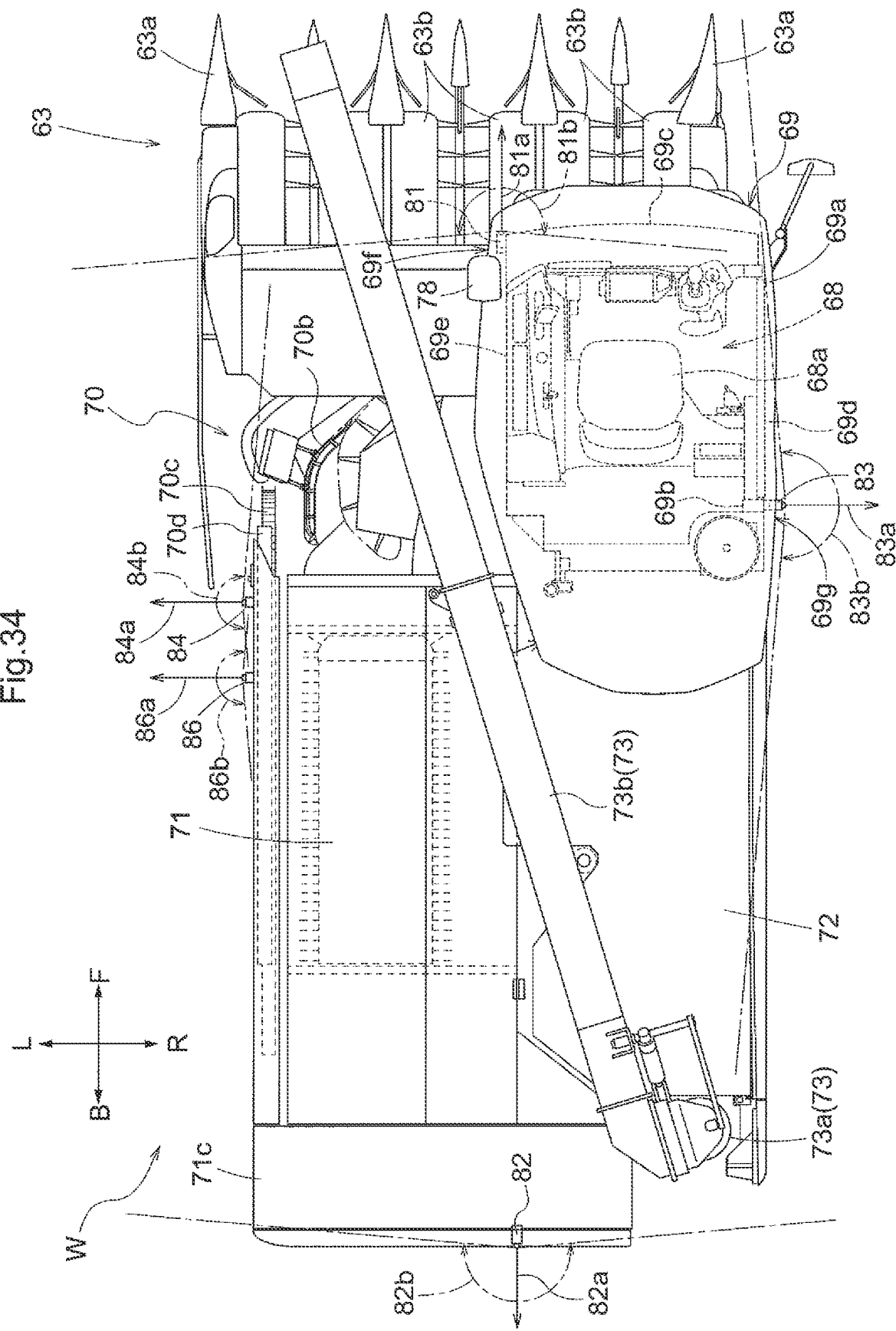
FIG. 34 is a plan view of the vehicle body of the head-feeding combine according to the fifth embodiment.
Figure 35:
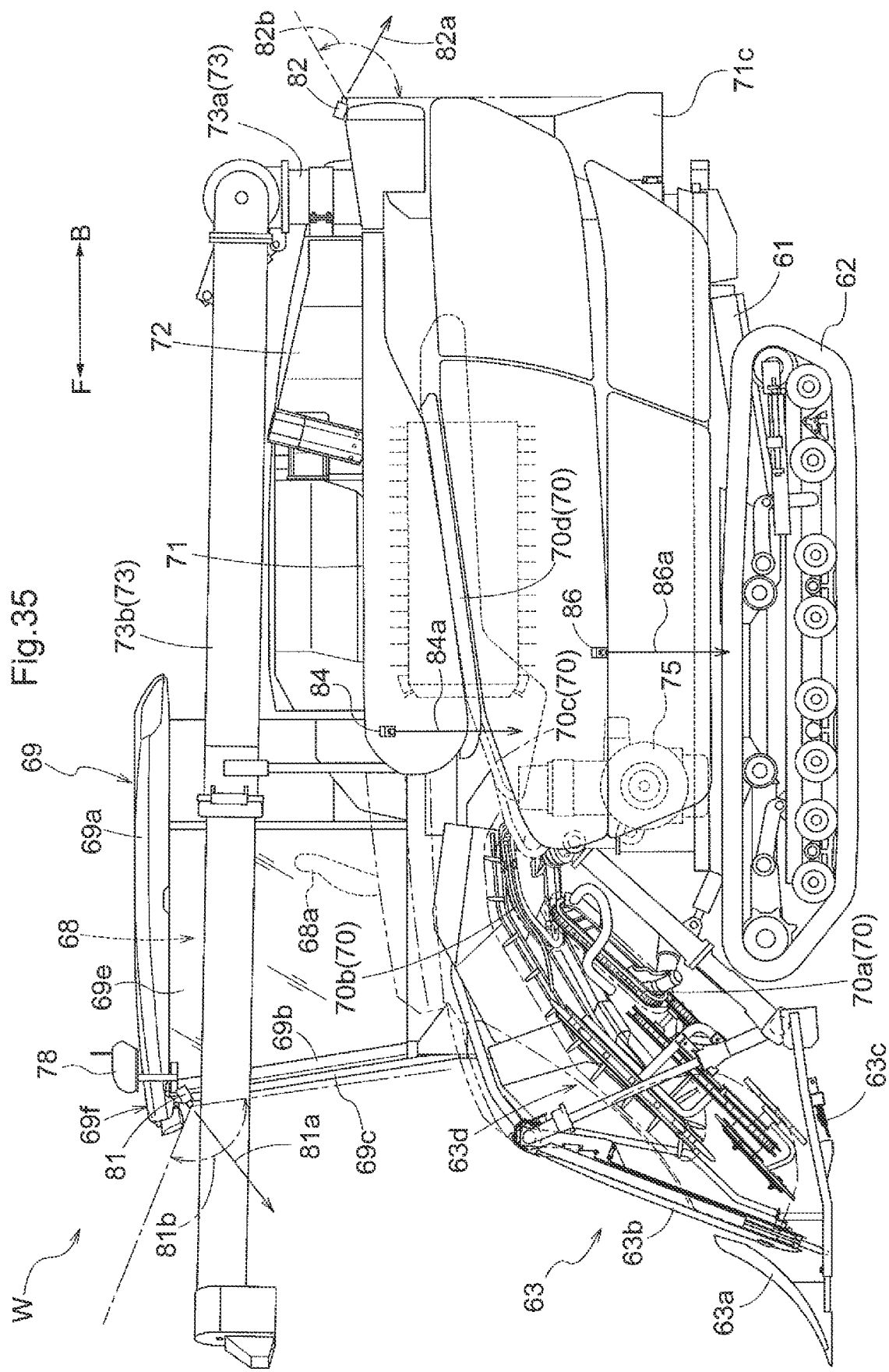
FIG. 35 is a left-side view of the vehicle body of the head-feeding combine according to the fifth embodiment.
Figure 36:
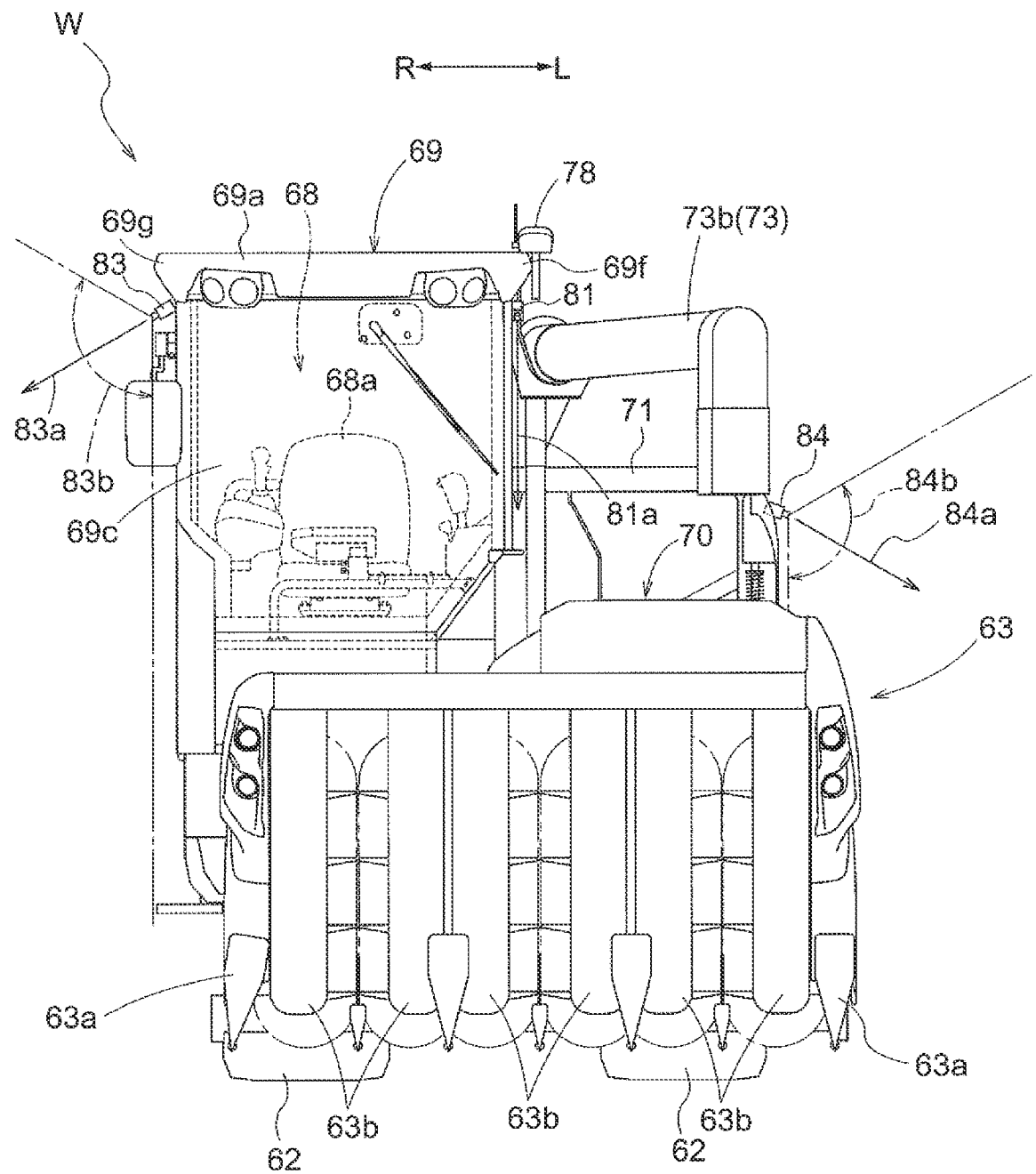
FIG. 36 is a front view of the vehicle body of the head-feeding combine according to the fifth embodiment.
Figure 37:
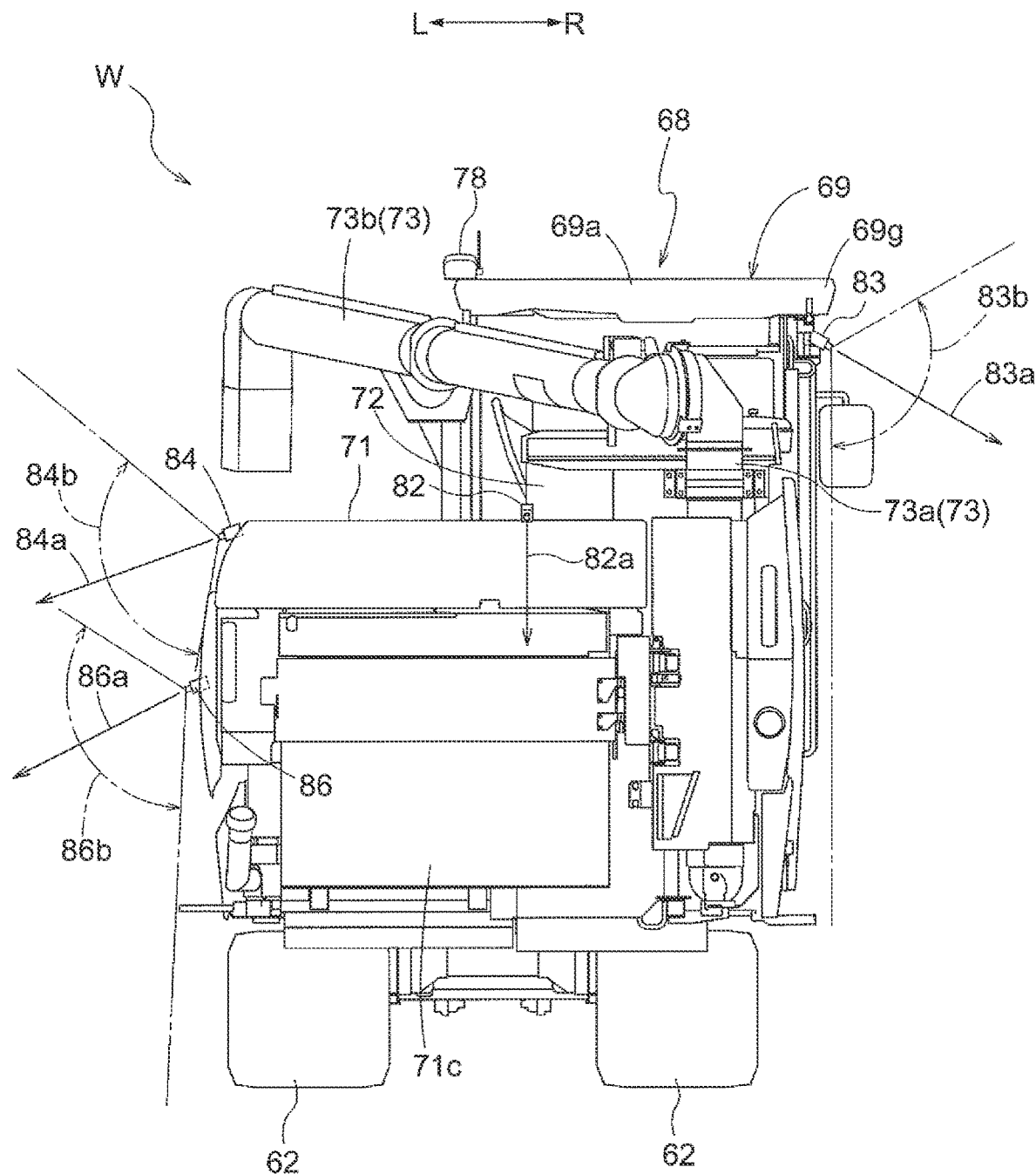
FIG. 37 is a rear view of the vehicle body of the head-feeding combine according to the fifth embodiment.

As illustrated in FIGS. 34, 35, and 37, the lower-left camera 86 is provided in a position of the vehicle body W lower than the front camera 81. Specifically, the lower-left camera 86 is provided in a left side part of the threshing device 71 so as to be located in what is substantially a central part of the vehicle body W in the front-back direction. The lower-left camera 86 is provided in the front part of the threshing device 71, adjacent on the left side. In other words, the lower-left camera 86 is placed on a left side surface of the front part of the threshing device 71. The lower-left camera 86 is supported by the threshing device 71 using a stay. The lower-left camera 86 is provided at a position lower than the satellite positioning module 78. The lower-left camera 86 is located to the rear and lower than the left camera 84.

A shooting direction 86a of the lower-left camera 86 is oriented diagonally downward toward the left, i.e., toward the left of the threshing device 71. The lower-left camera 86 is provided so that a region to the left of the threshing device 71, a region to the left of the transport unit 70, and a region to the left of the mowing unit 63 are included in a shooting range 86c thereof. The lower-left camera 86 is provided such that a region below the feed chain 70c (part of the vehicle body W, the field, and the like) is included in the shooting range 86c.

Image Processing Device

Figure 38:
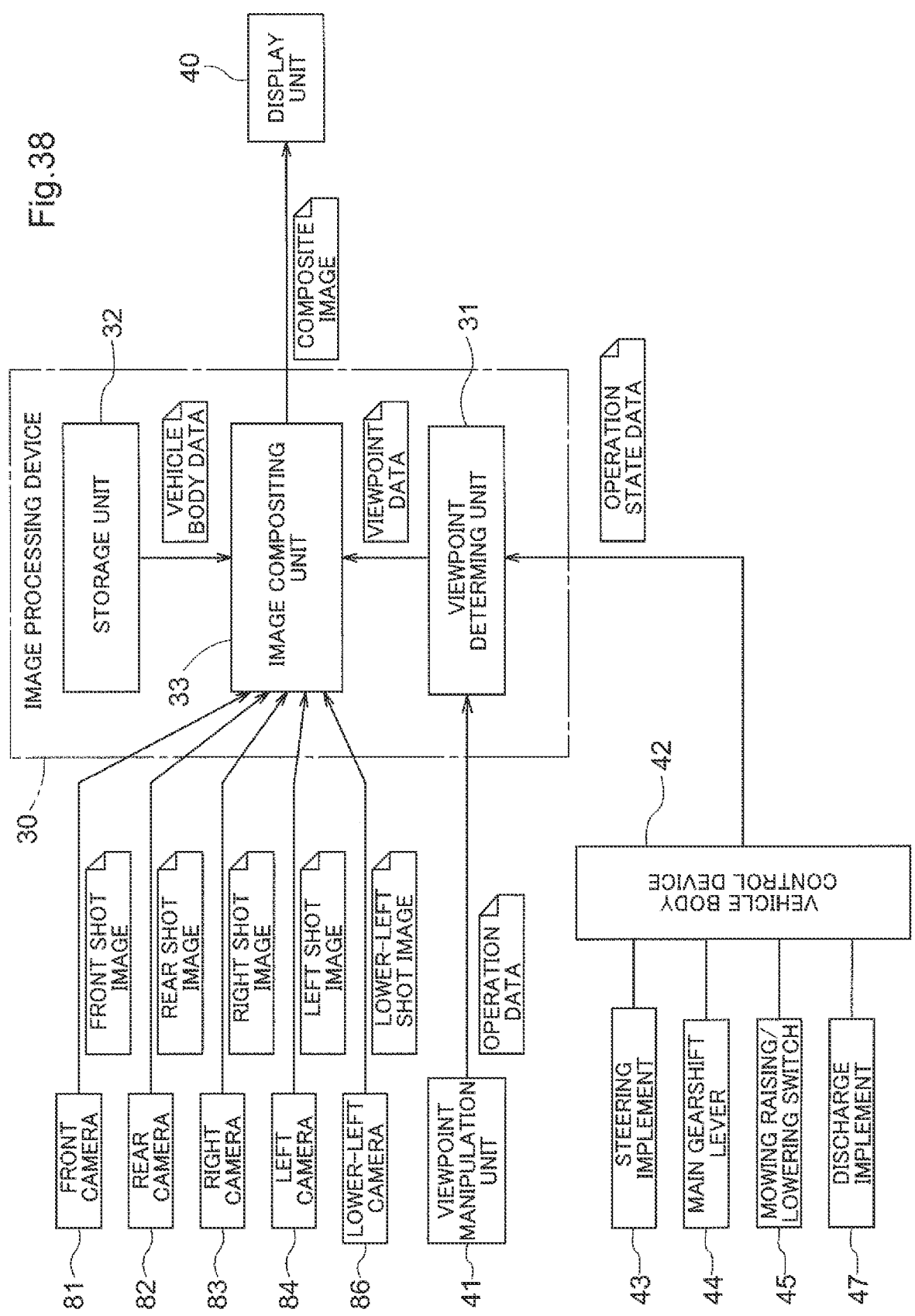
FIG. 38 is a block diagram illustrating a control configuration according to the fifth embodiment.

Like the head-feeding combine described in the first embodiment, the standard combine according to the present embodiment includes the image processing device 30 and the display unit 40. As illustrated in FIG. 38, the front camera 81, the rear camera 82, the right camera 83, the left camera 84, and the lower-left camera 86 are connected to the image processing device 30. A front shot image from the front camera 81, a rear shot image from the rear camera 82, a right shot image from the right camera 83, and a left shot image from the left camera 84 are input to the image processing device 30. A lower-left shot image from the lower-left camera 86 is input into the image processing device 30. In the head-feeding combine according to the present embodiment too, the composite image is generated by the image processing device 30 and displayed by the display unit 40 in the same manner as in the first embodiment.

The storage unit 32 for storing vehicle body data indicating the external shape of the vehicle body W. The vehicle body data is data expressing a three-dimensional shape of the vehicle body W, and is, for example, data expressing a 3D model of the vehicle body W. The vehicle body data includes data expressing the external shape of the crawler traveling devices 62, data expressing the external shape of the mowing unit 63, data expressing the external shape of the discharge device 73, and data expressing the external shape of the waste straw processing device 71c.

Example of Composite Image

Figure 39:
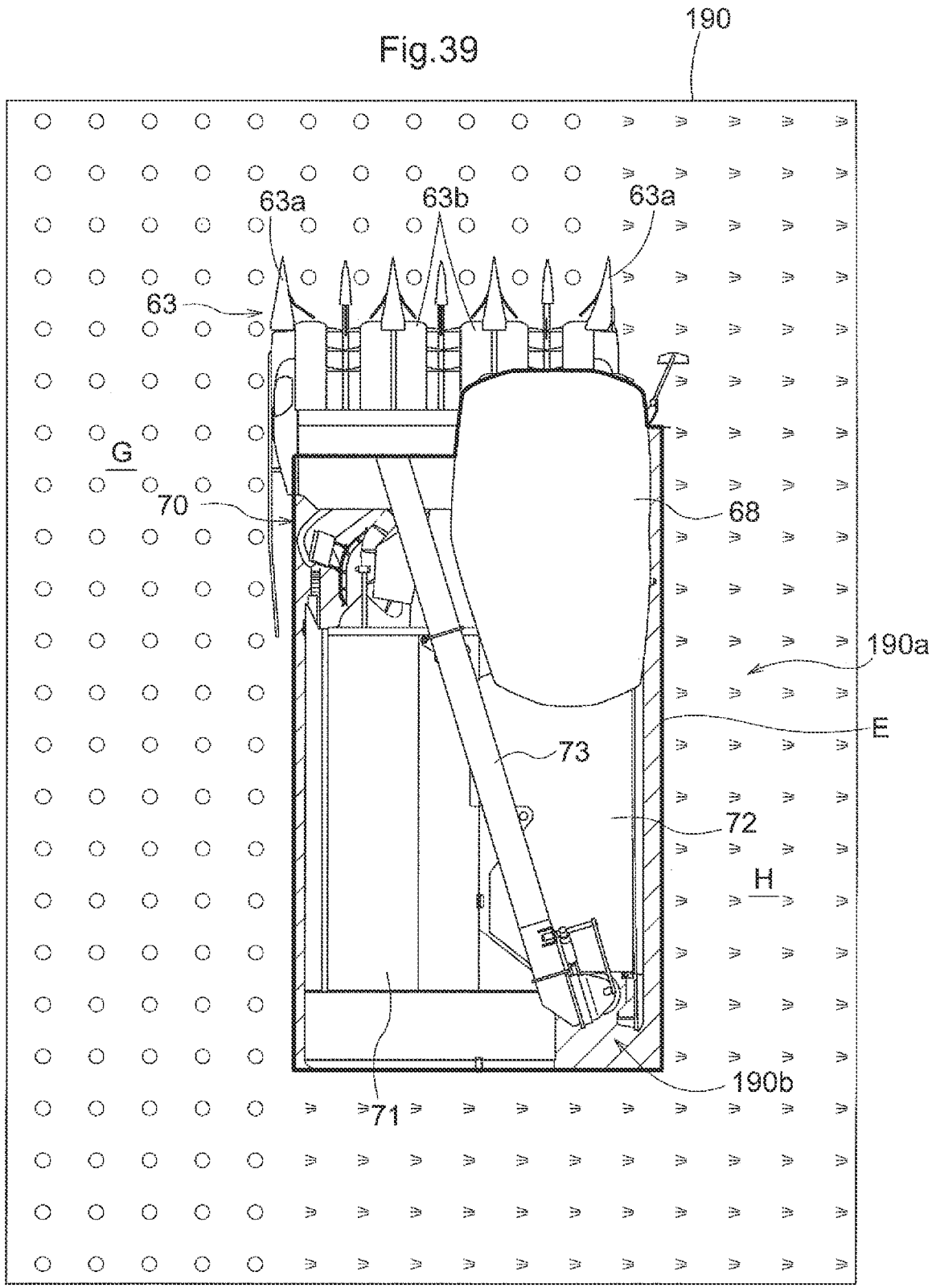
FIG. 39 is a diagram illustrating an example of a composite image according to the fifth embodiment.

Assume that the head-feeding combine is performing harvesting operations while traveling forward in a field. An example of the composite image generated by the image compositing unit 33 at this time is illustrated in FIG. 39 as a composite image 190.

The operation state of the vehicle body W at this time is that the vehicle body W is traveling straight forward, the mowing unit 63 is in the working position and is operating, and the discharge device 73 is in the retracted position and is stopped. The vehicle body control device 42 outputs, to the image processing device 30, operation state data indicating the stated operation state of the vehicle body W.

Assume that the viewpoint manipulation unit 41 has accepted an operation specifying a planar viewpoint. The viewpoint manipulation unit 41 outputs operation data indicating the planar viewpoint to the viewpoint determining unit 31. On the basis of accepting the input of the operation data, the viewpoint determining unit 31 of the image processing device 30 determines the viewpoint of the composite image composited by the image compositing unit 33 (the composite viewpoint) as the planar viewpoint, and outputs viewpoint data to that effect to the image compositing unit 33.

The image compositing unit 33 generates the preliminary composite image by performing image processing including viewpoint conversion to the planar viewpoint and compositing the shot images input from the five cameras. Next, the image compositing unit 33 generates the vehicle body image by referring to the operation state data input from the vehicle body control device 42 and the viewpoint data input from the viewpoint determining unit 31. Specifically, the vehicle body image showing the vehicle body W from the planar viewpoint is generated using the data expressing the external shapes of the mowing unit 63 in the working position and the transport unit 70, the data expressing the external shape of the discharge device 73 in the retracted position, and the vehicle body data pertaining to remaining parts of the vehicle body W. The image compositing unit 33 then generates the composite image 190 by compositing the vehicle body image with the preliminary composite image.

FIG. 39 illustrates the composite image 190 generated by the image compositing unit 33. A region 190a outside a boundary line E in the composite image 190 is an image originating from the preliminary composite image, and is an image originating from the shot images shot by the five cameras. The mowing unit 63 (the dividers 63a and the lifting device 63b), a region to the rear of the lifting device 63b (the rear part of the mowing unit 63), the already-mowed area H to the right and to the rear of the vehicle body W, and the unmowed area G to the left and to the front of the vehicle body W, which have been shot, are shown in the region 190a. In particular, the unmowed area G of the field, which is a region below the feed chain 70c and shot by the lower-left camera 86, is shown in the region 190a of the composite image 190. A region 190b inside the boundary line E in the composite image 190 is a region originating from the vehicle body image. The driving section 68, the transport unit 70, the threshing device 71, the grain tank 72, the discharge device 73, and the like are shown in the region 190b.

Switching Viewpoint of Composite Image

In the head-feeding combine according to the present embodiment described thus far, the viewpoint of the composite image displayed in the display unit 40 can be switched at any time in response to an operation made by the driver through the viewpoint manipulation unit 41, a change in the operation state of the vehicle body W, or the like. Specifically, in response to accepting an operation from the driver specifying a viewpoint, the viewpoint manipulation unit 41 outputs operation data indicating that viewpoint to the viewpoint determining unit 31. In response to a change in the operation state of the vehicle body W, the vehicle body control device 42 outputs operation state data indicating the operation state of the vehicle body W to the viewpoint determining unit 31. Each time the input of the operation data and the operation state data is accepted, the viewpoint determining unit 31 determines the composite viewpoint and outputs viewpoint data indicating the composite viewpoint to the image compositing unit 33. The image compositing unit 33 generates the composite image so that the viewpoint of the generated composite image is the composite viewpoint indicated by the input viewpoint data, and outputs the composite image to the display unit 40. The viewpoint of the composite image displayed in the display unit 40 can be switched in this manner.

The viewpoint determining unit 31 may be configured such that when determining the composite viewpoint in accordance with the operation state data input from the vehicle body control device 42, the viewpoint determining unit 31 determines the composite viewpoint by selecting a viewpoint from a plurality of viewpoints viewing the vehicle body W diagonally from above. For example, the viewpoint determining unit 31 may be configured to determine a viewpoint viewing the vehicle body W diagonally above from the rear as the composite viewpoint in response to the input operation state data indicating that the vehicle body W is traveling forward, determine a viewpoint viewing the vehicle body W diagonally above from the front as the composite viewpoint in response to the vehicle body W traveling in reverse, and determine a viewpoint viewing the vehicle body W diagonally above from the left as the composite viewpoint in response to the discharge device 73 discharging grain.

Variations on Fifth Embodiment (1) The foregoing embodiment described an example in which the vehicle body W of the head-feeding combine is provided with five cameras. The number of cameras is not limited thereto, however, and two to four, or six or more, cameras may be provided in the vehicle body W, depending on the combination of the front camera 81 and other cameras.

(2) In the foregoing embodiment, the entire mowing unit 63 (the entire left and right dividers 63*a* and the entire lifting device 63*b*) is included in the shooting range 81*b* of the front camera 81, but the front camera 81 may be arranged such that part of the mowing unit 63 (part of the left and right dividers 63*a* and part of the lifting device 63*b*) is included in the front camera 81 of the front camera 81. In particular, the front camera 81 may be arranged such that all or part of the left divider 63*a*. of the left and right dividers 63*a*. is included in the shooting range 81*b* of the front camera 81.

(3) In the foregoing embodiment, the entire waste straw processing device 71*c* is included in the shooting range 82*b* of the rear camera 82, but the rear camera 82 may be arranged such that part of the waste straw processing device 71*c* is included in the shooting range 82*b* of the rear camera 82.

(4) The vehicle body W of the head-feeding combine may be provided with a camera that includes a lower part of the vehicle body W in the shooting range. For example, the vehicle body W may be provided with a camera that includes a front part (or all) of the crawler traveling devices 62, the field below the vehicle body W, and the like in the shooting range. The vehicle body W may be provided with a camera that includes a lower part of the waste straw processing device 71*c*, the field below the waste straw processing device 71*c*, the field to the rear of the waste straw processing device 71*c*, and the like in the shooting range.

Sixth Embodiment

An embodiment of the present invention will be described on the basis of the drawings. Note that configurations that are the same as those in the foregoing embodiment may be given the same reference signs, and may not be described in detail.

Overall Configuration of Combine

Figure 40:
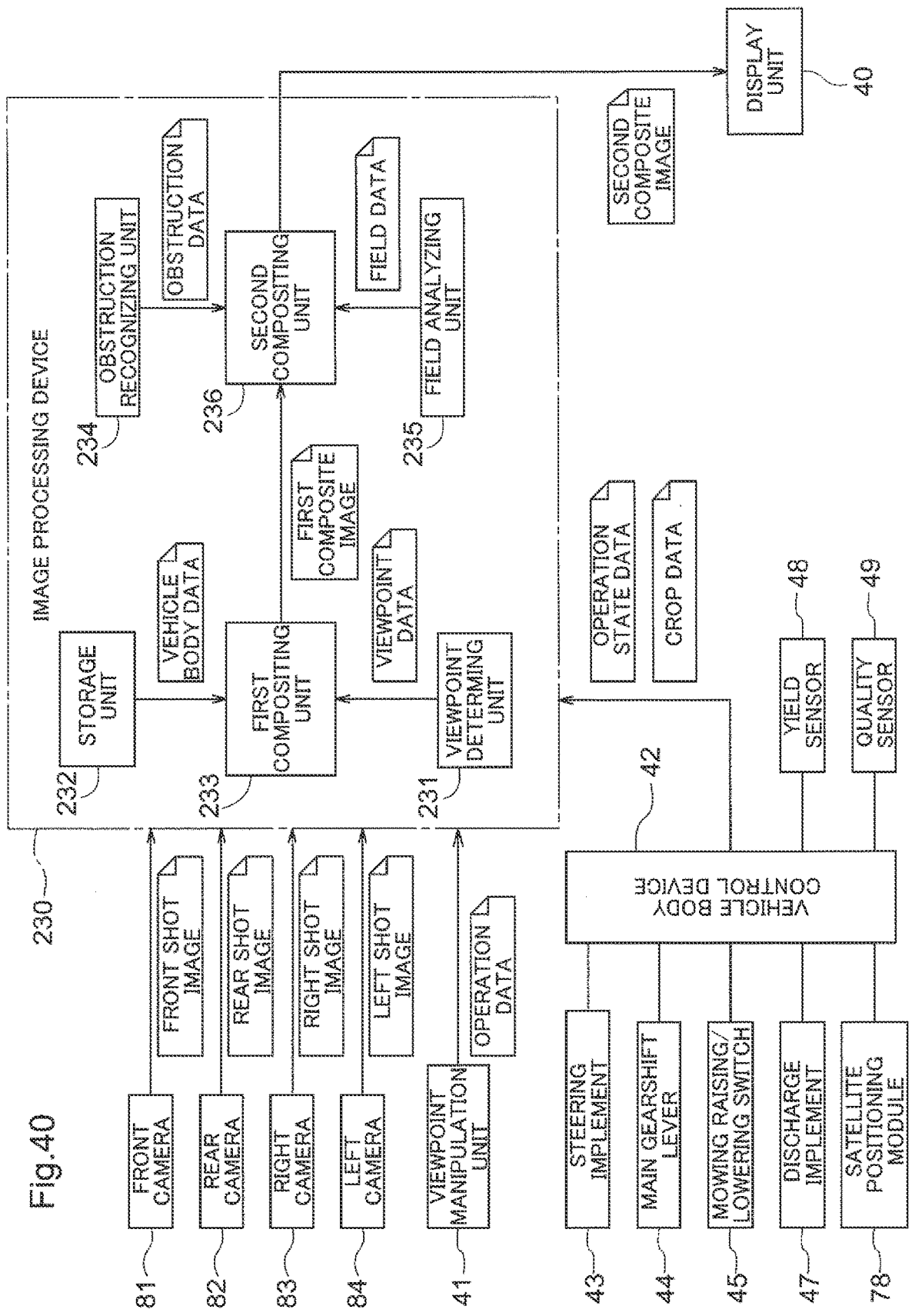
FIG. 40 is a block diagram illustrating a control configuration according to a sixth embodiment.

A head-feeding combine according to the present embodiment has the same configuration as the head-feeding combine according to the second embodiment (FIGS. 10 to 14), and includes the display unit 40 as in the first embodiment, as well as an image processing device 230 illustrated in FIG. 40.

Image Processing Device

Configurations pertaining to the image processing device 230 provided in the head-feeding combine will be described hereinafter with reference to the block diagram in FIG. 40.

The vehicle body W of the head-feeding combine is provided with the image processing device 230 and the display unit 40. The image processing device 230 generates a first composite image and a second composite image on the basis of the shot images output from the front camera 81, the rear camera 82, the right camera 83, and the left camera 84, and outputs the composite images to the display unit 40. The display unit 40 selectively displays one of the first composite image and the second composite image output by the image processing device 230 in accordance with an operation made by the driver. The image processing device 230 is configured including a microcomputer, and executes image processing according to a preset program. The image processing device 230 and the display unit 40 are provided in the driving section 68.

The front camera 81, the rear camera 82, the right camera 83, and the left camera 84 are connected to the image processing device 230. A front shot image from the front camera 81, a rear shot image from the rear camera 82, a right shot image from the right camera 83, and a left shot image from the left camera 84 are input to the image processing device 230.

A viewpoint manipulation unit 41 and a vehicle body control device 42 are connected to the image processing device 230. The viewpoint manipulation unit 41 accepts operations for changing/specifying a viewpoint from an operator and outputs operation data to the image processing device 230. The viewpoint manipulation unit 41 may be, for example, an implement such as a button, a knob, a joystick, or the like, or an input means such as a touch panel provided on the display unit 40.

The vehicle body control device 42 outputs, to the image processing device 230, operation state data indicating an operation state of the vehicle body W of the head-feeding combine and harvested crop data indicating a state of the harvested crop. Implements such as a steering implement 43, a main gearshift lever 44, a mowing raising/lowering switch 45, and a discharge implement 47, as well as a yield sensor 48, a quality sensor 49, and the satellite positioning module 78 are connected to the vehicle body control device 42. The vehicle body control device 42 generates the operation state data on the basis of signals from these implements, the yield sensor 48, the quality sensor 49, and the satellite positioning module 78, and outputs the generated data to the image processing device 230.

The yield sensor 48 is provided in the grain tank 72, measures a weight per unit of time of grain (an example of a harvested crop) fed into the grain tank 72, and outputs the weight to the vehicle body control device 42. For example, the yield sensor 48 is a force sensor provided at a feed inlet where the grain is fed from the threshing device 71 into the grain tank 72, and detects a force received from the grain fed into the grain tank 72.

The quality sensor 49 is provided in the grain tank 72, measures a quality (e.g., moisture content, protein content, or the like) of the grain fed into the grain tank 72, and outputs the quality to the vehicle body control device 42. For example, the quality sensor 49 is an optical analysis device, provided near the feed inlet where grain is fed from the threshing device 71 into the grain tank 72, which temporarily stores a portion of the grain fed into the grain tank 72 and measures the quality, such as the moisture content, protein content, or the like, through spectroscopy.

The operation state data includes data indicating operation states of the vehicle body W such as moving forward, reversing, turning, stopped, and the like; data indicating operation states of the mowing unit 63 such as operating, stopped, working position, non-working position, swinging position, and the like; and data indicating operation states of the discharge device 73 such as operating, stopped, retracted position, discharge position, swivel position, and the like.

The operation state data includes data indicating a travel speed and a self vehicle position of the vehicle body W. The vehicle body control device 42 calculates the travel speed and the self vehicle position from the signals from the steering implement 43 and the main gearshift lever 44, the self vehicle position and a change over time thereof input from the satellite positioning module 78, and the output of a speed sensor (not shown) installed in the crawler traveling devices 62, and generates the operation state data.

The operation state data includes data indicating a stored amount in the grain tank 72. On the basis of the output from a stored amount sensor (not shown) provided in the grain tank 72, the vehicle body control device 42 detects the stored amount in the grain tank 72 and generates the operation state data.

The operation state data includes data indicating a target path of the vehicle body W. On the basis of a work travel route set in advance and the self vehicle position input from the satellite positioning module 78, the vehicle body control device 42 determines the target path (a target travel direction) and generates the operation state data. Note that the work travel route may be input by the driver before harvesting operations, or may be generated automatically on the basis of a field map.

The operation state data includes data indicating an event occurring during harvesting operations. The "event occurring during harvesting operations" is, for example, an abnormal noise, a malfunction, or the like occurring in the crawler traveling devices 62, the mowing unit 63, the transport unit 70, the threshing device 71, the grain tank 72, the discharge device 73, or the like; operations stopping due to the grain tank 72 becoming full; the execution of discharge operations from the discharge device 73; or the like. The vehicle body control device 42 generates data indicating the type of the event, the location in the field where the event occurred, the time when the event occurrence, and the like on the basis of signals from the connected implements, sensors provided in the vehicle body W, the self vehicle position input from the satellite positioning module 78, and the like, and sends the data to the image processing device 230 as the operation state data.

The harvested crop data includes data indicating a state of the grain obtained by the threshing device 71 and stored in the grain tank 72. On the basis of a measurement value for the yield of the grain input from the yield sensor 48, a measurement value for the quality of the grain input from the quality sensor 49, and the self vehicle position input from the satellite positioning module 78, the vehicle body control device 42 generates data in which the position where the grain was harvested is associated with the yield and quality at that position, and sends the data to the image processing device 230 as the harvested crop data. For example, the vehicle body control device 42 divides the field into rectangular subregions, generates data in which average values of the yield and quality of the grain harvested in the subregions are associated with the locations of the subregions, and sends the data to the image processing device 230 as the harvested crop data. The "subregion" is a region obtained by virtually dividing the field, and is, for example, a region that is rectangular in plan view.

The image processing device 230 includes a viewpoint determining unit 231, a storage unit 232, a first compositing unit 233, an obstruction recognizing unit 234, a field analyzing unit 235, and a second compositing unit 236.

On the basis of the operation data output from the viewpoint manipulation unit 41 or the operation state data sent from the vehicle body control device 42, the viewpoint determining unit 231 determines a composite viewpoint to serve as a viewpoint of the first composite image generated by the first compositing unit 233, and outputs data indicating the composite viewpoint to the first compositing unit 233 as viewpoint data. Specifically, the viewpoint determining unit 231 determines the composite viewpoint as a viewpoint of viewing the vehicle body W from directly above, a viewpoint viewing the vehicle body W from diagonally above, and a viewpoint viewing the vehicle body W from the front/rear or the left/right. The "viewpoint viewing the vehicle body W from diagonally above" is, for example, a viewpoint viewing the vehicle body W diagonally above from the front, a viewpoint viewing the vehicle body W diagonally above from the rear, a viewpoint viewing the vehicle body W diagonally above from the right, a viewpoint viewing the vehicle body W diagonally above from the left, or the like.

The storage unit 232 for storing vehicle body data indicating the external shape of the vehicle body W. The vehicle body data is data expressing a three-dimensional shape of the vehicle body W, and is, for example, data expressing a 3D model of the vehicle body W. The vehicle body data includes data expressing the external shape of the crawler traveling devices 62, data expressing the external shape of the mowing unit 63, and data expressing the external shape of the discharge device 73.

The vehicle body data also includes data expressing the external shape of the mowing unit 63 in the working position, data expressing the external shape of the mowing unit 63 in the non-working position, data expressing the external shape of the discharge device 73 in the retracted position, and data expressing the external shape of the discharge device 73 in the discharge position. The vehicle body data is prepared in advance and stored in the storage unit 232.

On the basis of the four shot images input from the front camera 81, the rear camera 82, the right camera 83, and the left camera 84, and the vehicle body data stored in the storage unit 232, the first compositing unit 233 generates the first composite image, which is an image seen from the viewpoint determined by the viewpoint determining unit 231 and showing the vehicle body W and the surroundings thereof, and outputs the first composite image to the second compositing unit 236. Some parts of the vehicle body W captured by the cameras will appear in the first composite image. However, if the viewpoint determined by the viewpoint determining unit 231 is a viewpoint from which one of those parts of the vehicle body W cannot be seen, those parts will not appear in the first composite image.

Specifically, the first compositing unit 233 generates a preliminary composite image by performing image processing including viewpoint conversion and compositing in the shot images from the four cameras, and converting the composite viewpoint of the viewpoint data input from the viewpoint determining unit 231 into an image. The preliminary composite image is an image obtained by compositing the shot images shot and generated by the four cameras into a single image. Planar projection transformation using homography matrices, projection processing in three-dimensional space, and the like are specific methods for the image processing.

Next, the first compositing unit 233 reads out the vehicle body data from the storage unit 232 and generates an image of the vehicle body W viewed from the viewpoint indicated by the viewpoint data (a vehicle body image) from the vehicle body data. At this time, referring to the operation state data received from the vehicle body control device 42, the first compositing unit 233 generates a vehicle body image that matches the operation state using the vehicle body data based on the operation states of the mowing unit 63 and the discharge device 73. The first compositing unit 233 then generates the first composite image by compositing the preliminary composite image generated earlier with the vehicle body image.

The obstruction recognizing unit 234 analyzes the preliminary composite image generated by the first compositing unit 233 and detects the presence of an obstruction (a person, an animal, a farm tool, a ridge, or the like). Upon detecting an obstruction in the preliminary composite image, the obstruction recognizing unit 234 generates obstruction data indicating the type and position in the preliminary composite image or the obstruction, and outputs the data to the second compositing unit 236. The obstruction recognizing unit 234 may be configured to detect the presence of obstructions by analyzing the four shot images input from the front camera 81, rear camera 82, right camera 83, and left camera 84.

The field analyzing unit 235 analyzes the preliminary composite image generated by the first compositing unit 233 and detects the states of the subregions, which are partial regions of the field. The "subregion" is a region obtained by virtually dividing the field, and is, for example, a region that is rectangular in plan view. The state of a subregion is, for example, whether the subregion is a region in which the crop has already been harvested (an already-mowed area) or a region in which the crop has not yet been harvested (an unmowed area), whether or not the crop in the subregion has fallen, the growth state of the crop in the subregion, and so on. Upon analyzing the preliminary composite image and detecting the state of a subregion, the field analyzing unit 235 generates field data expressing the state of that subregion and the location of the subregion in the preliminary composite image, and outputs the data to the second compositing unit 236. Note that the field analyzing unit 235 may be configured to detect the states of subregions by analyzing the four shot images input from the front camera 81, rear camera 82, right camera 83, and left camera 84.

The second compositing unit 236 generates a second composite image by compositing an information presentation image with the first composite image generated by the first compositing unit 233 at a related position in the first composite image. The second compositing unit 236 then outputs the second composite image to the display unit 40. In other words, the second compositing unit 236 is a display control unit that causes the second composite image to be displayed in the display unit 40. The information presentation image is an image indicating information related to harvesting operations. The related position is a position in the first composite image which position is related to the information presentation image.

For example, the information presentation image is an image that alerts the driver to the presence of an obstruction in the field. In this case, the related position is a position in the first composite image which position corresponds to the position of the obstruction or the vicinity thereof. The second compositing unit 236 generates the second composite image by reading out the information presentation image in accordance with the type of the obstruction from the storage unit 232 on the basis of the obstruction data input from the obstruction recognizing unit 234, and compositing the information presentation image at the related position in the first composite image which position corresponds to the position of the obstruction (or the vicinity thereof). In the example of a second composite image 290 illustrated in FIG. 8, a circular information presentation image 291n and an information presentation image 291p in the shape of an exclamation point are shown in a related position corresponding to a position in the vicinity of a person (an obstruction) located diagonally to the right and the front of the vehicle body W. An information presentation image 291q expressed as diagonal hatching is shown superimposed on the related position corresponding to a ridge (obstruction) located in front of the vehicle body W.

For example, the information presentation image is an image that alerts the driver to the state of the vehicle body W. In this case, the related position is a position in the first composite image which position corresponds to the position of the vehicle body W or the vicinity thereof. The second compositing unit 236 generates the second composite image by reading out the information presentation image in accordance with the type of operation state to be displayed from the storage unit 232 on the basis of the operation state data input from the vehicle body control device 42, and compositing the information presentation image at the related position in the first composite image that corresponds to the position of the vehicle body W (or the vicinity thereof) and that is suited to the type of the operation state to be displayed. In the example of the second composite image 290 illustrated in FIG. 9, an information presentation image 291s expressed as diagonal hatching and indicating that the grain tank 72 is full is shown in a related position corresponding to the grain tank 72 of the vehicle body W.

For example, the information presentation image is an image showing the state of a subregion, which is a partial region of the field. In this case, the related position is a position in the first composite image which position corresponds to the position of the subregion or the vicinity thereof. The second compositing unit 236 generates the second composite image by reading out the information presentation image in accordance with the type of the state to be displayed (already-mowed/unmowed, whether or not the crop has fallen, the growth state of the crop, and the like) from the storage unit 232 on the basis of the field data input from the field analyzing unit 235, and compositing the information presentation image at the related position in the first composite image which position corresponds to the position of the subregion or the vicinity thereof indicated by the field data. In the example of the second composite image 290 illustrated in FIG. 41, information presentation images 291k,91m expressed as right-downward diagonal hatching are shown in related positions corresponding to two rectangular subregions in the unmowed area G to the left of the vehicle body W. The information presentation image 291k shows that the crop has fallen in that subregion. The information presentation image 291m shows that there is a crop with poor growth in that subregion. In other words, the information presentation images 291*k*,91*m* are images showing the state of an unharvested crop in the subregion.

For example, the information presentation image is an image showing a state of the grain (the harvested crop). In this case, the related position is a position in the first composite image which position corresponding to the position where the grain was harvested or the vicinity thereof. The second compositing unit 236 generates the second composite image by reading out the information presentation image in accordance with the type of the state to be displayed (yield, quality, or the like) from the storage unit 232 on the basis of the harvested crop data input from the vehicle body control device 42, and compositing the information presentation image at the related position in the first composite image which position corresponds to the position where the grain was harvested or the vicinity thereof indicated by the harvested crop data. In the example of the second composite image 290 illustrated in FIG. 41, information presentation images 291*a*, 91*b*, 91*c*, 91*d*, 91*e*, 91*f*, 91*g*, 91*h*, 91*i*, and 91*j* expressed as right-upward diagonal hatching are shown in related positions corresponding to rectangular subregions in the already-mowed area H to the right of the vehicle body W. The density of the hatching in each information presentation image indicates the magnitude of the yield in that subregion, and the higher the yield in that subregion, the greater the density of the hatching. In other words, these information presentation images are images showing the grain yield. Note that the information presentation image may be an image showing the quality of the grain, and the second compositing unit 236 may composite the information presentation image with the first composite image such that the density of the hatching increases as the quality (e.g., the protein content) in the subregion increases.

For example, the information presentation image is an image showing the target path of the vehicle body W. In this case, the related position is a position in the first composite image that is forward on the target path. The second compositing unit 236 generates the second composite image by reading out the information presentation image in accordance with the target path to be displayed from the storage unit 232 on the basis of the operation state data input from the vehicle body control device 42, and compositing the information presentation image at a position in the first composite image forward on the target path of the vehicle body W. In the example of the second composite image 290 illustrated in FIG. 42, the target path is a U-turn made before a ridge, and an information presentation image 291*r* which is a U-shaped arrow indicating the target path is shown in front and to the left of the vehicle body W, which is a position forward on the target path.

For example, the information presentation image is an image indicating that an event has occurred during harvesting operations. In this case, the related position is a position in the first composite image which position corresponds to the position where the event occurred or the vicinity thereof. The second compositing unit 236 generates the second composite image by reading out the information presentation image in accordance with the event to be displayed from the storage unit 232 on the basis of the operation state data input from the vehicle body control device 42, and compositing the information presentation image at a related position in the first composite image which position corresponds to the position where the event occurred as indicated by the operation state data. In the example of the second composite image 290 illustrated in FIG. 43, an information presentation image 291*t* which reads "STOP" in a triangle is shown in front of the vehicle body W. The information presentation image 291*t* indicates that operations have stopped due to the grain tank 72 being full.

All the information presentation images may be composited with a single first composite image, or one or a plurality of the information presentation images may be composited. The type of information presentation image to be composited with the first composite image by the second compositing unit 236 may be determined, for example, on the basis of an operation made by the driver and accepted by an operation unit (not shown) provided on the display unit 40, or may be automatically changed as time passes.

Example of Second Composite Image

Figure 41:
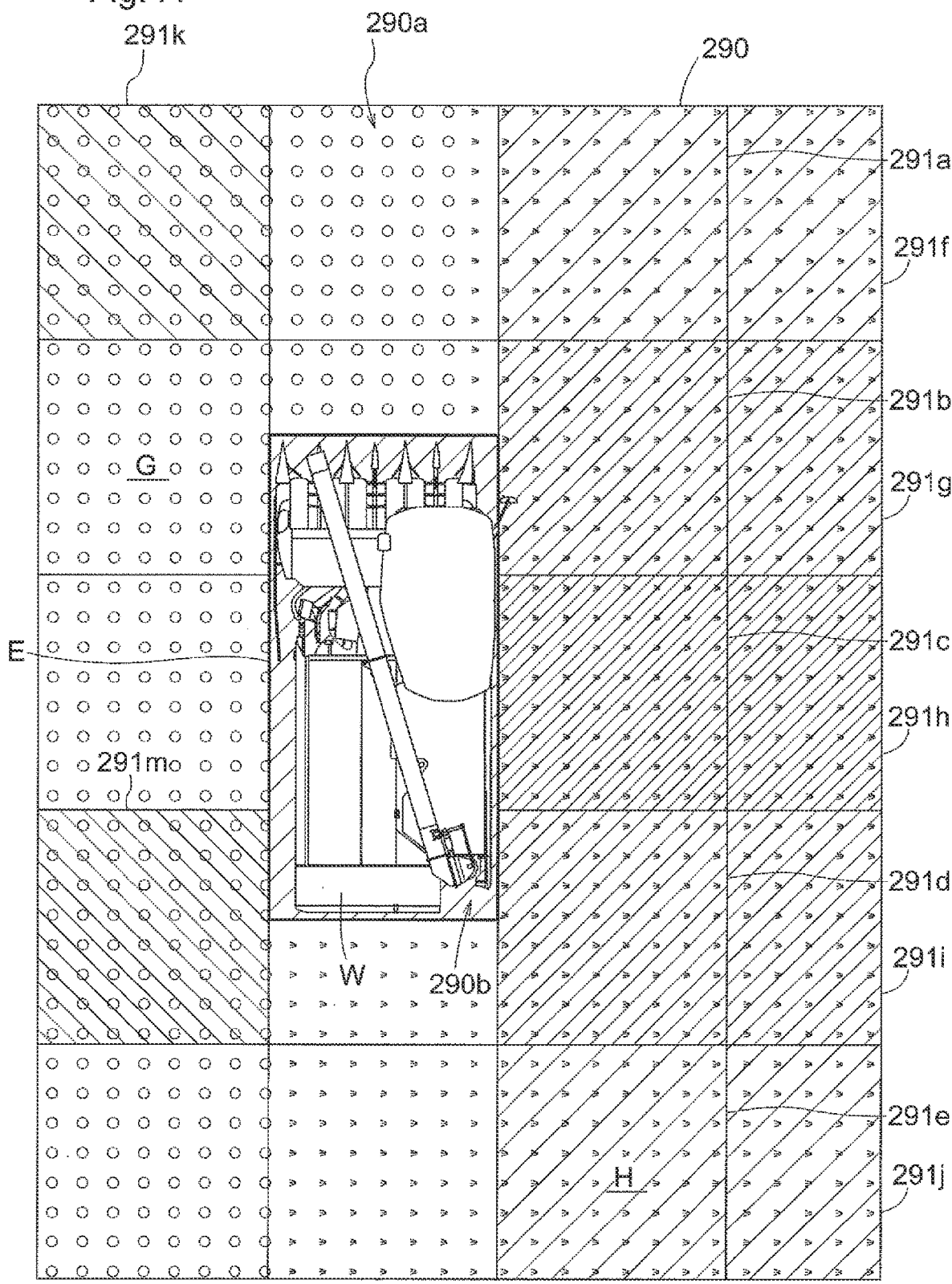
FIG. 41 is a diagram illustrating an example of a composite image according to the sixth embodiment.
Figure 42:
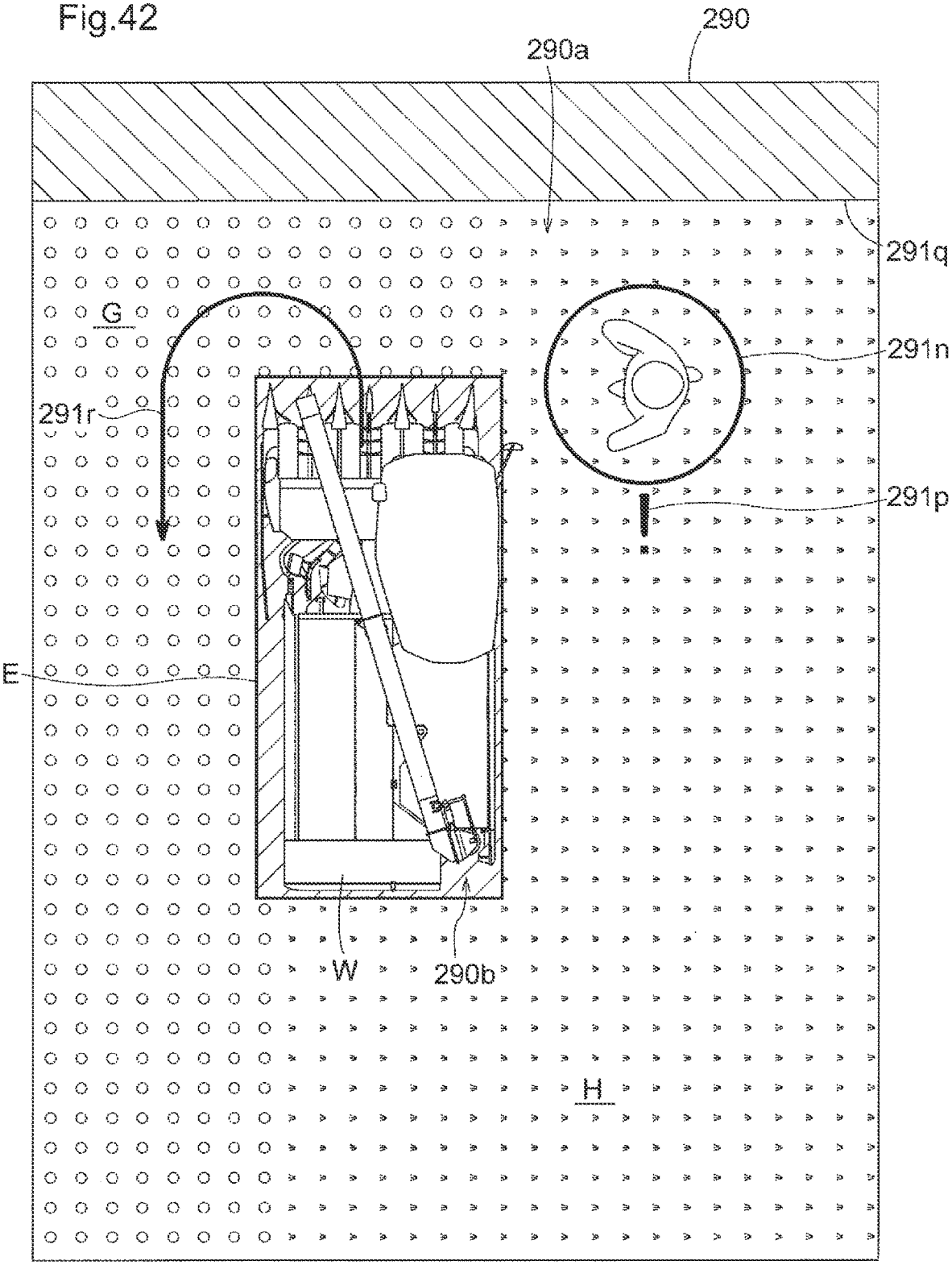
FIG. 42 is a diagram illustrating an example of a composite image according to the sixth embodiment.
Figure 43:
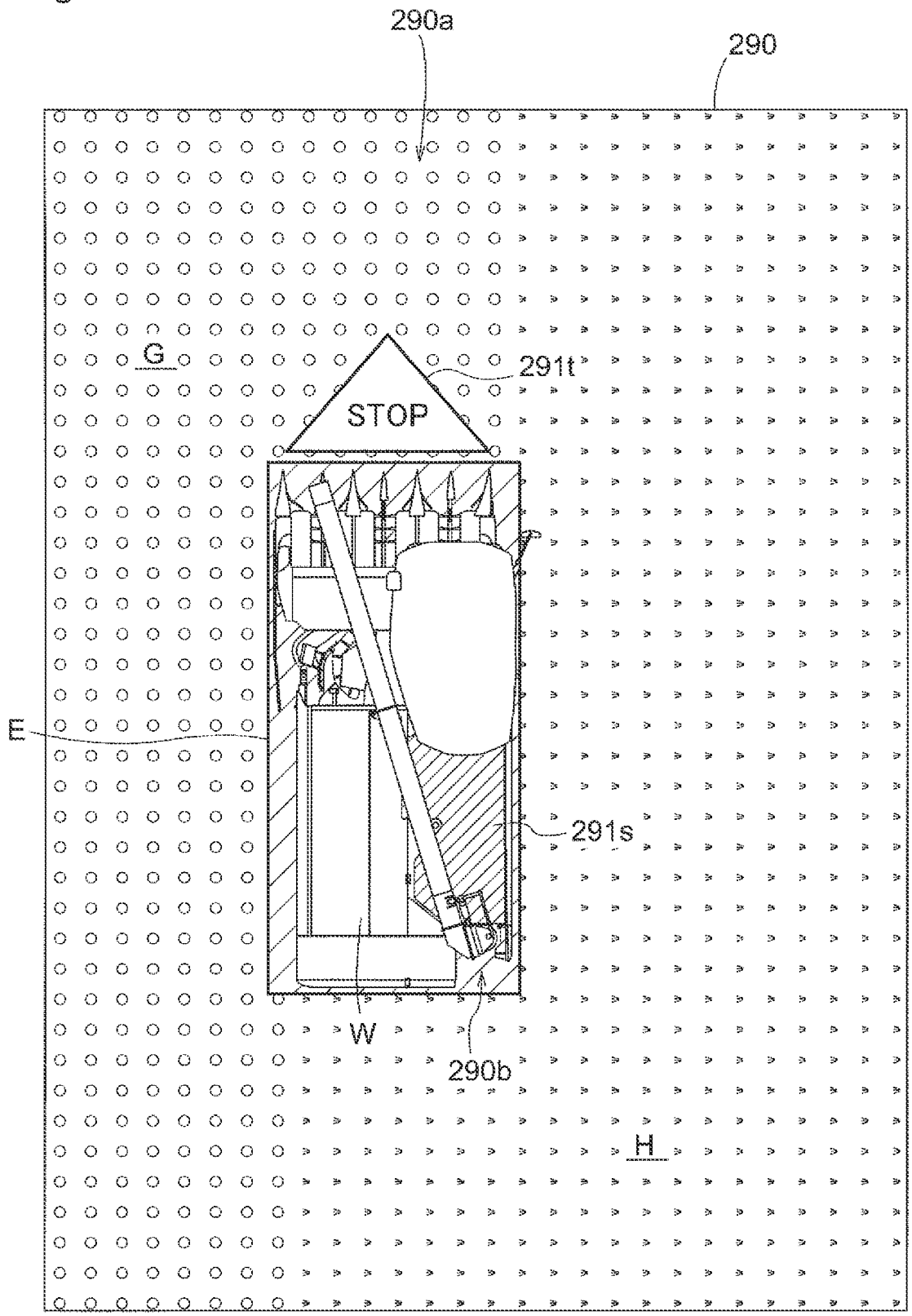
FIG. 43 is a diagram illustrating an example of a composite image according to the sixth embodiment.

Assume that the head-feeding combine is performing harvesting operations while traveling forward in a field. An example of the second composite image generated by the second compositing unit 236 at this time is illustrated in FIG. 41, FIG. 42, and FIG. 43 as the second composite image 290.

The operation state of the vehicle body W at this time is that the vehicle body

W is traveling straight forward, the mowing unit 63 is in the working position and is operating, and the discharge device 73 is in the retracted position and is stopped. The vehicle body control device 42 outputs, to the image processing device 230, operation state data indicating the stated operation state of the vehicle body W.

Assume that the viewpoint manipulation unit 41 has accepted an operation specifying a planar viewpoint. The viewpoint manipulation unit 41 outputs operation data indicating the planar viewpoint to the viewpoint determining unit 231. On the basis of accepting the input of the operation data, the viewpoint determining unit 231 of the image processing device 230 determines the viewpoint of the first composite image composited by the first compositing unit 233 (the composite viewpoint) as the planar viewpoint, and outputs viewpoint data to that effect to the first compositing unit 233.

The first compositing unit 233 generates the preliminary composite image by performing image processing including viewpoint conversion to the planar viewpoint and compositing in the shot images input from the four cameras. The first compositing unit 233 generates the vehicle body image by referring to the operation state data input from the vehicle body control device 42 and the viewpoint data input from the viewpoint determining unit 231. Specifically, the vehicle body image showing the vehicle body W from the planar viewpoint is generated using the data expressing the external shapes of the mowing unit 63 in the working position and the transport unit 70, the data expressing the external shape of the discharge device 73 in the retracted position, and the vehicle body data pertaining to remaining parts of the vehicle body W. The first compositing unit 233 generates the first composite image by compositing the vehicle body image with the preliminary composite image, and outputs the first composite image to the second compositing unit 236.

Then, the second compositing unit 236 generates the second composite image by compositing the information presentation image indicating the information related to harvesting operations with the related position, which is a position in the first composite image related to that information presentation image, on the basis of the obstruction data output from the obstruction recognizing unit 234, the field data output from the field analyzing unit 235, and the operation state data and harvested crop data output from the vehicle body control device 42, and outputs the second composite image to the display unit 40.

Examples of the second composite image 290 generated by the second compositing unit 236 are illustrated in FIG. 41, FIG. 42, and FIG. 43. A region 290*a* outside a boundary line E in the second composite image 290 is an image originating from the preliminary composite image, and is an image originating from the shot images shot by the four cameras. The already-mowed area H to the right and to the rear of the vehicle body W, and the unmowed area G to the left and to the front of the vehicle body W, are shown in the region 290*a*. A region 290*b* inside the boundary line E in the second composite image 290 is a region originating from the vehicle body image. The vehicle body W is shown in the region 290*b*.

In the example of FIG. 41, the information presentation images 291*a*, 91*b*, 91*c*, 91*d*, 91*e*, 91*f*, 91*g*, 91*h*, 91*i*, and 91*j*, which indicate the quality of the grain harvested in the corresponding subregions, are shown in the related positions in the region 290*a* corresponding to those subregions in the already-mowed area H. The density of the hatching in each information presentation image indicates the magnitude of the yield in that subregion, and the higher the yield in that subregion, the greater the density of the hatching.

Additionally, in the example of FIG. 41, the information presentation images 291*k* and 91*m*, which indicate the state of the crops in the corresponding subregions, are shown in the related positions in the region 290*a* corresponding to those subregions in the unmowed area G. The information presentation image 291*k*, which has relatively large gaps between the hatch lines, shows that the crop has fallen in that subregion. The information presentation image 291*m*, which has relatively small gaps between the hatch lines, shows that the crop has experienced poor growth in that subregion.

In the example of FIG. 42, the information presentation images 291*n*, 91*p*, and 91*q*, which alert the driver to the presence of an obstruction, are shown in the related positions in the second composite image 290 corresponding to positions in the vicinity of obstructions (people, ridges). Specifically, a circular information presentation image 291*n* and the information presentation image 291*p* in the shape of an exclamation point are shown at a position corresponding to the vicinity of a person (around and to the front of the person). The information presentation image 291*q* expressed as diagonal hatching is shown in a position corresponding to the ridge.

Additionally, in the example of FIG. 42, the information presentation image 291*r*, which is a U-shaped arrow indicating the target path, is shown in the second composite image 290, in a position forward on the target path of the vehicle body W.

In the example of FIG. 43, the information presentation image 291*s*, which alerts the driver to the state of the vehicle body W, is shown in a related position in the region 290*a* corresponding to the position of the vehicle body W. Specifically, the information presentation image 291*s* expressed as diagonal hatching and indicating that the grain tank 72 is full is shown in a position in the region 290*a* corresponding to the grain tank 72 of the vehicle body W.

Additionally, in the example of FIG. 43, the information presentation image 291*t*, which indicates that an event has occurred during harvesting operations, is shown in a related position in the region 290*a* corresponding to the position where the event occurred. Specifically, the information presentation image 291*t*, which indicates that operations have stopped due to the grain tank 72 being full, is shown in a related position in the region 290*a* corresponding to the position in the field where the grain tank 72 became full.

Figure 44:
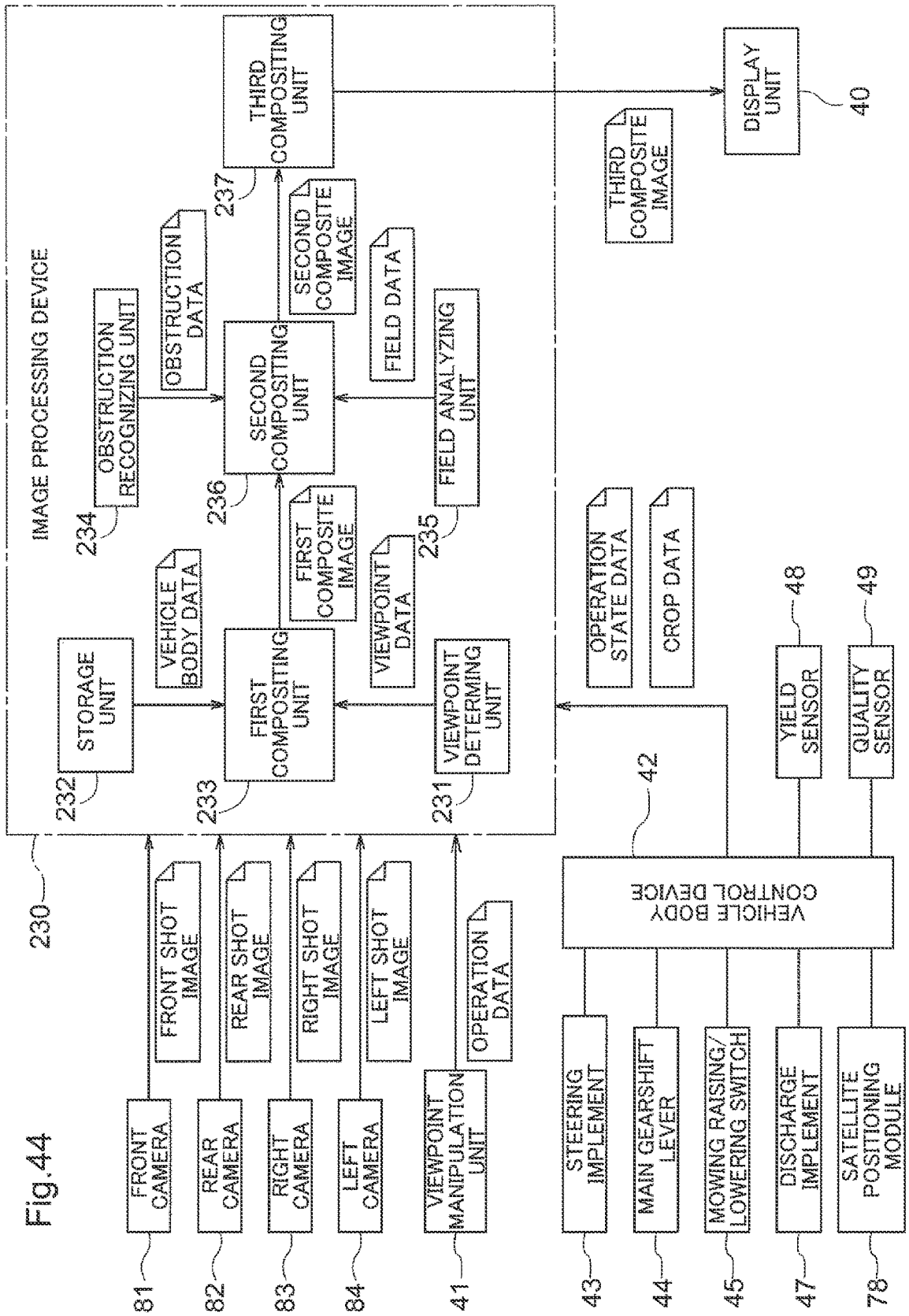
FIG. 44 is a block diagram illustrating a control configuration according to a variation on the sixth embodiment.

Variations on Sixth Embodiment (1) FIG. 44 illustrates another form of the image processing device 230. In the following descriptions, configurations that are the same as those in the foregoing embodiment may be given the same reference signs, and may not be described in detail.

The image processing device 230 according to the present embodiment includes a third compositing unit 237 in addition to the viewpoint determining unit 231, the storage unit 232, the first compositing unit 233, the obstruction recognizing unit 234, and the field analyzing unit 235. The third compositing unit 237 generates a third composite image by compositing the second composite image generated by the second compositing unit 236 with a map image. The third compositing unit 237 then outputs the third composite image to the display unit 40. In other words, the third compositing unit 237 is a display control unit that causes the third composite image to be displayed in the display unit 40. The map image is an image expressing a map showing points in the field corresponding to the related positions. In other words, the map image is an image that indicates, as a map, locations, in the field, of the information presentation images shown in the second composite image, corresponding to the information expressed by those information presentation images.

For example, when an information presentation image indicating that an event has occurred is shown in the second composite image, the third compositing unit 237 specifies a point in the field where the event has occurred on the basis of the operation state data input from the vehicle body control device 42. The third compositing unit 237 generates the map image indicating that point, generates the third composite image by compositing the map image with the second composite image, and outputs the third composite image to the display unit 40.

An examples of a third composite image 292 generated by the third compositing unit 237 is illustrated in FIG. 45. This third composite image 292 is generated compositing a map image 293 with the right side of the second composite image illustrated in FIG. 43. Position presentation images 294*a* and 94*b* near a boundary between the already-mowed area H and the unmowed area G, as well as a position presentation image 294*c* in the already-mowed area H, are indicated in the map image 293. The position presentation image 294*a* shows the point where the vehicle body W is located in the field. The position presentation image 294*b* and the position presentation image 294*c* show points in the field where operations have stopped (the event) due to the grain tank 72 being full.

Although the present embodiment has described an example where the point where the event occurred is shown in the map image generated by the third compositing unit 237, other points related to the information presentation image may be shown in the map image. For example, points where obstructions (people, ridges, or the like) are present, points in the field where an abnormal condition has occurred in the crop (falling over, poor growth, or the like) may be indicated in the map image by a location presentation image.

The image processing device 230 may be configured to be capable of outputting the second composite image and the third composite image to the display unit 40 selectively. In other words, the image processing device 230 may be configured so that the second compositing unit 236 serving as a display control unit outputs the second composite image to the display unit 40, and the third compositing unit 237 serving as a display control unit outputs the third composite image to the display unit 40.

(2) The foregoing embodiment described an example in which the vehicle body W of the head-feeding combine is provided with four cameras. The number of cameras is not limited thereto, however, and one, two, three, or five or more cameras may be provided in the vehicle body W.

(3) Although the foregoing embodiment describes an example in which the vehicle body image showing the vehicle body W is shown in the second composite image, part of the vehicle body W that has been shot may be shown in the second composite image.

(4) The foregoing embodiment described an example in which the second composite image is displayed in the display unit 40 and the third composite image is displayed in the display unit 40. The first composite image and the second composite image may be displayed in the display unit 40 in an alternating manner, or the image displayed in the display unit 40 may be switched between the first composite image and the second composite image on the basis of operations made by the driver. The first composite image, the second composite image, and the third composite image may be displayed in the display unit 40 in an alternating manner, or the image displayed in the display unit 40 may be switched between the first composite image, the second composite image, and the third composite image on the basis of operations made by the driver.

(5) The foregoing embodiment described an example in which the subregions, as well as the information presentation images displayed corresponding to the subregions, are rectangular. However, the subregions and the information presentation images may have any shape and size, and are not limited to the above-described examples.

INDUSTRIAL APPLICABILITY

The present invention can be applied in harvesters that harvest planted crops while traveling, and can be applied in standard combines, head-feeding combines, and the like. The present invention can also be applied in work machines that work in fields, such as rice transplanters, management machines, tractors, and the like.

DESCRIPTION OF REFERENCE SIGNS

- 2: Crawler traveling device (traveling device)
- 3: Mowing unit (harvesting unit)
- 3a: Mowing frame (frame)
- 6: Raking auger (auger)
- 7: Divider
- 8: Driving section
- 8a: Driver's seat
- 9a: Roof part
- 9e: Side glass
- 9f: Projecting part
- 10: Feeder (transport unit)
- 11: Threshing device
- 11a: Main body part
- 11b: Top panel
- 12: Grain tank
- 13: Discharge device
- 14: Rear cover part
- 15: Engine
- 16: Radiator
- 17: Dust-resistant case (dust-resistant unit)
- 21: Front camera
- 22: Rear camera
- 23: Right camera (first side camera)
- 24: Left camera (second side camera)
- 25: Lower-right camera (camera)
- 26: Lower-left camera (camera)
- 27: Lower-rear camera (camera)
- 32: Storage unit
- 33: Image compositing unit
- 40: Display unit
- 50: Composite image
- 62: Crawler traveling device (traveling device)
- 63: Mowing unit (harvesting unit)
- 63a: Divider
- 63b: Lifting device
- 68: Driving section
- 68a: Driver's seat
- 69a: Roof part
- 69e: Side glass
- 69f: Projecting part
- 70: Transport unit
- 70c: Feed chain
- 70d: Rail stand
- 71: Threshing device
- 71f: Front wall
- 71c: Waste straw processing device
- 72: Grain tank
- 75: Engine
- 76: Radiator
- 77: Dust-resistant case (dust-resistant unit)
- 78: Satellite positioning module
- 81: Front camera
- 82: Rear camera
- 83: Right camera (first side camera)
- 84: Left camera (second side camera)
- 86: Lower-left camera (camera)
- 90: Composite image
- 150: Composite image
- 190: Composite image
- 232: Storage unit
- 233: First compositing unit
- 236: Second compositing unit (display control unit)
- 237: Third compositing unit (display control unit)
- 290: Second composite image
- 291a-91t: Information presentation image
- 292: Third composite image
- 293: Map image
- A: Receiving part
- V: Vehicle body
- W: Vehicle body

The invention claimed is:

1. A harvester, comprising:
   a vehicle body;
   a front camera, a rear camera, a first side camera, and a second side camera that shoot a vicinity of the vehicle body and generate shot images;
   a storage unit for storing vehicle body data indicating an external shape of the vehicle body;
   an image compositing unit that generates a composite image showing the vehicle body and the vicinity of the vehicle body based on (i) the shot images generated by the front camera, the rear camera, the first side camera, and the second side camera and (ii) the vehicle body data stored in the storage unit; and
   a display unit that displays the composite image generated by the image compositing unit, wherein the vehicle body comprises:
a harvesting unit that harvests a crop in a field;
a driving section provided behind the harvesting unit;
a transport unit that is provided laterally to the driving section and that transports a harvested crop harvested by the harvesting unit;
a threshing device that is provided behind the transport unit and that threshes the harvested crop transported by the transport unit;
a grain tank that is provided behind the driving section and laterally to the threshing device and that stores grain obtained by the threshing device;
a discharge device that is provided behind the grain tank and that discharges the grain stored in the grain tank to outside; and
a rear cover part that covers the discharge device or the threshing device from behind,
wherein:
the front camera is provided on a front part of the driving section,
the rear camera is provided on the rear cover part,
the first side camera is provided on (i) a side part of the driving section on an outer side in a left-right direction of the vehicle body or (ii) a side part of the grain tank on an outer side in the left-right direction of the vehicle body,
the second side camera is provided on a side part of the threshing device on an outer side in the left-right direction of the vehicle body,
the front camera is provided so that a region around the harvesting unit and an entirety of the harvesting unit are included in a shooting range thereof,
the image compositing unit selectively generates the composite image in which:
(a)(i) the harvesting unit in a working position or the harvesting unit in a non-working position is shown in the composite image, based on the vehicle body data, and (ii) the threshing device is shown in the composite image, based on the vehicle body data; or
(b)(i) the region around the harvesting unit and the entirety of the harvesting unit are shown in the composite image, based on images captured by the front camera, and (ii) the threshing device is shown in the composite image based on the vehicle body data.

2. The harvester according to claim 1, wherein the front camera and the rear camera are located in a central part in the left-right direction of the vehicle body.

3. The harvester according to claim 1, wherein the front camera is provided on the front part of the driving section, and is adjacent to the transport unit.

4. The harvester according to claim 1, wherein the first side camera is provided on a rear part of the driving section, and is adjacent on an outer side in the left-right direction of the vehicle body.

5. The harvester according to claim 1, wherein the first side camera is provided behind a driver's seat in the driving section.

6. The harvester according to claim 5, further comprising:
an engine provided below the driver's seat;
a radiator provided on an opposite side of the transport unit to the engine; and
a dust-resistant unit that is provided on an opposite side of the transport unit to the radiator and that removes dust from outside air supplied to the radiator, and
wherein the first side camera is provided above the dust-resistant unit.

7. The harvester according to claim 1,
wherein a roof part in the driving section comprises a projecting part that projects farther outward in the left-right direction of the vehicle body than a side glass, and
wherein the first side camera is provided directly below the projecting part.

8. The harvester according to claim 1, wherein the first side camera is provided on a front part of the grain tank, and is adjacent on an outer side in the left-right direction of the vehicle body.

9. The harvester according to claim 1, wherein the second side camera is provided on a front part of the threshing device, and is adjacent on an outer side in the left-right direction of the vehicle body.

10. The harvester according to claim 1, wherein the threshing device comprises a main body part and a top panel that opens and closes an opening provided in an upper surface of the main body part, and
wherein the second side camera is provided on the front part of the threshing device, and on a part of the upper surface of the main body part located farther outward than the top panel.

11. A harvester, comprising:
a vehicle body;
a front camera, a rear camera, a first side camera, and a second side camera that shoot a vicinity of the vehicle body and generate shot images;
a storage unit for storing vehicle body data indicating an external shape of the vehicle body;
an image compositing unit that generates a composite image showing the vehicle body and the vicinity of the vehicle body based on (i) the shot images generated by the front camera, the rear camera, the first side camera, and the second side camera and (ii) the vehicle body data stored in the storage unit; and
a display unit that displays the composite image generated by the image compositing unit,
wherein the vehicle body comprises:
a harvesting unit that harvests a crop in a field;
a driving section provided behind the harvesting unit;
a transport unit that is provided laterally to the driving section and that transports a harvested crop harvested by the harvesting unit;
a threshing device that is provided behind the transport unit and that threshes the harvested crop transported by the transport unit; and
a grain tank that is provided behind the driving section and laterally to the threshing device and that stores grain obtained by the threshing device,
wherein:
the front camera is provided on a front part of the driving section,
the rear camera is provided on a rear part of the threshing device or the grain tank,
the first side camera is provided on (i) a side part of the driving section on an outer side in a left-right direction of the vehicle body or (ii) a side part of the grain tank on an outer side in the left-right direction of the vehicle body,
the second side camera is provided on a side part of the threshing device on an outer side in the left-right direction of the vehicle body,
the front camera is provided so that region around the harvesting unit and an entirety of the harvesting unit are included in a shooting range thereof, and
the image compositing unit selectively generates the composite image in which:

(a)(i) the harvesting unit in a working position or the harvesting unit in a non-working position is shown in the composite image, based on the vehicle body data, and (ii) the threshing device is shown in the composite image, based on the vehicle body data; or (b)(i) the region around the harvesting unit and the entirety of the harvesting unit are shown in the composite image, based on images captured by the front camera, and (ii) the threshing device is shown in the composite image based on the vehicle body data.

12. A harvester, comprising:

a vehicle body;

a front camera, a rear camera, a first side camera, and a second side camera that shoot a vicinity of the vehicle body and generate shot images;

a storage unit for storing vehicle body data indicating an external shape of the vehicle body;

an image compositing unit that generates a composite image showing the vehicle body and the vicinity of the vehicle body based on (i) the shot images generated by the front camera, the rear camera, the first side camera, and the second side camera and (ii) the vehicle body data stored in the storage unit; and a display unit that displays the composite image generated by the image compositing unit, wherein the vehicle body comprises:

a harvesting unit that harvests a crop in a field;

a driving section provided behind the harvesting unit;

a transport unit that is provided laterally to the driving section and that transports a harvested crop harvested by the harvesting unit;

a feed chain that transports the harvested crop transported by the transport unit toward a rear;

a threshing device that is provided behind the transport unit and that threshes the harvested crop transported by the feed chain; and a grain tank that is provided behind the driving section and laterally to the threshing device and that stores grain obtained by the threshing device, wherein:

the front camera is provided on a front part of the driving section, the rear camera is provided on a rear part of the threshing device or the grain tank, the first side camera is provided on (i) a side part of the driving section on an outer side in a left-right direction of the vehicle body or (ii) a side part of the grain tank on an outer side in the left-right direction of the vehicle body, the second side camera is provided above a receiving part where the harvested crop is received by the feed chain from the transport unit, and the second side camera is switchable between a state in which the receiving part is able to be shot by the second side camera, and a state in which the receiving part is not shot by the second side camera and a region to the left of the threshing device is able to be shot by the second side camera.

13. The harvester according to claim 12, wherein the second side camera is provided so as to be capable of shooting the receiving part.

14. The harvester according to claim 12, further comprising:

a rail stand located vertically opposite to the feed chain such that the rail stand and the feed chain sandwich the harvested crop, wherein the second side camera is provided farther forward than the rail stand.

15. The harvester according to claim 12, wherein the second side camera is provided forward of an outer part of a front wall in the threshing device.

16. The harvester according to claim 12, wherein the first side camera is provided farther forward than the grain tank.

17. The harvester according to claim 12, wherein the first side camera is provided behind a driver's seat in the driving section.

18. The harvester according to claim 17, further comprising:

an engine provided below the driver's seat;

a radiator provided on an opposite side of the transport unit to the engine; and a dust-resistant unit that is provided on an opposite side of the transport unit to the radiator and that removes dust from outside air supplied to the radiator, and wherein the first side camera is provided above the dust-resistant unit.

19. The harvester according to claim 12, wherein the first side camera is provided at a position higher than the grain tank.

20. The harvester according to claim 12, wherein a roof part in the driving section comprises a projecting part that projects farther outward in the left-right direction of the vehicle body than a side glass, and wherein the first side camera is provided directly below the projecting part.

21. The harvester according to claim 12, further comprising:

a satellite positioning module that detects a self vehicle position, and wherein the front camera, the rear camera, the first side camera, and the second side camera are provided at a position lower than the satellite positioning module.

* * * * *